United States Patent
Sychev

(10) Patent No.: US 12,034,954 B2
(45) Date of Patent: Jul. 9, 2024

(54) ENCODER AND DECODER WITH SUPPORT OF SUB-LAYER PICTURE RATES IN VIDEO CODING

(71) Applicant: HUAWEI TECHNOLOGIES CO., LTD., Shenzhen (CN)

(72) Inventor: Maxim Borisovitch Sychev, Moscow (RU)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 102 days.

(21) Appl. No.: 17/701,388

(22) Filed: Mar. 22, 2022

(65) Prior Publication Data

US 2022/0217389 A1 Jul. 7, 2022

Related U.S. Application Data

(63) Continuation of application No. PCT/RU2020/050244, filed on Sep. 24, 2020, which
(Continued)

(51) Int. Cl.
*H04N 19/146* (2014.01)
*H04N 19/172* (2014.01)
(Continued)

(52) U.S. Cl.
CPC ........... *H04N 19/46* (2014.11); *H04N 19/146* (2014.11); *H04N 19/172* (2014.11); *H04N 19/70* (2014.11)

(58) Field of Classification Search
CPC .... H04N 19/46; H04N 19/146; H04N 19/172; H04N 19/70; H04N 19/31; H04N 21/85406
See application file for complete search history.

(56) References Cited

U.S. PATENT DOCUMENTS 9,813,719 B2 11/2017 Wang
2022/0264153 A1* 8/2022 Deshpande .......... H04N 19/187

FOREIGN PATENT DOCUMENTS

WO 2014011569 A1 1/2014
WO WO-2014011569 A1 * 1/2014 ........... H04N 19/146
(Continued)

OTHER PUBLICATIONS

Document: JVET-M0579, Andrew Segall et al., On Frame Rate Support and Extraction in VVC, Joint Video Experts Team (JVET) of ITU-T SG 16 WP 3 and ISO/IEC JTC 1/SC 29/WG11, 13th Meeting: Marrakech, MA, Jan. 9-18, 2019, 4 pages.
(Continued)

*Primary Examiner* — Tat C Chio
(74) *Attorney, Agent, or Firm* — Rimon PC

(57) ABSTRACT

A coding method implemented by a decoding/encoding device for coding video data comprises coding, in a supplemental enhancement information (SEI) message, a set of sequence parameters. The set of sequence parameters is associated with temporal IDs of the sub-layers of a bitstream or coded layer video sequence (C(L)VS). The coding method further comprises processing the bitstream or C(L) VS by using the set of sequence parameters included in the SEI message. The set of sequence parameters is used for deriving or representing a picture rate of the sequence.

16 Claims, 17 Drawing Sheets

Related U.S. Application Data is a continuation of application No. PCT/RU2019/000669, filed on Sep. 24, 2020.

(60) Provisional application No. 62/910,443, filed on Oct. 3, 2019.

(51) Int. Cl.
 *H04N 19/46* (2014.01)
 *H04N 19/70* (2014.01)

(56) References Cited

FOREIGN PATENT DOCUMENTS

| WO | 2014047175 A1 | 3/2014 |
|---|---|---|
| WO | 2021061025 A1 | 4/2021 |

OTHER PUBLICATIONS

Document: JCTVC-AC1005-v2, Jill Boyce et al, HEVC Additional Supplemental Enhancement Information (Draft 4), Joint Collaborative Team on Video Coding (JCT-VC) of ITU-T SG 16 WP 3 and ISO/IEC JTC 1/SC 29/WG 11, 29th Meeting: Macao, CN, Oct. 19-25, 2017, 51 pages.

Document: JVET-N0061, Virginie Drugeon et al, AHG19: Signalling temporal IDs and levels for HFR backwards compatible bitstreams, Joint Video Experts Team (JVET) of ITU-T SG 16 WP 3 and ISO/IEC JTC 1/SC 29/WG11, 14th Meeting: Geneva, CH, Mar. 19-27, 2019, 4 pages.

Document: JVET-L0114-v1, Ye-Kui Wang et al, On slicing and tiling in VVC, Joint Video Experts Team (JVET) of ITU-T SG 16 WP 3 and ISO/IEC JTC 1/SC 29/WG 11, 12th Meeting: Macao, CN, Oct. 3-12, 2018.

Document: JVET-O0227, Virginie Drugeon, AHG17: Parsing dependency of picture timing SEI message on SPS, Joint Video Experts Team (JVET) of ITU-T SG 16 WP 3 and 1S0/IEC JTC 1/SC 29/WG11, 15th Meeting: Gothenburg, SE, Jul. 3-12, 2019, 2 pages.

Document: JVET-L0686-v2, Ye-Kui Wang et al, Spec text for the agreed starting point on slicing and tiling, Joint Video Experts Team (JVET) of ITU-T SG 16 WP 3 and ISO/IEC JTC 1/SC 29/WG 11, 12th Meeting: Macao, CN, Oct. 3-12, 2018, 1 pages.

Document: JVET-L1001-v7, Benjamin Bross et al, Versatile Video Coding (Draft 3), Joint Video Experts Team (JVET) of ITU-T SG 16 WP 3 and ISO/IEC JTC 1/SC 29/WG 11, 12th Meeting: Macao, CN, Oct. 3-12, 2018, 226 pages.

Document: JVET-N0353, Karsten Suehring et al, AHG 17: Parsing of HRD related SEI messages, Joint Video Experts Team (JVET) of ITU-T SG 16 WP 3 and ISO/IEC JTC 1/SC 29/WG 11, 14th Meeting: Geneva, CH, Mar. 19-27, 2019, 5 pages.

Document: JVET-O0045, Stephan Wenger et al, AHG8: Spatial Scalability using Reference Picture Resampling, Joint Video Experts Team (JVET) of ITU-T SG 16 WP 3 and ISO/IEC JTC 1/SC 29/WG 11, 15th Meeting: Gothenburg, SE, Jul. 3-12, 2019, 3 pages.

Document: JVET-O0177, Sachin Deshpande, On HRD Signalling, Joint Video Experts Team (JVET) of ITU-T SG 16 WP 3 and ISO/IEC JTC 1/SC 29/WG 11, 15th Meeting: Gothenburg, SE, Jul. 3-12, 2019, 6 pages.

Document: JVET-O0333, Byeongdoo Choi et al, AHG8: On spatial scalability support with reference picture resampling, Joint Video Experts Team (JVET) of ITU-T SG 16 WP 3 and ISO/IEC JTC 1/SC 29/WG 11, 15th Meeting: Gothenburg, SE, Jul. 3-12, 2019, 6 pages.

Document: JVET-O2001-vE, Benjamin Bross et al., Versatile Video Coding (Draft 6), Joint Video Experts Team (JVET) of ITU-T SG 16 WP 3 and ISO/IEC JTC 1/SC 29/WG 11, 15th Meeting: Gothenburg, SE, Jul. 3-12, 2019, 439 pages.

Document: JVET-P0338-v1, Sean McCarthy et al, AHG17: Shutter interval information SEI message, Joint Video Experts Team (JVET) of ITU-T SG 16 WP 3 and ISO/IEC JTC 1/SC 29/WG 11, 16th Meeting: Geneva, CH, Oct. 1-11, 2019, 7 pages.

ITU-T H.261 (Mar. 1993), Line Transmission of Non-Telephone Signals, Video Codec for Audiovisual Services At p x 64 kbits, total 29 pages.

ITU-T H.262 (Feb. 2012), Series H: Audiovisual and Multimedia Systems, Infrastructure of audiovisual services-Coding of moving video Information technology-Generic coding of moving pictures and associated audio Information: Video: Frame packing arrangement signalling for 3D content, total 238 pages.

ITU-T H.263(Jan. 2005), Series H: Audiovisual and Multimedia Systems, Infrastructure of audiovisual services-Coding of moving video, Video coding for low bit rate communication, total 226 pages.

ITU-T H.264(Jun. 2019), Series H: Audiovisual and Multimedia Systems, Infrastructure of audiovisual services-Coding of moving video, Advanced video coding for generic audiovisual services, total 836 pages.

ITU-T H.265(Jun. 2019),Series H: Audiovisual and Multimedia Systems, Infrastructure of audiovisual services-Coding of moving video, High efficiency video coding, total 696 pages.

Jill Boyce et al., "Draft high efficiency video coding (HEVC) version 2, combined format range extensions (RExt), scalability (SHVC), and multi-view (MV-HEVC) extensions," Joint Collaborative Team on Video Coding (JCT-VC) of ITU-T SG 16 WP 3 and ISO/IEC JTC 1/SC 29/WG11, 18th Meeting: Sapporo, JP, Jun. 30-Jul. 9, 2014, Document: JCTVC-R1013_v6, Draft ISO/IEC 23008-2:201x(E), 535 total pages.

Arturo A. Rordriguez, Cisco Systems, "Introduction of temporal id-type Single layer: conformance and temporal id semantics," Joint Collaborative Team on Video Coding (JCT-VC) of ITU-T SG 16 WP 3 and ISO/IEC JTC 1/SC 29/ WG11, 11th Meeting: Shanghai, CN, Oct. 1-19, 2012, Document: JCTVC-K0330_r5, Oct. 12, 2012; 5 total pages.

Sychev Maxim, Huawei Technologies Co. LTD, "AHG8/AHG17: Sub-layer picture rates," Joint Video Experts Team JVET) of ITU-T SG 16 WP3 and ISO/IEC JTC 1/SC 29/WG 11, 16th Meeting: Geneva, CH, Oct. 1-11, 2019, Document: JVET-P0610-v2, Oct. 4, 2019; 7 total pages.

* cited by examiner

ENCODER AND DECODER WITH SUPPORT OF SUB-LAYER PICTURE RATES IN VIDEO CODING

CROSS-REFERENCE TO RELATED APPLICATIONS

This application is a continuation of International Application No. PCT/RU2020/050244, filed on Sep. 24, 2020, which claims priority to International Patent Application No. PCT/RU2019/000669, filed on Sep. 24, 2019 and U.S. provisional Application No. 62/910,443, filed on Oct. 3, 2019. All of the aforementioned patent applications are hereby incorporated by reference in their entireties.

TECHNICAL FIELD

Embodiments of the present application (disclosure) generally relate to signaling and coding of mapping sub-layers to picture rates in video coding by Supplemental Enhancement Information (SEI) in the Advanced Video Coding (AVC), High Efficiency Video Coding (HEVC), Versatile Video Coding (VVC) and other video coding standards. More specifically, this disclosure describes the signaling of the table that allows mapping of Temporal IDs (TIDs) of sub-layers with corresponding picture rates. The description of the techniques is based on the under-development video coding standard Versatile Video Coding (VVC) by the joint video experts team (JVET) of ITU-T and ISO/IEC. However, the techniques also apply to other video codec specifications.

BACKGROUND

Video compression techniques perform spatial (intra-picture) prediction and/or temporal (inter-picture) prediction to reduce or remove redundancy inherent in video sequences. For block-based video coding, a video slice (i.e., a video picture or a portion of a video picture) may be partitioned into video blocks, which may also be referred to as treeblocks, coding tree blocks (CTBs), coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

Based on those technologies, as series of video coding standards were/are developed which include ITU-T H.261, ISO/IEC MPEG-1 Part 2, ITU-T H.262 or ISO/IEC MPEG-2 Part 2, ITU-T H.263, ISO/IEC MPEG-4 Part 2, Advanced Video Coding (AVC), also known as ITU-T H.264 or ISO/IEC MPEG-4 Part 10, and High Efficiency Video Coding (HEVC), also known as ITU-T H.265 or MPEG-H Part 2. AVC includes extensions such as Scalable Video Coding (SVC), Multiview Video Coding (MVC) and Multiview Video Coding plus Depth (MVC+D), and 3D AVC (3D-AVC). HEVC includes extensions such as Scalable HEVC (SHVC), Multiview HEVC (MV-HEVC), and 3D HEVC (3D-HEVC).

There is also a new video coding standard, named Versatile Video Coding (VVC), being developed by the joint video experts team (JVET) of ITU-T and ISO/IEC. At the time of writing, the latest Working Draft (WD) of VVC included in JVET-L1001-v5, which is publicly available herein: http://phenix.it-sudparis.eu/jvet/doc_end_user/documents/12_Macao/wg11/JVET-L1001-v11.zip.

SUMMARY

Embodiments of the present application provide apparatuses and methods for encoding and decoding according to the independent claims.

The foregoing and other objects are achieved by the subject matter of the independent claims. Further implementation forms are apparent from the dependent claims, the description and the figures.

The present disclosure discloses:
A method of coding implemented by a decoding/encoding device for coding video data, comprising:
   coding, in a supplemental enhancement information, SEI, message, a set of sequence parameters,
   wherein the set of sequence parameters is associated with temporal IDs of sub-layers of a bitstream or coded layer video sequence, C(L)VS;
   processing the bitstream or C(L)VS by using the set of sequence parameters included in the SEI message;
   wherein the set of sequence parameters is used for deriving or representing a picture rate of the sequence.

Thus, the new SEI message provides to an external application or network the list of picture rates associated with the list of Temporal IDs.

In the method as described above, coding the set of sequence parameters associated with the temporal IDs in the SEI message may comprise coding an indication indicating a special payload type for the SEI message.

In the method as described above, the sequence may comprise one or more sub-sequences, wherein the set of sequence parameters may be used for deriving or representing a picture rate of the one or more of the sub-sequences.

In the method as described above, the temporal IDs (TIDs) may be associated with a subset of general layer IDs, wherein at least one of the general layer IDs may be a temporal layer ID, or a Signal to Noise Ratio, SNR, layer ID, or a spatial layer ID.

In the method as described above, the set of sequence parameters may include one or more of following parameters: a highest temporal ID, TID, time scale value indicating the number of time units that pass in one second, a flag of dyadic temporal ID distribution indicating a fixed picture rate and a dyadic hierarchical distribution for all sub-layers within the bitstream or C(L)VS, a number of units in clock ticks associated with the picture rate of corresponding sub-layer from sub-layer with temporal ID 0 for non-dyadic TID distribution, and a number of units in clock ticks associated with the picture rate of corresponding sub-layer from highest temporal ID for dyadic TID distribution till the sub-layer with highest TID in bitstream or in a form of picture rate with predefined precision.

In the method as described above, the set of sequence parameters may include number of units in clock ticks of highest TID, the highest TID, and the processing of the bitstream or C(L)VS by using the set of sequence parameters may comprise: deriving a number of units in clock ticks for a sub-layer associated with a particular TID by division of a number of units in clock ticks of highest TID by (highest TID minus current TID) power of 2; and processing the bitstream based on the number of units in clock ticks for the sub-layer.

The present disclosure further discloses a method of coding implemented by a decoding/encoding device for coding video data, comprising: coding, in hypothetical reference decoder, HRD, parameters, a set of sequence parameters associated with temporal IDs which are associated to the temporal layers of a bitstream or C(L)VS; and processing the bitstream or C(L)VS by using the set of sequence parameters.

In the method as described above, the set of sequence parameter includes: a flag of a dyadic temporal ID distribution denoting a fixed picture rate for all sub-layers within the bitstream or C(L)VS in general HRD parameters syntax elements.

In the method as described above, the set of sequence parameter includes a flag of dyadic temporal ID distribution denoting a fixed picture rate for all sub-layers within the bitstream or C(L)VS in general HRD parameters syntax elements, and wherein processing the bitstream by using the set of sequence parameters comprises: setting the value of a flag indicating a fixed picture rate to 1, when a flag indicating dyadic temporal nesting is present; setting the value of a flag indicating a fixed picture rate within the C(L)VS to 1 when a flag indicating dyadic temporal nesting is present; and processing the bitstream or C(L)VS based on the value of the flag indicating the fixed picture rate.

In the method as described above,
wherein setting the value of a flag indicating a fixed picture rate to 1, when a flag indicating dyadic temporal nesting is present may comprise: setting the value of a flag denoted fixed_pic_rate_general_flag to 1 when the flag denoted dyadic temporal nesting flag is equal to 1;
wherein setting the value of a flag indicating a fixed picture rate within the C(L)VS to 1 when a flag indicating dyadic temporal nesting is present may comprise: setting the value of a flag denoted fixed_pic_rate_within_cvs_flag to 1 when the flag denoted dyadic_temporal_nesting_flag is equal to 1; and
wherein processing the bitstream or C(L)VS based on the value of the flag indicating the fixed picture rate may comprise processing the bitstream or C(L)VS based on the value of the flag denoted fixed_pic_rate_general_flag.

It is further disclosed a method of coding implemented by a decoding/encoding device for coding video data, comprising: coding, at File-format-level, a set of sequence parameters associated to the temporal layers of a bitstream or C(L)VS; processing the bitstream by using the set of sequence parameters.

In the method as described above, the coding at File-format-level comprises: coding a sample entry if the File-format-level is static, and/or coding a sample group or timed metadata if the File-format level is dynamic.

In the method as described above: the sequence parameters are coded into/out from HRD parameters of the bitstream or C(L)VS; or the sequence parameters are coded into/out from the SEI message of the bitstream or C(L)VS; or the sequence parameters are coded into/out from at the File-format-level of the bit stream or C(L)VS.

In the method as described above, the coding of the sequence parameters at File-format-level comprises: providing setup information in the form of a configuration record in the Sample Entry of the track.

The method of any one of claims 10 to 14, wherein the coding at File-format-level comprises: a sample group description or timed metadata box of ISO Base Media File Format, ISO BMFF, if the File-format-level is a dynamic format.

The method as described above may further comprise: deriving a shutter interval independent from the derivation of a clock tick, wherein a clock tick, in units of seconds, is equal to the quotient of sub_layer_num_units_in_tick divided by the number of time units that pass in one second.

In the method as described above, a fixed_shutter_interval_within_cvs_flag may be used to indicate whether the value of ShutterInterval is the same for all temporal sub-layers in the C(L)VS; wherein the fixed_shutter_interval_within_cvs_flag equals to 1 may specify that the value of ShutterInterval is the same for all temporal sub-layers in the C(L)VS, wherein fixed_shutter_interval_within_sublayer_flag equals to 0 may specify that value of ShutterInterval is not the same for all temporal sub-layers in the C(L)VS.

The method as described above may further comprise determining whether to signal the fixed_shutter_interval_within_cvs_flag based on dyadic_temporal_nesting_flag.

The method as described above may further comprise determining whether to signal the number of units in clock ticks based on dyadic_temporal_nesting_flag.

In the method as described above, the fixed_shutter_interval_within_sublayer_flag[i] may be used to indicate whether that the value of ShutterInterval is the same for particular sub-layers in the C(L)VS; wherein fixed_shutter_interval_within_sublayer_flag[i] equal to 1 specifies that the value of ShutterInterval is the same for an ith temporal sub-layer in the C(L)VS; wherein fixed_shutter_interval_within_sublayer_flag[i] equals to 0 specifies that value of ShutterInterval is not the same for an ith temporal sub-layer in the C(L)VS.

The method as described above, may further comprise determining whether to signal the fixed_shutter_interval_within_sublayer_flag[i] based on dyadic_temporal_nesting_flag.

The method as described above, may further comprise determining whether to signal the number of units in clock ticks associated with picture shutter interval of corresponding sub-layer based on the fixed_shutter_interval_within_sublayer_flag[i].

The method as described above may further comprise: deriving the values of number of clock ticks when TID distribution is dyadic.

The method as described above may further comprise: deriving the number of units in clock ticks for a sub-layer associated with a particular TID by division of the number of units in clock ticks of Maximum TID by the (Maximum TID minus current TID) power of 2 or by arithmetically right shifting by this value.

The method as described above may further comprise: deriving a number of units in shutter interval for a sub-layer associated with a particular TID by division of the number of units in clock ticks of Maximum TID by the (Maximum TID minus current TID) power of 2 or by arithmetically right shifting by this value.

The method as described above may further comprise: when dyadic_temporal_nesting_flag is true, the fixed_pic_rate_general_flag[i] is set equal to true and fixed_pic_rate_within_cvs_flag[i] is set equal to true for all sub-layers.

The method as described above may further comprise: when the value of pi_time_scale is greater than 0, the value of PictureInterval is specified by: PictureInterval=sub_layer_num_units_in_tick [pi_max_sub_layers_minus1]÷pi_time_scale.

The method as described above may further comprise: when the value of pi_time_scale is greater than 0, the value of ShutterInterval is specified by: ShutterInterval=sub_layer_num_units_in_shutter_interval [pi_max_sub_layers_minus1]÷pi_time_scale.

It is further disclosed a method of coding implemented by a decoding/encoding device, comprising: duplicating the sps_max_sub_layers_minus1 in order to be independent from parsing SPS.

In the method as described above, the value of pr_max_sub_layers_minus1 in the picture rates SEI message may be equal to the value of sps_max_sub_layers_minus1 in the SPS.

In the method as described above, the value of pr_max_sub_layers_minus1 may be in the range of 0 to 6.

In the method as described above, the value of pi_max_sub_layers_minus1 in the picture rates SEI message may be equal to the value of sps_max_sub_layers_minus1 in the SPS.

In the method as described above, the value of pi_max_sub_layers_minus1 may be in the range of 0 to 6.

The method as described above may further comprise: when the value of pi_time_scale is greater than 0, the value of PictureInterval is specified by: PictureInterval=sub_layer_num_units_in_tick [pi_max_sub_layers_minus1]÷pi_time_scale.

The method as described above may further comprise: when the value of pi_time_scale is greater than 0, the value of ShutterInterval is specified by: ShutterInterval=sub_layer_num_units_in_shutter_interval [pi_max_sub_layers_minus1]÷pi_time_scale.

The present disclosure further discloses an encoder comprising processing circuitry for carrying out the method as describe above.

The present disclosure further discloses a computer program product comprising a program code for performing the method as describe above.

The present disclosure further discloses a decoder, comprising: one or more processors; and a non-transitory computer-readable storage medium coupled to the processors and storing programming for execution by the processors, wherein the programming, when executed by the processors, configures the decoder to carry out the method as describe above.

The present disclosure further discloses an encoder, comprising: one or more processors; and a non-transitory computer-readable storage medium coupled to the processors and storing programming for execution by the processors, wherein the programming, when executed by the processors, configures the encoder to carry out the method as describe above.

The present disclosure further discloses a decoder, comprising:
 a decoding unit configured to decode, in a supplemental enhancement information, SEI, message, a set of sequence parameters,
 wherein the set of sequence parameters is associated with temporal IDs of sub-layers of a bitstream or coded layer video sequence, C(L)VS;
 a processing unit configured to process the bitstream or C(L)VS by using the set of sequence parameters included in the SEI message;
 wherein the set of sequence parameters is used for deriving or representing a picture rate of the sequence.

The present disclosure further discloses an encoder comprising:
 an encoding unit configured to encode, in a supplemental enhancement information, SEI, message, a set of sequence parameters,
 wherein the set of sequence parameters is associated with temporal IDs of sub-layers of a bitstream or coded layer video sequence, C(L)VS;
 a processing unit configured to process the bitstream or C(L)VS by using the set of sequence parameters included in the SEI message;
 wherein the set of sequence parameters is used for deriving or representing a picture rate of the sequence.

Thus, the present disclosure discloses the following aspects (each of them can be applied individually and some of them can be applied in combination): For the purpose of this document, the terms "Maximum Temporal ID" and "Highest Temporal ID" should be understood as having the same meaning. Furthermore, for the purpose of this application, the terms CVS (coded video sequence) and CLVS (coded layer-wise video sequence), should have the same meaning. This is also indicated by using the term C(L)VS.

1) For signaling of a list of picture rates associated with temporal IDs in SEI message, the following steps are used:
  a. To indicate the special payload type for corresponding SEI message
  b. For corresponding bitstream (or C(L)VS) to describe the list of picture rates associated with corresponding Temporal ID values:
   i. To signal the Highest Temporal ID present in bitstream
   ii. To signal time scale value which is the number of time units that pass in one second
    1. To add constraint that this value be exactly the same as time scale signaled in SPS
   iii. To signal the flag of dyadic temporal ID distribution denoted fixed picture rate for all sub-layers within bitstream or C(L)VS
    1. To signal dyadic temporal ID distribution flag conditionally based on SPS flag of presence dyadic temporal ID distribution flag in bitstream
   iv. setting the value of a dyadic_temporal_nesting_flag is equal to 1 by default (when not present)
   v. setting the value of a parameter vui_poc_proportional_to_timing_flag to 1 when dyadic_temporal_nesting_flag is equal to 1
   vi. setting the value of a fixed_pic_rate_general_flag to 1 when dyadic_temporal_nesting_flag is equal to 1 vii. setting the value of a fixed_pic_rate_within_cvs_flag to 1 when dyadic_temporal_nesting_flag is equal to 1;
viii. and processing the bitstream based on the fixed_pic_rate_general_flag.
ix. To signal fixed_shutter_interval_within_cvs_flag specified that the value of ShutterInterval is the same for all temporal sub-layers in the C(L)VS
1. To signal this flag conditionally based of dyadic_temporal_nesting_flag.
x. For each sub-layer starting from 0 for non-dyadic TID distribution and from Highest temporal ID for dyadic TID distribution till the Highest TID in bitstream
1. To signal the number of units in tick associated with picture rate of corresponding sub-layer
a. To signal the number of units in tick conditionally based on dyadic_temporal_nesting_flag flag (to signal if flag=0 or (flag=1 and TID=Maximum/Highest TID))
2. To signal fixed_shutter_interval_within_sublayer_flag[i] specified that the value of ShutterInterval is the same for particular sub-layers in the C(L)VS and may be derived from Picture interval of corresponding temporal sub layer.
a. To signal the fixed_shutter_interval_within_sublayer_flag[i] conditionally based on dyadic_temporal_nesting_flag (to signal if flag=1)
3. To signal the number of units in tick associated with picture shutter interval of corresponding sub-layer
a. To signal the number of units in tick associated with picture shutter interval of corresponding sub-layer conditionally based on fixed_shutter_interval_within_sublayer_flag[i] flag
c. Define the values of number of ticks when TID distribution is dyadic:
i. To derive number of units in tick for sub-layer associated with particular TID by division of number of units in tick of Highest TID by the (Highest TID minus current TID) power of 2 (or just shift arithmetically right by this value)
ii. To derive number of units in shutter interval for sub-layer associated with particular TID by division of number of units in tick of Maximum TID by the (Maximum TID minus current TID) power of 2 (or just shift arithmetically right by this value)
2) For signaling. The list of picture rates associated with temporal IDs in HRD parameters:
d. For corresponding bitstream (or C(L)VS) to describe the list of picture rates associated with corresponding Temporal ID values:
i. To signal the flag of dyadic temporal ID distribution denoted fixed picture rate for all sub-layers within bitstream or C(L)VS in general_hrd_parameters( ) syntax elements
ii. To signal dyadic temporal ID distribution flag conditionally based on SPS flag of presence dyadic temporal ID distribution flag in bitstream
e. To signal fixed_pic_rate_general_flag[i] for each sub-layer conditionally by the dyadic_temporal_nesting_flag
f. To set the value of fixed_pic_rate_general_flag[I] to 1 when dyadic_temporal_nesting_flag is equal to 1
g. To set the value of fixed_pic_rate_within_cvs_flag [I] to 1 when dyadic_temporal_nesting_flag is equal to 1
3) To associate Temporal IDs with subset of general Layer IDs
h. Where general Layer IDs comprises Spatial, SNR (Signal to Noise Ratio) and Temporal layers
i. Where all layers associated with corresponding picture rates
j. Where only Temporal layers associated with picture rates
Those general layer IDs associated to the temporal IDS can be used as bases to decide which layer of the sequence should be kept or discarded.
4) To signal the list of picture rates associated with temporal IDs at the File-format-level:
k. Sample entry if static
l. Sample group or timed metadata or some other track-level signalling if dynamic
m. As part of Cross Layer Interface
n. As part of Media Processing Unit
o. Note: Static is for storage file formats, dynamic is for transmission—real time protocols
5) Derivation of list of picture rates defined by the approach described in item 1)a-1)c is described in the embodiment 1 below in this document.
6) Derivation of list of picture rates defined by the approach described in item 1)a-1)c is described in the embodiment 2 below in this document.
In other words, the present disclosure discloses the following (each of them can be applied individually and some of them can be applied in combination):
2) For signalling of list of picture rates associated with temporal IDs in SEI message, the following steps are used:
a. To indicate the special payload type for corresponding SEI message
b. For corresponding bitstream (or C(L)VS) to describe the list of picture rates associated with corresponding Temporal ID values:
i. To signal the Maximum Temporal ID present in bitstream
ii. To signal time scale value which is the number of time units that pass in one second
1. To add constraint that this value be exactly the same as time scale signaled in SPS
iii. To signal the flag of dyadic temporal ID distribution denoted fixed picture rate for all sub-layers within bitstream or C(L)VS
1. To signal dyadic temporal ID distribution flag conditionally based on SPS flag of presence dyadic temporal ID distribution flag in bitstream
iv. setting the value of a dyadic_temporal_nesting_flag is equal to 1 by default (when not present)
v. setting the value of a parameter vui_poc_proportional_to_timing_flag to 1 when dyadic_temporal_nesting_flag is equal to 1
vi. setting the value of a fixed_pic_rate_general_flag to 1 when dyadic_temporal_nesting_flag is equal to 1
vii. setting the value of a fixed_pic_rate_within_cvs_flag to 1 when dyadic_temporal_nesting_flag is equal to 1;
viii. and processing the bitstream based on the fixed_pic_rate_general_flag.

ix. To signal fixed_shutter_interval_within_cvs_flag specified that the value of ShutterInterval is the same for all temporal sub-layers in the C(L)VS
1. To signal this flag conditionally based of dyadic_temporal_nesting_flag.
x. For each sub-layer starting from 0 for non-dyadic TID distribution and from Maximum temporal ID for dyadic TID distribution till the Maximum TID in bitstream
1. To signal the number of units in tick associated with picture rate of corresponding sub-layer
a. To signal the number of units in tick conditionally based on dyadic_temporal_ nesting_flag flag (to signal if flag=0 or (flag=1 and TID=Maximum TID))
2. To signal fixed_shutter_interval_ within_sublayer_flag[i] specified that the value of ShutterInterval is the same for particular sub-layers in the C(L)VS and may be derived from Picture interval of corresponding temporal sub layer.
a. To signal the fixed_shutter_interval_ within_sublayer_flag[i] conditionally based on dyadic_temporal_nesting_flag (to signal if flag=1)
3. To signal the number of units in tick associated with picture shutter interval of corresponding sub-layer
a. To signal the number of units in tick associated with picture shutter interval of corresponding sub-layer conditionally based on fixed_shutter_interval_within_sublayer_flag[i] flag
c. Define the values of number of ticks when TID distribution is dyadic:
i. To derive number of units in tick for sub-layer associated with particular TID by division of number of units in tick of Maximum TID by the (Maximum TID minus current TID) power of 2 (or just shift arithmetically right by this value)
ii. To derive number of units in shutter interval for sub-layer associated with particular TID by division of number of units in tick of Maximum TID by the (Maximum TID minus current TID) power of 2 (or just shift arithmetically right by this value)
3) For signaling. The list of picture rates associated with temporal IDs in HRD parameters:
d. For corresponding bitstream (or C(L)VS) to describe the list of picture rates associated with corresponding Temporal ID values:
i. To signal the flag of dyadic temporal ID distribution denoted fixed picture rate for all sub-layers within bitstream or C(L)VS in general_hrd_parameters( ) syntax elements
ii. To signal dyadic temporal ID distribution flag conditionally based on SPS flag of presence dyadic temporal ID distribution flag in bitstream
e. To signal fixed_pic_rate_general_flag[i] for each sub-layer conditionally by the dyadic_ temporal_nesting_flag
f. To set the value of fixed_pic_rate_general_flag[I] to 1 when dyadic_temporal_nesting_flag is equal to 1
g. To set the value of fixed_pic_rate_within_cvs_flag [I] to 1 when dyadic_temporal_nesting_flag is equal to 1
4) To associate Temporal IDs with subset of general Layer IDs
h. Where general Layer IDs comprises Spatial, SNR (Signal to Noise Ratio) and Temporal layers
i. Where all layers associated with corresponding picture rates
j. Where only Temporal layers associated with picture rates Those general layer IDs associated to the temporal IDS can be used as bases to decide which layer of the sequence should be kept or discarded.

5) To signal the list of picture rates associated with temporal IDs at the File-format-level:
k. Sample entry if static
l. Sample group or timed metadata or some other track-level signalling if dynamic
m. As part of Cross Layer Interface
n. As part of Media Processing Unit
o. Note: Static is for storage file formats, dynamic is for transmission—real time protocols
6) Derivation of list of picture rates defined by the approach described in item 1)a-1)c is described in the embodiment 1 below in this document.
7) Derivation of list of picture rates defined by the approach described in item 1)a-1)c is described in the embodiment 2 below in this document.

According to a first aspect present disclosure relates to a method of coding implemented by a decoding/encoding device for coding video data, comprising: coding in SEI message, a set of picture parameters associated with temporal IDs which is included in the SEI message and associated to the temporal layers of bitstream; processing the bitstream by using the set of picture parameters.

In a possible implementation form of the method according to the first aspect as such, the set of picture parameter includes one or more of following parameters: highest temporal ID, time scale value indicated the number of time units that pass in one second, flag of dyadic temporal ID distribution indicated fixed picture rate for all sub-layers within bitstream, a flag of presence of dyadic temporal ID distribution flag, number of units in tick associated with the picture rate of corresponding sub-layer from sub-layer with temporal ID 0 for non-dyadic TID distribution, and number of units in tick associated with the picture rate of corresponding sub-layer from highest temporal ID for dyadic TID distribution till the Highest TID in bitstream.

According to a second aspect present disclosure relates to a method of coding implemented by a decoding/encoding device for coding video data, comprising: coding, in HRD message, a set of picture parameters associated with temporal IDs which is included in the SEI message and associated to the temporal layers of bitstream; processing the bitstream by using the set of picture parameters.

In a possible implementation form of the method according to the second aspect as such, set of picture parameter includes one or more of following parameters: flag of dyadic temporal ID distribution denoted fixed picture rate for all sub-layers within bitstream or CVS in general_hrd_parameters( ) syntax elements, a flag of presence of dyadic temporal ID distribution flag, fixed_pic_rate_general_flag[i] for each sub-layer.

According to a third aspect the present disclosure relates to a method of coding implemented by a decoding/encoding device for coding video data, comprising: coding, at the File-format-level, a set of picture parameters associated with temporal IDs which is included in the SEI message and associated to the temporal layers of bitstream; processing the bitstream by using the set of picture parameters: . . . .

The method according to the first aspect of the present disclosure can be performed by the apparatus according to the fourth aspect of the present disclosure.

The method according to the second aspect of the present disclosure can be performed by the apparatus according to the fifth aspect of the present disclosure.

The method according to the third aspect of the present disclosure can be performed by the apparatus according to the sixth aspect of the present disclosure.

According to a seventh aspect the present disclosure relates to an apparatus for decoding a video stream includes a processor and a memory. The memory is storing instructions that cause the processor to perform the method according to the first aspect.

According to an eighth aspect the present disclosure relates to an apparatus for encoding a video stream includes a processor and a memory. The memory is storing instructions that cause the processor to perform the method according to the second aspect.

According to a ninth aspect the present disclosure relates to an apparatus for encoding a video stream includes a processor and a memory. The memory is storing instructions that cause the processor to perform the method according to the third aspect.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the present disclosure are described in more detail with reference to the attached figures and drawings, in which.

Figure 1A:
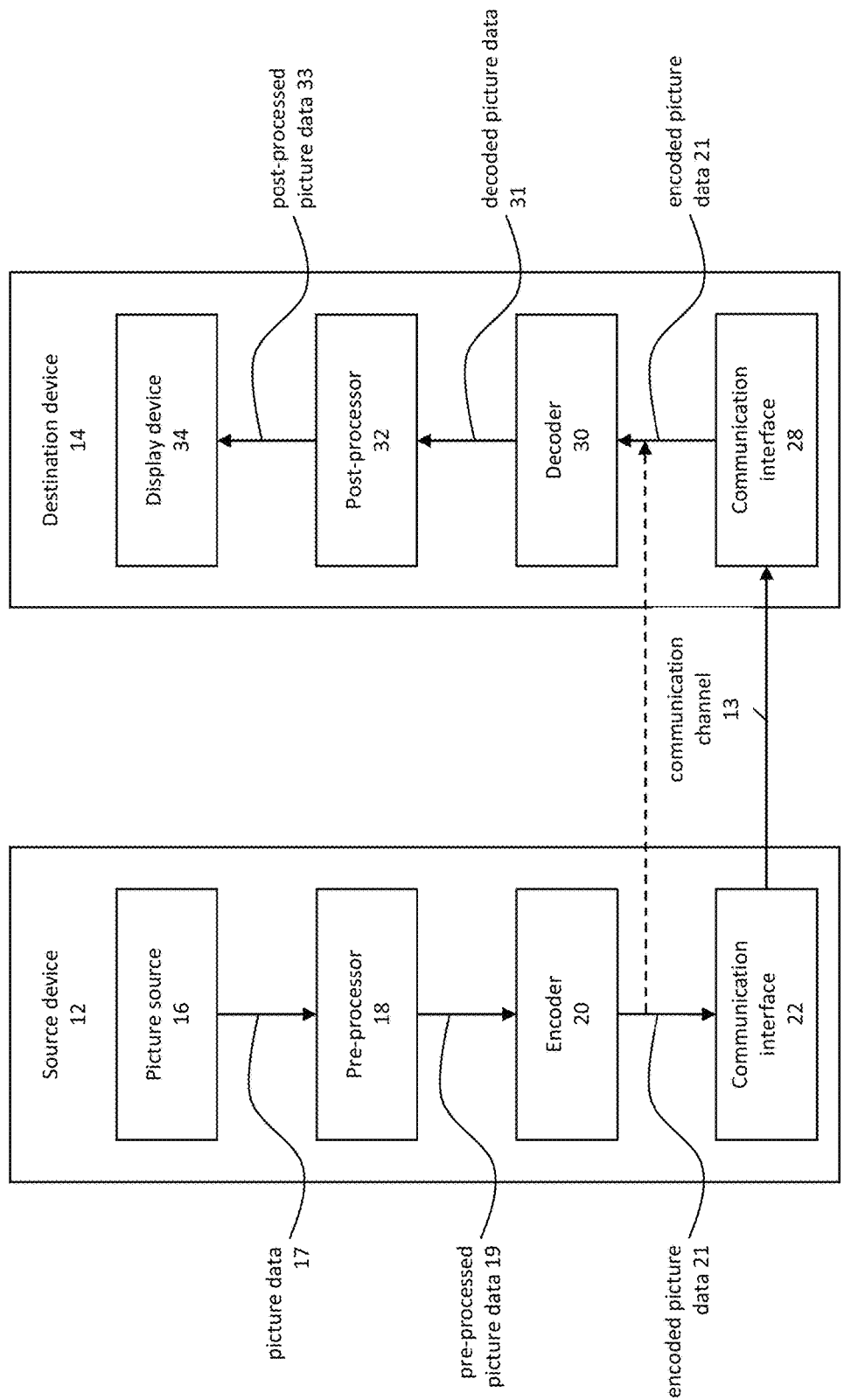
FIG. 1A is a block diagram showing an example of a video coding system configured to implement embodiments of the present disclosure.

In the following identical reference signs refer to identical or at least functionally equivalent features if not explicitly specified otherwise.

DETAILED DESCRIPTION OF THE EMBODIMENTS

In the following description, reference is made to the accompanying figures, which form part of the disclosure, and which show, by way of illustration, specific aspects of embodiments of the present disclosure or specific aspects in which embodiments of the present disclosure may be used. It is understood that embodiments of the present disclosure may be used in other aspects and comprise structural or logical changes not depicted in the figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g., functional units, to perform the described one or plurality of method steps (e.g., one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g., functional units, a corresponding method may include one step to perform the functionality of the one or plurality of units (e.g., one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term "picture" the term "frame" or "image" may be used as synonyms in the field of video coding. Video coding (or coding in general) comprises two parts video encoding and video decoding. Video encoding is performed at the source side, typically comprising processing (e.g., by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (Coding and Decoding).

In case of lossless video coding, the original video pictures can be reconstructed, i.e., the reconstructed video pictures have the same quality as the original video pictures (assuming no transmission loss or other data loss during storage or transmission). In case of lossy video coding, further compression, e.g., by quantization, is performed, to reduce the amount of data representing the video pictures, which cannot be completely reconstructed at the decoder, i.e., the quality of the reconstructed video pictures is lower or worse compared to the quality of the original video pictures.

Several video coding standards belong to the group of "lossy hybrid video codecs" (i.e., combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e., encoded, on a block (video block) level, e.g., by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g., intra- and inter predictions) and/or re-constructions for processing, i.e., coding, the subsequent blocks.

In the following embodiments of a video coding system 10, a video encoder 20 and a video decoder 30 are described based on FIGS. 1 to 3.

FIG. 1A is a schematic block diagram illustrating an example coding system 10, e.g., a video coding system 10 (or short coding system 10) that may utilize techniques of this present application. Video encoder 20 (or short encoder 20) and video decoder 30 (or short decoder 30) of video coding system 10 represent examples of devices that may be configured to perform techniques in accordance with various examples described in the present application.

As shown in FIG. 1A, the coding system 10 comprises a source device 12 configured to provide encoded picture data 21 e.g., to a destination device 14 for decoding the encoded picture data 13.

The source device 12 comprises an encoder 20, and may additionally, i.e., optionally, comprise a picture source 16, a pre-processor (or pre-processing unit) 18, e.g., a picture pre-processor 18, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g., a screen content, a virtual reality (VR) picture) and/or any combination thereof (e.g., an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g., from RGB to YCbCr), color correction, or de-noising. It can be understood that the pre-processing unit 18 may be optional component.

The video encoder 20 is configured to receive the pre-processed picture data 19 and provide encoded picture data 21 (further details will be described below, e.g., based on FIG. 2).

Communication interface 22 of the source device 12 may be configured to receive the encoded picture data 21 and to transmit the encoded picture data 21 (or any further processed version thereof) over communication channel 13 to another device, e.g., the destination device 14 or any other device, for storage or direct reconstruction.

The destination device 14 comprises a decoder 30 (e.g., a video decoder 30), and may additionally, i.e., optionally, comprise a communication interface or communication unit 28, a post-processor 32 (or post-processing unit 32) and a display device 34.

The communication interface 28 of the destination device 14 is configured receive the encoded picture data 21 (or any further processed version thereof), e.g., directly from the source device 12 or from any other source, e.g., a storage device, e.g., an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g., a direct wired or wireless connection, or via any kind of network, e.g., a wired or wireless network or any combination thereof, or any kind of private and public network, or any kind of combination thereof.

The communication interface 22 may be, e.g., configured to package the encoded picture data 21 into an appropriate format, e.g., packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both communication interface 22 and communication interface 28 may be configured as unidirectional communication interfaces as indicated by the arrow for the communication channel 13 in FIG. 1A pointing from the source device 12 to the destination device 14, or bi-directional communication interfaces, and may be configured, e.g., to send and receive messages, e.g., to set up a connection, to acknowledge and exchange any other information related to the communication link and/or data transmission, e.g., encoded picture data transmission.

The decoder 30 is configured to receive the encoded picture data 21 and provide decoded picture data 31 or a decoded picture 31 (further details will be described below, e.g., based on FIG. 3 or FIG. 5).

The post-processor 32 of destination device 14 is configured to post-process the decoded picture data 31 (also called reconstructed picture data), e.g., the decoded picture 31, to obtain post-processed picture data 33, e.g., a post-processed picture 33. The post-processing performed by the post-processing unit 32 may comprise, e.g., color format conversion (e.g., from YCbCr to RGB), color correction, trimming, or re-sampling, or any other processing, e.g., for preparing the decoded picture data 31 for display, e.g., by display device 34.

The display device 34 of the destination device 14 is configured to receive the post-processed picture data 33 for displaying the picture, e.g., to a user or viewer. The display device 34 may be or comprise any kind of display for representing the reconstructed picture, e.g., an integrated or external display or monitor. The displays may, e.g., comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
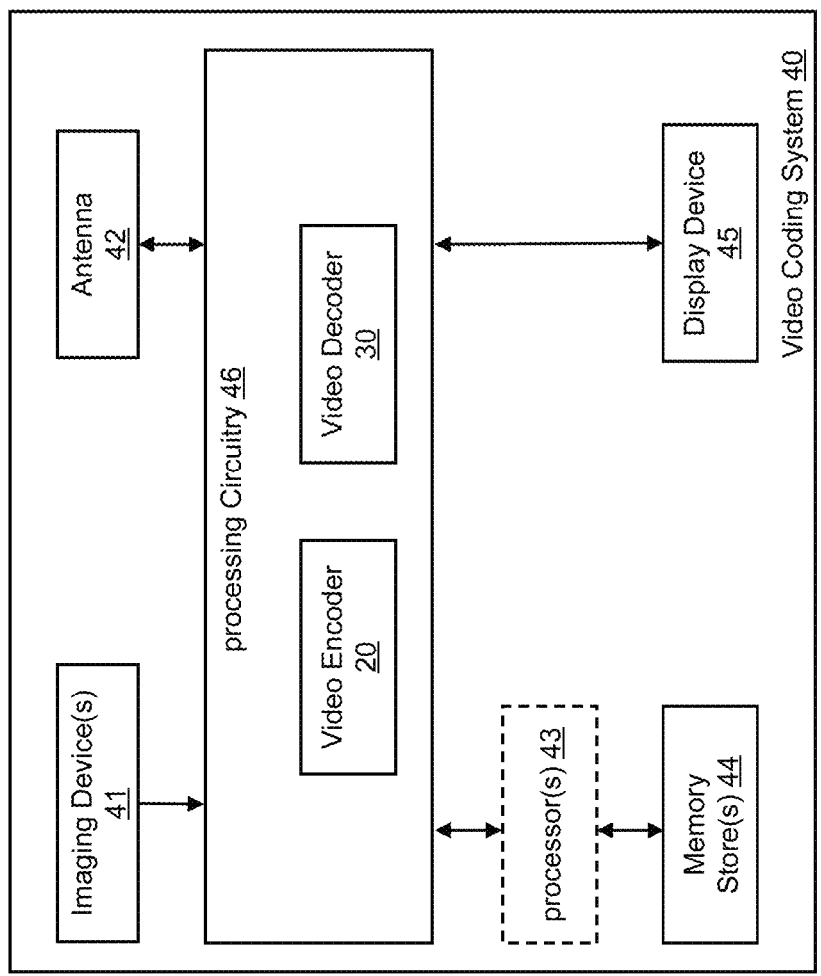
FIG. 1B is a block diagram showing another example of a video coding system configured to implement embodiments of the present disclosure.

The encoder 20 (e.g., a video encoder 20) or the decoder 30 (e.g., a video decoder 30) or both encoder 20 and decoder 30 may be implemented via processing circuitry as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder may be implemented via processing circuitry 46 to embody the various modules as discussed with respect to encoder 20 of FIG. 2 and/or any other encoder system or subsystem described herein. The decoder 30 may be implemented via processing circuitry 46 to embody the various modules as discussed with respect to decoder 30 of FIG. 3 and/or any other decoder system or subsystem described herein. The processing circuitry may be configured to perform the various operations as discussed later. As shown in FIG. 5, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 1B.

Source device 12 and destination device 14 may comprise any of a wide range of devices, including any kind of handheld or stationary devices, e.g., notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments of the present disclosure are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the present disclosure are not limited to HEVC or VVC.

Encoder and Encoding Method

Figure 2:
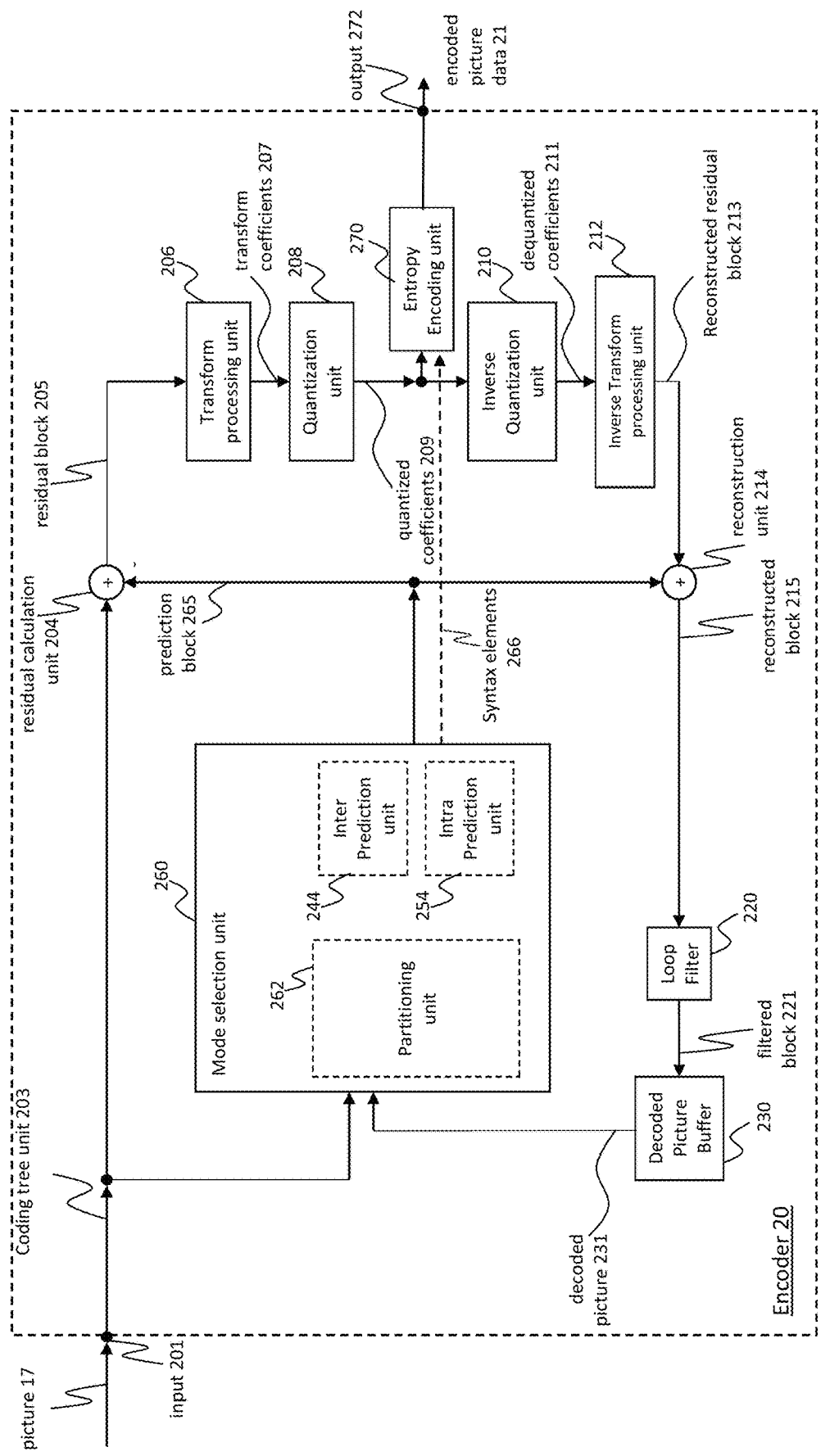
FIG. 2 is a block diagram showing an example of a video encoder configured to implement embodiments of the present disclosure.

FIG. 2 shows a schematic block diagram of an example video encoder 20 that is configured to implement the techniques of the present application. In the example of FIG. 2, the video encoder 20 comprises an input 201 (or input interface 201), a residual calculation unit 204, a transform processing unit 206, a quantization unit 208, an inverse quantization unit 210, and inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

Figure 3:
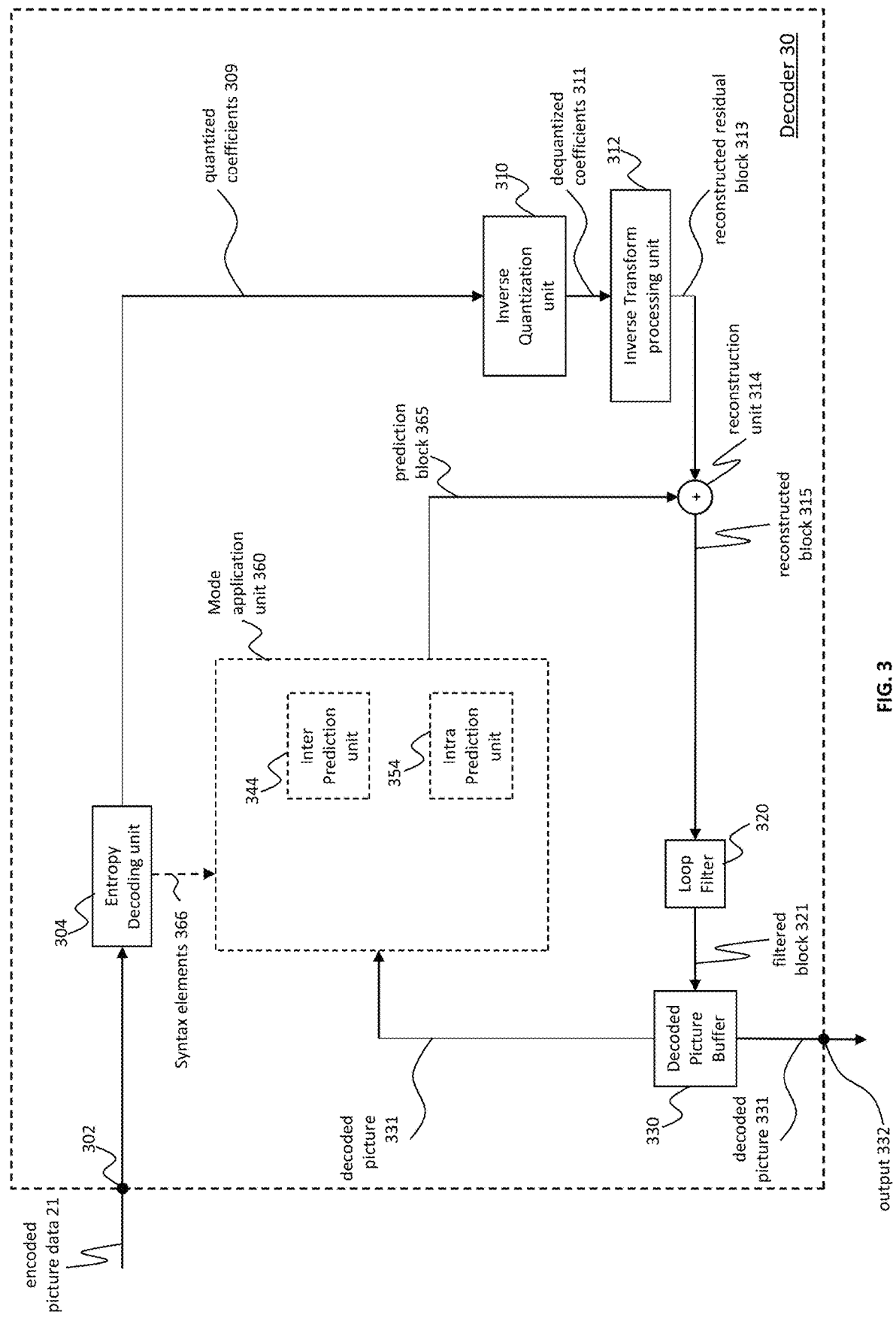
FIG. 3 is a block diagram showing an example structure of a video decoder configured to implement embodiments of the present disclosure.

The residual calculation unit 204, the transform processing unit 206, the quantization unit 208, the mode selection unit 260 may be referred to as forming a forward signal path of the encoder 20, whereas the inverse quantization unit 210, the inverse transform processing unit 212, the reconstruction unit 214, the buffer 216, the loop filter 220, the decoded picture buffer (DPB) 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the decoded picture buffer (DPB) 230, the inter prediction unit 244 and the intra-prediction unit 254 are also referred to forming the "built-in decoder" of video encoder 20.

Pictures & Picture Partitioning (Pictures & Blocks)

The encoder 20 may be configured to receive, e.g., via input 201, a picture 17 (or picture data 17), e.g., picture of a sequence of pictures forming a video or video sequence. The received picture or picture data may also be a pre-processed picture 19 (or pre-processed picture data 19). For sake of simplicity the following description refers to the picture 17. The picture 17 may also be referred to as current picture or picture to be coded (in particular in video coding to distinguish the current picture from other pictures, e.g., previously encoded and/or decoded pictures of the same video sequence, i.e., the video sequence which also comprises the current picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e., the picture may be represented or include three sample arrays. In RBG format or color space a picture comprises a corresponding red, green and blue sample array. However, in video coding each pixel is typically represented in a luminance and chrominance format or color space, e.g., YCbCr, which comprises a luminance component indicated by Y (sometimes also L is used instead) and two chrominance components indicated by Cb and Cr. The luminance (or short luma) component Y represents the brightness or grey level intensity (e.g., like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 colour format.

Embodiments of the video encoder 20 may comprise a picture partitioning unit (not depicted in FIG. 2) configured to partition the picture 17 into a plurality of (typically non-overlapping) picture blocks 203. These blocks may also be referred to as root blocks, macro blocks (H.264/AVC) or coding tree blocks (CTB) or coding tree units (CTU) (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17, e.g., one, several or all blocks forming the picture 17. The picture block 203 may also be referred to as current picture block or picture block to be coded.

Like the picture 17, the picture block 203 again is or can be regarded as a two-dimensional array or matrix of samples with intensity values (sample values), although of smaller dimension than the picture 17. In other words, the block 203 may comprise, e.g., one sample array (e.g., a luma array in case of a monochrome picture 17, or a luma or chroma array in case of a color picture) or three sample arrays (e.g., a luma and two chroma arrays in case of a color picture 17) or any other number and/or kind of arrays depending on the color format applied. The number of samples in horizontal and vertical direction (or axis) of the block 203 define the size of block 203. Accordingly, a block may, for example, an M×N (M-column by N-row) array of samples, or an M×N array of transform coefficients.

Embodiments of the video encoder 20 as shown in FIG. 2 may be configured to encode the picture 17 block by block, e.g., the encoding and prediction is performed per block 203.

Embodiments of the video encoder 20 as shown in FIG. 2 may be further configured to partition and/or encode the picture by using slices (also referred to as video slices), wherein a picture may be partitioned into or encoded using one or more slices (typically non-overlapping), and each slice may comprise one or more blocks (e.g., CTUs).

Embodiments of the video encoder 20 as shown in FIG. 2 may be further configured to partition and/or encode the picture by using tile groups (also referred to as video tile groups) and/or tiles (also referred to as video tiles), wherein a picture may be partitioned into or encoded using one or more tile groups (typically non-overlapping), and each tile group may comprise, e.g., one or more blocks (e.g., CTUs) or one or more tiles, wherein each tile, e.g., may be of rectangular shape and may comprise one or more blocks (e.g., CTUs), e.g., complete or fractional blocks.

Residual Calculation

The residual calculation unit 204 may be configured to calculate a residual block 205 (also referred to as residual 205) based on the picture block 203 and a prediction block 265 (further details about the prediction block 265 are provided later), e.g., by subtracting sample values of the prediction block 265 from sample values of the picture block 203, sample by sample (pixel by pixel) to obtain the residual block 205 in the sample domain.

Transform

The transform processing unit 206 may be configured to apply a transform, e.g., a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, etc. Specific scaling factors are, for example, specified for the inverse transform, e.g., by inverse transform processing unit 212 (and the corresponding inverse transform, e.g., by inverse transform processing unit 312 at video decoder 30) and corresponding scaling factors for the forward transform, e.g., by transform processing unit 206, at an encoder 20 may be specified accordingly.

Embodiments of the video encoder 20 (respectively transform processing unit 206) may be configured to output transform parameters, e.g., a type of transform or transforms, e.g., directly or encoded or compressed via the entropy encoding unit 270, so that, e.g., the video decoder 30 may receive and use the transform parameters for decoding.

Quantization

The quantization unit 208 may be configured to quantize the transform coefficients 207 to obtain quantized coefficients 209, e.g., by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit Transform coefficient during quantization, where n is greater than m. The degree of quantization may be modified by adjusting a quantization parameter (QP). For example, for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding and/or the inverse dequantization, e.g., by inverse quantization unit 210, may include multiplication by the quantization step size. Embodiments according to some standards, e.g., HEVC, may be configured to use a quantization parameter to determine the quantization step size. Generally, the quantization step size may be calculated based on a quantization parameter using a fixed-point approximation of an equation including division. Additional scaling factors may be introduced for quantization and dequantization to restore the norm of the residual block, which might get modified because of the scaling used in the fixed-point approximation of the equation for quantization step size and quantization parameter. In one example implementation, the scaling of the inverse transform and dequantization might be combined. Alternatively, customized quantization tables may be used and signaled from an encoder to a decoder, e.g., in a bitstream. The quantization is a lossy operation, wherein the loss increases with increasing quantization step sizes.

Embodiments of the video encoder 20 (respectively quantization unit 208) may be configured to output quantization parameters (QP), e.g., directly or encoded via the entropy encoding unit 270, so that, e.g., the video decoder 30 may receive and apply the quantization parameters for decoding.

Inverse Quantization

The inverse quantization unit 210 is configured to apply the inverse quantization of the quantization unit 208 on the quantized coefficients to obtain dequantized coefficients 211, e.g., by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

Inverse Transform

The inverse transform processing unit 212 is configured to apply the inverse transform of the transform applied by the transform processing unit 206, e.g., an inverse discrete cosine transform (DCT) or inverse discrete sine transform (DST) or other inverse transforms, to obtain a reconstructed residual block 213 (or corresponding dequantized coefficients 213) in the sample domain. The reconstructed residual block 213 may also be referred to as transform block 213.

Reconstruction

The reconstruction unit 214 (e.g., adder or summer 214) is configured to add the transform block 213 (i.e., reconstructed residual block 213) to the prediction block 265 to obtain a reconstructed block 215 in the sample domain, e.g., by adding—sample by sample—the sample values of the reconstructed residual block 213 and the sample values of the prediction block 265.

Filtering

The loop filter unit 220 (or short "loop filter" 220), is configured to filter the reconstructed block 215 to obtain a filtered block 221, or in general, to filter reconstructed samples to obtain filtered samples. The loop filter unit is, e.g., configured to smooth pixel transitions, or otherwise improve the video quality. The loop filter unit 220 may comprise one or more loop filters such as a de-blocking filter, a sample-adaptive offset (SAO) filter or one or more other filters, e.g., a bilateral filter, an adaptive loop filter (ALF), a sharpening, a smoothing filters or a collaborative filters, or any combination thereof. Although the loop filter unit 220 is shown in FIG. 2 as being an in loop filter, in other configurations, the loop filter unit 220 may be implemented as a post loop filter. The filtered block 221 may also be referred to as filtered reconstructed block 221.

Embodiments of the video encoder 20 (respectively loop filter unit 220) may be configured to output loop filter parameters (such as sample adaptive offset information), e.g., directly or encoded via the entropy encoding unit 270, so that, e.g., a decoder 30 may receive and apply the same loop filter parameters or respective loop filters for decoding.

Decoded Picture Buffer

The decoded picture buffer (DPB) 230 may be a memory that stores reference pictures, or in general reference picture data, for encoding video data by video encoder 20. The DPB 230 may be formed by any of a variety of memory devices, such as dynamic random-access memory (DRAM), including synchronous DRAM (SDRAM), magnetoresistive RAM (MRAM), resistive RAM (RRAM), or other types of memory devices. The decoded picture buffer (DPB) 230 may be configured to store one or more filtered blocks 221. The decoded picture buffer 230 may be further configured to store other previously filtered blocks, e.g., previously reconstructed and filtered blocks 221, of the same current picture or of different pictures, e.g., previously reconstructed pictures, and may provide complete previously reconstructed, i.e., decoded, pictures (and corresponding reference blocks and samples) and/or a partially reconstructed current picture (and corresponding reference blocks and samples), for example for inter prediction. The decoded picture buffer (DPB) 230 may be also configured to store one or more unfiltered reconstructed blocks 215, or in general unfiltered reconstructed samples, e.g., if the reconstructed block 215 is not filtered by loop filter unit 220, or any other further processed version of the reconstructed blocks or samples.

Mode Selection (Partitioning & Prediction)

The mode selection unit 260 comprises partitioning unit 262, inter-prediction unit 244 and intra-prediction unit 254, and is configured to receive or obtain original picture data, e.g., an original block 203 (current block 203 of the current picture 17), and reconstructed picture data, e.g., filtered and/or unfiltered reconstructed samples or blocks of the same (current) picture and/or from one or a plurality of previously decoded pictures, e.g., from decoded picture buffer 230 or other buffers (e.g., line buffer, not shown). The reconstructed picture data is used as reference picture data for prediction, e.g., inter-prediction or intra-prediction, to obtain a prediction block 265 or predictor 265.

Mode selection unit 260 may be configured to determine or select a partitioning for a current block prediction mode (including no partitioning) and a prediction mode (e.g., an intra or inter prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g., from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e., select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition the block 203 into smaller block partitions or sub-blocks (which form again blocks), e.g., iteratively using quad-tree-partitioning (QT), binary partitioning (BT) or triple-tree-partitioning (TT) or any combination thereof, and to perform, e.g., the prediction for each of the block partitions or sub-blocks, wherein the mode selection comprises the selection of the tree-structure of the partitioned block 203 and the prediction modes are applied to each of the block partitions or sub-blocks.

In the following the partitioning (e.g., by partitioning unit 260) and prediction processing (by inter-prediction unit 244 and intra-prediction unit 254) performed by an example video encoder 20 will be explained in more detail.

Partitioning

The partitioning unit 262 may partition (or split) a current block 203 into smaller partitions, e.g., smaller blocks of square or rectangular size. These smaller blocks (which may also be referred to as sub-blocks) may be further partitioned into even smaller partitions. This is also referred to tree-partitioning or hierarchical tree-partitioning, wherein a root block, e.g., at root tree-level 0 (hierarchy-level 0, depth 0), may be recursively partitioned, e.g., partitioned into two or more blocks of a next lower tree-level, e.g., nodes at tree-level 1 (hierarchy-level 1, depth 1), wherein these blocks may be again partitioned into two or more blocks of a next lower level, e.g., tree-level 2 (hierarchy-level 2, depth 2), etc. until the partitioning is terminated, e.g., because a termination criterion is fulfilled, e.g., a maximum tree depth or minimum block size is reached. Blocks which are not further partitioned are also referred to as leaf-blocks or leaf nodes of the tree. A tree using partitioning into two partitions is referred to as binary-tree (BT), a tree using partitioning into three partitions is referred to as ternary-tree (TT), and a tree using partitioning into four partitions is referred to as quad-tree (QT).

As mentioned before, the term "block" as used herein may be a portion, in particular a square or rectangular portion, of a picture. With reference, for example, to HEVC and VVC, the block may be or correspond to a coding tree unit (CTU), a coding unit (CU), prediction unit (PU), and transform unit (TU) and/or to the corresponding blocks, e.g., a coding tree block (CTB), a coding block (CB), a transform block (TB) or prediction block (PB).

For example, a coding tree unit (CTU) may be or comprise a CTB of luma samples, two corresponding CTBs of chroma samples of a picture that has three sample arrays, or a CTB of samples of a monochrome picture or a picture that is coded using three separate colour planes and syntax structures used to code the samples. Correspondingly, a coding tree block (CTB) may be an N×N block of samples for some value of N such that the division of a component into CTBs is a partitioning. A coding unit (CU) may be or comprise a coding block of luma samples, two corresponding coding blocks of chroma samples of a picture that has three sample arrays, or a coding block of samples of a monochrome picture or a picture that is coded using three separate colour planes and syntax structures used to code the samples. Correspondingly a coding block (CB) may be an M×N block of samples for some values of M and N such that the division of a CTB into coding blocks is a partitioning.

In embodiments, e.g., according to HEVC, a coding tree unit (CTU) may be split into CUs by using a quad-tree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU.

In embodiments, e.g., according to the latest video coding standard currently in development, which is referred to as Versatile Video Coding (VVC), a combined Quad-tree and binary tree (QTBT) partitioning is for example used to partition a coding block. In the QTBT block structure, a CU can have either a square or rectangular shape. For example, a coding tree unit (CTU) is first partitioned by a quadtree structure. The quadtree leaf nodes are further partitioned by a binary tree or ternary (or triple) tree structure. The partitioning tree leaf nodes are called coding units (CUs), and that segmentation is used for prediction and transform processing without any further partitioning. This means that the CU, PU and TU have the same block size in the QTBT coding block structure. In parallel, multiple partition, for example, triple tree partition may be used together with the QTBT block structure.

In one example, the mode selection unit 260 of video encoder 20 may be configured to perform any combination of the partitioning techniques described herein.

As described above, the video encoder 20 is configured to determine or select the best or an optimum prediction mode from a set of (e.g., pre-determined) prediction modes. The set of prediction modes may comprise, e.g., intra-prediction modes and/or inter-prediction modes.

Intra-Prediction

The set of intra-prediction modes may comprise 35 different intra-prediction modes, e.g., non-directional modes like DC (or mean) mode and planar mode, or directional modes, e.g., as defined in HEVC, or may comprise 67 different intra-prediction modes, e.g., non-directional modes like DC (or mean) mode and planar mode, or directional modes, e.g., as defined for VVC.

The intra-prediction unit 254 is configured to use reconstructed samples of neighboring blocks of the same current picture to generate an intra-prediction block 265 according to an intra-prediction mode of the set of intra-prediction modes.

The intra prediction unit 254 (or in general the mode selection unit 260) is further configured to output intra-prediction parameters (or in general information indicative of the selected intra prediction mode for the block) to the entropy encoding unit 270 in form of syntax elements 266 for inclusion into the encoded picture data 21, so that, e.g., the video decoder 30 may receive and use the prediction parameters for decoding.

Inter-Prediction

The set of (or possible) inter-prediction modes depends on the available reference pictures (i.e., previous at least partially decoded pictures, e.g., stored in DBP 230) and other inter-prediction parameters, e.g., whether the whole reference picture or only a part, e.g., a search window area around the area of the current block, of the reference picture is used for searching for a best matching reference block, and/or e.g., whether pixel interpolation is applied, e.g., half/semi-pel and/or quarter-pel interpolation, or not.

Additional to the above prediction modes, skip mode and/or direct mode may be applied.

The inter prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, e.g., reconstructed blocks of one or a plurality of other/different previously decoded pictures 231, for motion estimation. E.g., a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter prediction parameters to the motion estimation unit. This offset is also called motion vector (MV).

The motion compensation unit is configured to obtain, e.g., receive, an inter prediction parameter and to perform inter prediction based on or using the inter prediction parameter to obtain an inter prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

The motion compensation unit may also generate syntax elements associated with the blocks and video slices for use by video decoder 30 in decoding the picture blocks of the video slice. In addition, or as an alternative to slices and respective syntax elements, tile groups and/or tiles and respective syntax elements may be generated or used.

Entropy Coding

The entropy encoding unit 270 is configured to apply, for example, an entropy encoding algorithm or scheme (e.g., a variable length coding (VLC) scheme, an context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients 209, inter prediction parameters, intra prediction parameters, loop filter parameters and/or other syntax elements to obtain encoded picture data 21 which can be output via the output 272, e.g., in the form of an encoded bitstream 21, so that, e.g., the video decoder 30 may receive and use the parameters for decoding. The encoded bitstream 21 may be transmitted to video decoder 30, or stored in a memory for later transmission or retrieval by video decoder 30.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

Decoder and Decoding Method

FIG. 3 shows an example of a video decoder 30 that is configured to implement the techniques of this present application. The video decoder 30 is configured to receive encoded picture data 21 (e.g., encoded bitstream 21), e.g., encoded by encoder 20, to obtain a decoded picture 331. The encoded picture data or bitstream comprises information for decoding the encoded picture data, e.g., data that represents picture blocks of an encoded video slice (and/or tile groups or tiles) and associated syntax elements.

In the example of FIG. 3, the decoder 30 comprises an entropy decoding unit 304, an inverse quantization unit 310, an inverse transform processing unit 312, a reconstruction unit 314 (e.g., a summer 314), a loop filter 320, a decoded picture buffer (DBP) 330, a mode application unit 360, an inter prediction unit 344 and an intra prediction unit 354. Inter prediction unit 344 may be or include a motion compensation unit. Video decoder 30 may, in some examples, perform a decoding pass generally reciprocal to the encoding pass described with respect to video encoder 100 from FIG. 2.

As explained with regard to the encoder 20, the inverse quantization unit 210, the inverse transform processing unit 212, the reconstruction unit 214 the loop filter 220, the decoded picture buffer (DPB) 230, the inter prediction unit 344 and the intra prediction unit 354 are also referred to as forming the "built-in decoder" of video encoder 20. Accordingly, the inverse quantization unit 310 may be identical in function to the inverse quantization unit 110, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video encoder apply correspondingly to the respective units and functions of the video decoder 30.

Entropy Decoding

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 3), e.g., any or all of inter prediction parameters (e.g., reference picture index and motion vector), intra prediction parameter (e.g., intra prediction mode or index), transform parameters, quantization parameters, loop filter parameters, and/or other syntax elements. Entropy decoding unit 304 may be configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode application unit 360 and other parameters to other units of the decoder 30. Video decoder 30 may receive the syntax elements at the video slice level and/or the video block level. In addition, or as an alternative to slices and respective syntax elements, tile groups and/or tiles and respective syntax elements may be received and/or used.

Inverse Quantization

The inverse quantization unit 310 may be configured to receive quantization parameters (QP) (or in general information related to the inverse quantization) and quantized coefficients from the encoded picture data 21 (e.g., by parsing and/or decoding, e.g., by entropy decoding unit 304) and to apply based on the quantization parameters an inverse quantization on the decoded quantized coefficients 309 to obtain dequantized coefficients 311, which may also be referred to as transform coefficients 311. The inverse quantization process may include use of a quantization parameter determined by video encoder 20 for each video block in the video slice (or tile or tile group) to determine a degree of quantization and, likewise, a degree of inverse quantization that should be applied.

Inverse Transform

Inverse transform processing unit 312 may be configured to receive dequantized coefficients 311, also referred to as transform coefficients 311, and to apply a transform to the dequantized coefficients 311 in order to obtain reconstructed residual blocks 213 in the sample domain. The reconstructed residual blocks 213 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g., by parsing and/or decoding, e.g., by entropy decoding unit 304) to determine the transform to be applied to the dequantized coefficients 311.

Reconstruction

The reconstruction unit 314 (e.g., adder or summer 314) may be configured to add the reconstructed residual block 313, to the prediction block 365 to obtain a reconstructed block 315 in the sample domain, e.g., by adding the sample values of the reconstructed residual block 313 and the sample values of the prediction block 365.

Filtering

The loop filter unit 320 (either in the coding loop or after the coding loop) is configured to filter the reconstructed block 315 to obtain a filtered block 321, e.g., to smooth pixel transitions, or otherwise improve the video quality. The loop filter unit 320 may comprise one or more loop filters such as a de-blocking filter, a sample-adaptive offset (SAO) filter or one or more other filters, e.g., a bilateral filter, an adaptive loop filter (ALF), a sharpening, a smoothing filter or a collaborative filters, or any combination thereof. Although the loop filter unit 320 is shown in FIG. 3 as being an in loop filter, in other configurations, the loop filter unit 320 may be implemented as a post loop filter.

Decoded Picture Buffer

The decoded video blocks 321 of a picture are then stored in decoded picture buffer 330, which stores the decoded pictures 331 as reference pictures for subsequent motion compensation for other pictures and/or for output respectively display.

The decoder 30 is configured to output the decoded picture 311, e.g., via output 312, for presentation or viewing to a user.

Prediction

The inter prediction unit 344 may be identical to the inter prediction unit 244 (in particular to the motion compensation unit) and the intra prediction unit 354 may be identical to the inter prediction unit 254 in function, and performs split or partitioning decisions and prediction based on the partitioning and/or prediction parameters or respective information received from the encoded picture data 21 (e.g., by parsing and/or decoding, e.g., by entropy decoding unit 304). Mode application unit 360 may be configured to perform the prediction (intra or inter prediction) per block based on reconstructed pictures, blocks or respective samples (filtered or unfiltered) to obtain the prediction block 365.

When the video slice is coded as an intra coded (I) slice, intra prediction unit 354 of mode application unit 360 is configured to generate prediction block 365 for a picture block of the current video slice based on a signaled intra prediction mode and data from previously decoded blocks of the current picture. When the video picture is coded as an inter coded (i.e., B, or P) slice, inter prediction unit 344 (e.g., motion compensation unit) of mode application unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330. The same or similar may be applied for or by embodiments using tile groups (e.g., video tile groups) and/or tiles (e.g., video tiles) in addition or alternatively to slices (e.g., video slices), e.g., a video may be coded using I, P or B tile groups and/or tiles.

Mode application unit 360 is configured to determine the prediction information for a video block of the current video slice by parsing the motion vectors or related information and other syntax elements, and uses the prediction information to produce the prediction blocks for the current video block being decoded. For example, the mode application unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice. The same or similar may be applied for or by embodiments using tile groups (e.g., video tile groups) and/or tiles (e.g., video tiles) in addition or alternatively to slices (e.g., video slices), e.g., a video may be coded using I, P or B tile groups and/or tiles.

Embodiments of the video decoder 30 as shown in FIG. 3 may be configured to partition and/or decode the picture by using slices (also referred to as video slices), wherein a picture may be partitioned into or decoded using one or more slices (typically non-overlapping), and each slice may comprise one or more blocks (e.g., CTUs).

Embodiments of the video decoder 30 as shown in FIG. 3 may be configured to partition and/or decode the picture by using tile groups (also referred to as video tile groups) and/or tiles (also referred to as video tiles), wherein a picture may be partitioned into or decoded using one or more tile groups (typically non-overlapping), and each tile group may comprise, e.g., one or more blocks (e.g., CTUs) or one or more tiles, wherein each tile, e.g., may be of rectangular shape and may comprise one or more blocks (e.g., CTUs), e.g., complete or fractional blocks.

Other variations of the video decoder 30 can be used to decode the encoded picture data 21. For example, the decoder 30 can produce the output video stream without the loop filtering unit 320. For example, a non-transform-based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current step may be further processed and then output to the next step. For example, after interpolation filtering, motion vector derivation or loop filtering, a further operation, such as Clip or shift, may be performed on the processing result of the interpolation filtering, motion vector derivation or loop filtering.

It should be noted that further operations may be applied to the derived motion vectors of current block (including but not limit to control point motion vectors of affine mode, sub-block motion vectors in affine, planar, ATMVP modes, temporal motion vectors, and so on). For example, the value of motion vector is constrained to a predefined range according to its representing bit. If the representing bit of motion vector is bitDepth, then the range is $-2^{(bitDepth-1)} \sim 2^{(bitDepth-1)}-1$, where "^" means exponentiation. For example, if bitDepth is set equal to 16, the range is −32768~32767; if bitDepth is set equal to 18, the range is −131072~131071. For example, the value of the derived motion vector (e.g., the MVs of four 4×4 sub-blocks within one 8×8 block) is constrained such that the max difference between integer parts of the four 4×4 sub-block MVs is no more than N pixels, such as no more than 1 pixel. Here provides two methods for constraining the motion vector according to the bitDepth.

Method 1: remove the overflow MSB (most significant bit) by flowing operations $$\text{i. } ux = (mvx + 2^{bitDepth})\%2^{bitDepth} \qquad (1)$$

$$\text{ii. } mvx = (ux >= 2^{bitDepth-1})?(ux - 2^{bitDepth}):ux \qquad (2)$$

$$\text{iii. } uy = (mvy + 2^{bitDepth})\%2^{bitDepth} \qquad (3)$$

$$\text{iv. } mvy = (uy >= 2^{bitDepth-1})?(uy - 2^{bitDepth}):uy \qquad (4)$$

where mvx is a horizontal component of a motion vector of an image block or a sub-block, mvy is a vertical component of a motion vector of an image block or a sub-block, and ux and uy indicates an intermediate value;

For example, if the value of mvx is −32769, after applying formula (1) and (2), the resulting value is 32767. In computer system, decimal numbers are stored as two's complement. The two's complement of −32769 is 1,0111,1111,1111,1111 (17 bits), then the MSB is discarded, so the resulting two's complement is 0111,1111,1111,1111 (decimal number is 32767), which is same as the output by applying formula (1) and (2).

$$\text{v. } ux = (mvpx + mvdx + 2^{bitDepth})\%2^{bitDepth} \qquad (5)$$

$$\text{vi. } mvx = (ux >= 2^{bitDepth-1})?(ux - 2^{bitDepth}):ux \qquad (6)$$

$$\text{vii. } uy = (mvpy + 2^{bitDepth})\%2^{bitDepth} \qquad (7)$$

$$\text{viii. } mvy = (uy >= 2^{bitDepth-1})?(uy - 2^{bitDepth}):uy \qquad (8)$$

The operations may be applied during the sum of mvp and mvd, as shown in formula (5) to (8).

Method 2: remove the overflow MSB by clipping the value

1. $vx = Clip3(-2^{bitDepth-1}, 2^{bitDepth-1} - 1, vx)$

2. $vy = Clip3(-2^{bitDepth-1}, 2^{bitDepth-1} - 1, vy)$ where vx is a horizontal component of a motion vector of an image block or a sub-block, vy is a vertical component of a motion vector of an image block or a sub-block; x, y and z respectively correspond to three input value of the MV clipping process, and the definition of function Clip3 is as follow:

$$\text{ii. } Clip3(x, y, z) = \begin{cases} x; & z < x \\ y; & z > y \\ z; & \text{otherwise} \end{cases}$$

Figure 4:
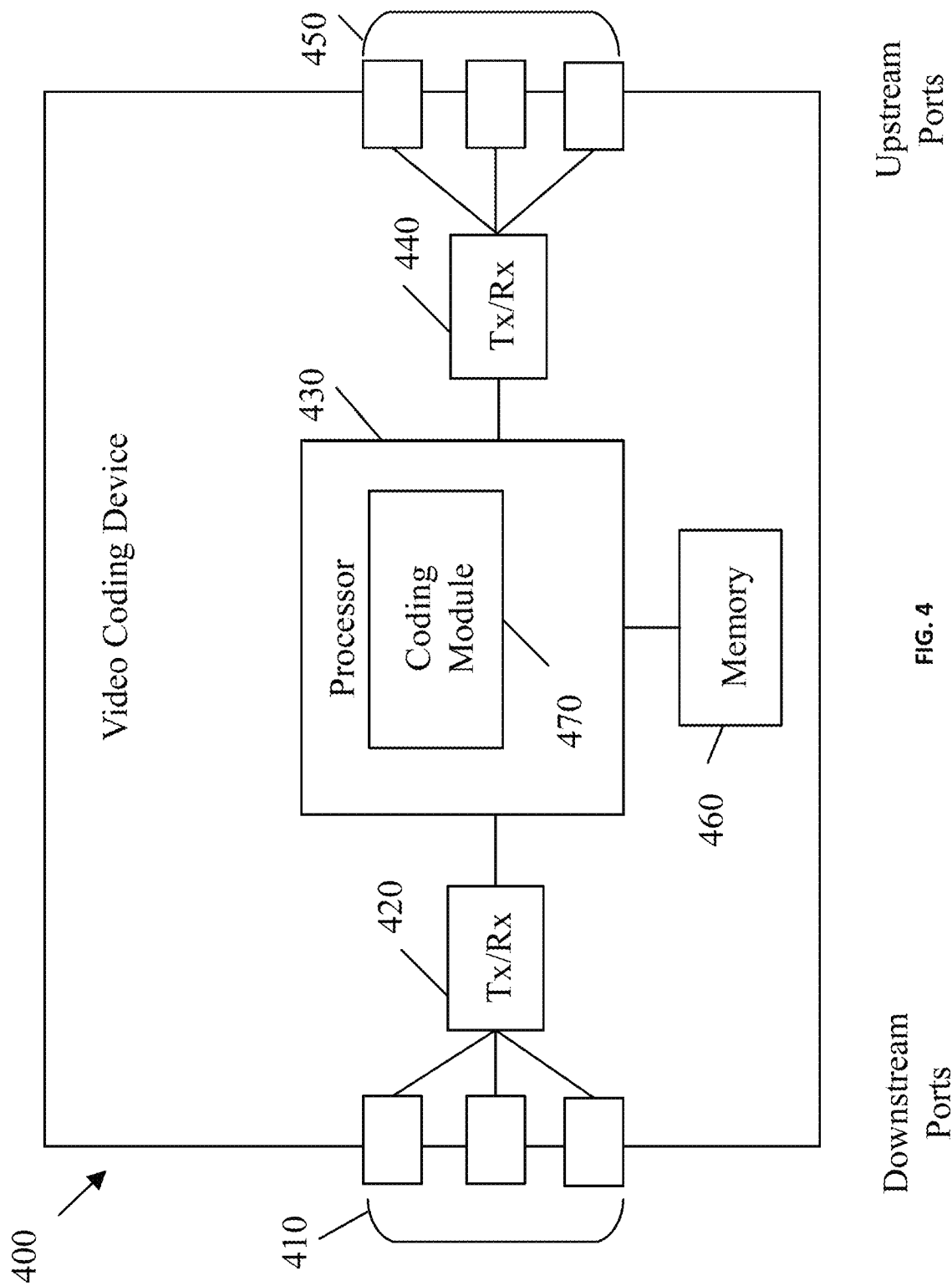
FIG. 4 is a block diagram illustrating an example of an encoding apparatus or a decoding apparatus.

FIG. 4 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A.

The video coding device 400 comprises ingress ports 410 (or input ports 410) and receiver units (Rx) 420 for receiving data; a processor, logic unit, or central processing unit (CPU) 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

Figure 5:
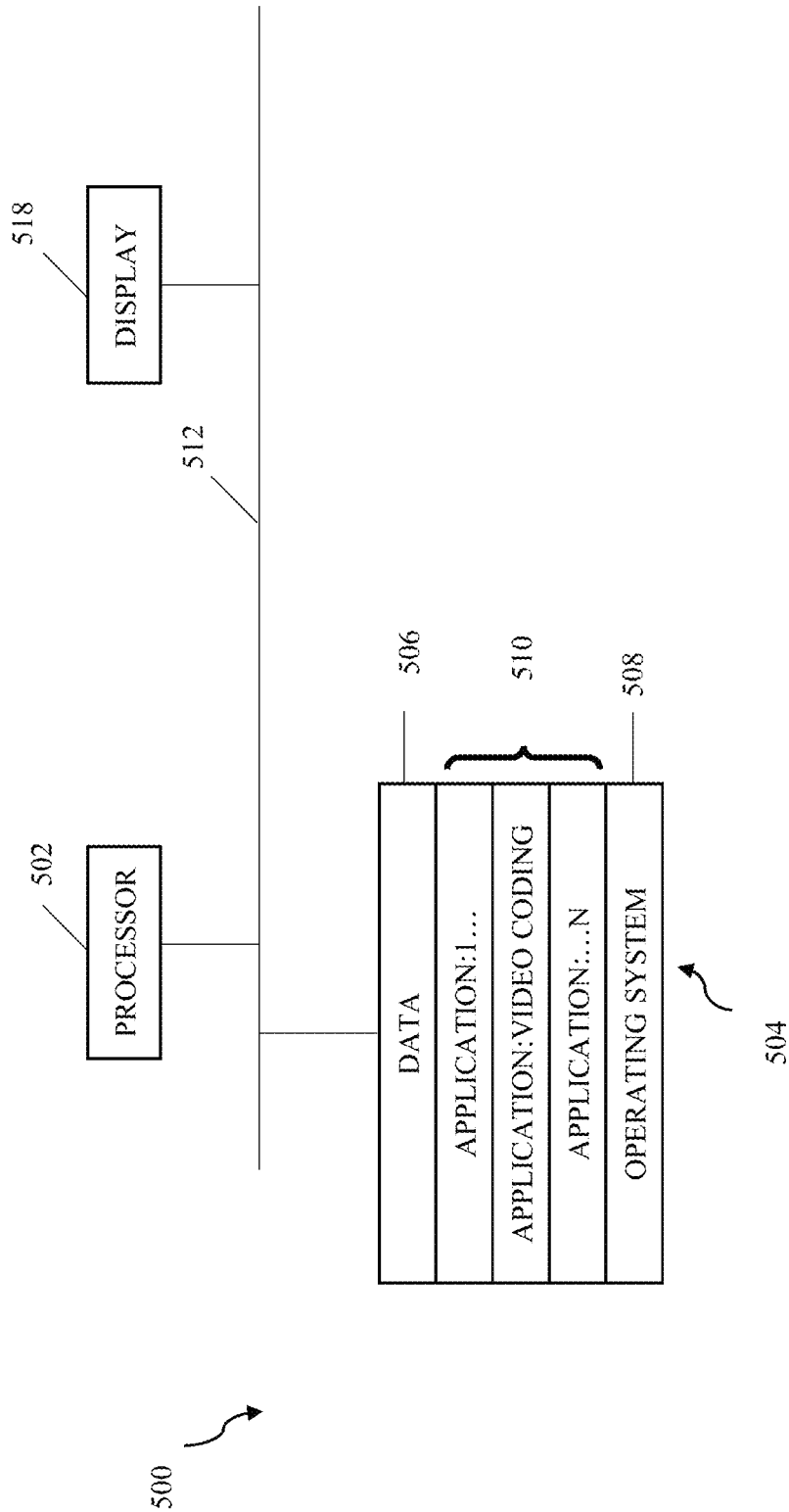
FIG. 5 is a block diagram illustrating another example of an encoding apparatus or a decoding apparatus.

FIG. 5 is a simplified block diagram of an apparatus 500 that may be used as either or both of the source device 12 and the destination device 14 from FIG. 1 according to an exemplary embodiment.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random-access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

High Level Signaling (HLS)

The high-level syntax provides the encapsulation for the coded video data for further processing. It structures the information for transport and makes it accessible and also searchable. It further provides means to code all specified high-level parameters and additional side information. In order to separate between the encoded information and the form in which this information is represented, a Video Coding Layer (VCL) and a Network Abstraction Layer (NAL) are defined. All VCL and non-VCL data are encapsulated in NAL units for transmission. These concepts are further detailed below. The high-level syntax scheme is conceptually inherited from H.265|HEVC and H.264 AVC with some revisions and extensions to match modified requirements and enable improved functionality.

Timing in HEVC

As part of the effort to separate different types of information to different and independent parts of the bitstream, the concept of time is an important aspect. Generally, information on the precise timing of pictures is not needed in the decoding process for the pictures, as the parameters for prediction do not necessarily relate to time. As an example, the distance between pictures is important for appropriate scaling of motion vector predictors. However, the expression of the distance does not need to relate to the actual picture rate. The distance can be expressed by the picture order count which indicates the play-out order of the decoded pictures.

While not required in the decoding process itself, timing information is of utmost importance for correct play-out of the pictures for display. This includes the play-out at a specified picture rate or synchronization with other information, specifically audio which is associated with the video signal. Furthermore, timing information is required for control of the coded and decoded picture buffers. Therefore, the timing information is not ignored but rather separated from the coded video data.

While some applications require a constant picture rate for display, other applications may treat the timing of pictures differently. For example, conversational applications may focus on a low delay between capture and display while a constant picture rate may be less important. Other special applications may code pictures at variable time distances, depending on the application needs. As a consequence, timing is classified as video usability information. If not present, the pictures can still be decoded conforming to the normative decoding process. If timing information is present, a normative interpretation is specified to enable correct play-out timing and buffer operation as indicated above.

Temporal Coding Structures

A video of a given number of pictures may be partitioned into one or multiple coded video sequences (CVS). Each CVS can be decoded independently from other coded video sequences that may be contained in the same bitstream. The output order of the pictures is the order in which the pictures have been generated (e.g., recorded or rendered), and in which the pictures should be output for display to resemble the picture order of the original input sequence for the intended visual impression. In the specification, the output order is represented by the picture order count (POC), which uniquely identifies a picture within the coded video sequence. Note that POC distance between two successive pictures does not need to be constant throughout the CVS. It is only required to be strictly increasing along the output order.

The coding order specifies the order in which pictures are reconstructed at the decoder, and thereby defines which pictures may be used for reference. Obviously, only previously decoded picture can be referred to for prediction. The dependencies between the pictures determine the coding structure of the coded video sequence. The coding structure comprises a consecutive set of pictures in the sequence with a specific coding order and defined dependencies between the included pictures. The full video sequence may be represented by periodic repetition of this coding structure. The set of pictures that is comprised in the coding structure is often called a Group Of Pictures (GOP). In the context of the HEVC specification, this set is called a Structure of Pictures (SOP).

Sometimes, the first picture of a GOP in coding order is referred to as the anchor picture or key picture of the GOP. Note that these terms as well as the term Group of Pictures are not used in the specification. They are however commonly used in literature for description of such coding structures.

Figure 6:
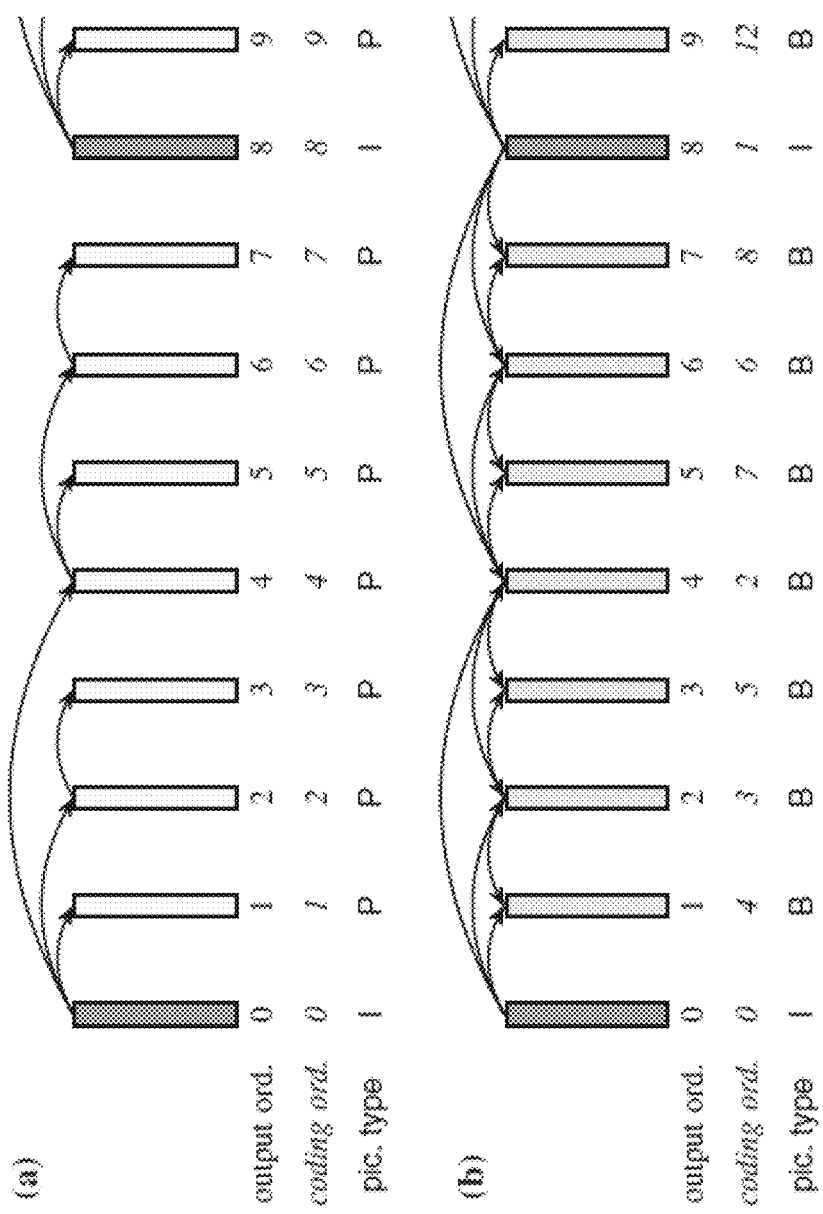
FIG. 6 Examples for coding structures with different output order and coding order.

FIG. 6 illustrates examples for coding structures with different output order and coding order. FIG. 6a shows a hierarchical-P coding structure (coding order=output order). FIG. 6b shows a hierarchical-B coding structure (coding order_=output order).

Thus, in FIG. 6, two example coding structures with different coding order and output order are provided. Both coding structures have a GOP size of eight pictures, with the key pictures of the GOP marked in dark grey. FIG. 6a shows a coding structure where all pictures of the GOP are predicted from past encoded pictures (all arrows from prediction reference to prediction target are directed towards future pictures).

Since there is no dependency from any coded picture to a future picture in output order, the coding order of the pictures in fact corresponds to the output order, i.e., the order in which the pictures should be displayed. In the given example, each picture uses a single reference picture for prediction. Prediction from a single reference is called uni-prediction. Historically, such pictures are called P pictures. The coding structure further exhibits a certain hierarchy of the pictures. For example, the pictures with odd output numbers may be dropped without impacting the decodability of the other pictures. The coding structure of the other pictures is independent of these pictures. Similarly, every fourth picture can be decoded without impact from the intermediate pictures with even output numbers. Such a structure is called a hierarchical coding structure. In the given example using only P pictures, the coding structure is referred to as a hierarchical-P structure. It should be noted that uni-prediction of course may refer to a reference picture list including more than one reference picture for prediction. Still, for each block, only one reference picture can be used.

FIG. 6b provides an example for a coding structure with prediction arrows from past pictures as well as from future pictures. For this coding structure, the coding order is different from the output order, i.e., some pictures need to be stored until they are to be output. This induces the structural delay described earlier. Coding structures with references from the past and the future are typically used with bi-prediction, where the prediction for a picture is formed by the combination of two references. Such pictures are referred to as 'B pictures'. Like the P picture example, the presented structure exhibits a prediction hierarchy where the prediction dependencies are nested such that certain pictures may be dropped without impacting the decodability of the other pictures. Such a structure is called a 'hierarchical-B' coding structure.

There may be prediction relations between consecutive GOPs of a coding structure. An example for such prediction dependencies is the structure shown in FIG. 6a. Such a structure is called an Open-GOP coding structure: Pictures of one GOP reference pictures from a different GOP. Structures that omit inter-dependencies between consecutive GOPs are called Closed-GOP coding structures. An example for such a coding structure is illustrated in FIG. 6b. The structure shown here comprises I pictures (intra-only coded), P pictures, and B pictures and has been similarly used for encoding in H.262 MPEG-2 or MPEG-4 Visual.

The HEVC specification includes an SEI message (supplemental enhancement information) on the 'structure of pictures' which can be used by the encoder to describe the used GOP structure, including the corresponding picture types, the applicable reference picture sets, and the temporal relation between the pictures in the GOP.

Figure 7:
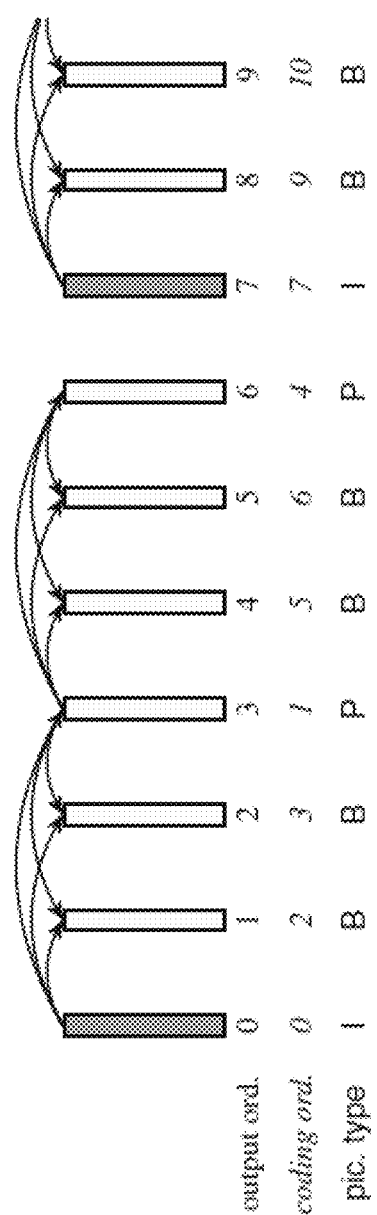
FIG. 7 Examples of a Closed-GOP structure.

FIG. 7 illustrates a closed-GOP structure. Here, an I picture is followed by two P pictures with two associated B pictures each (IBBPBBP structure)

Figure 8:
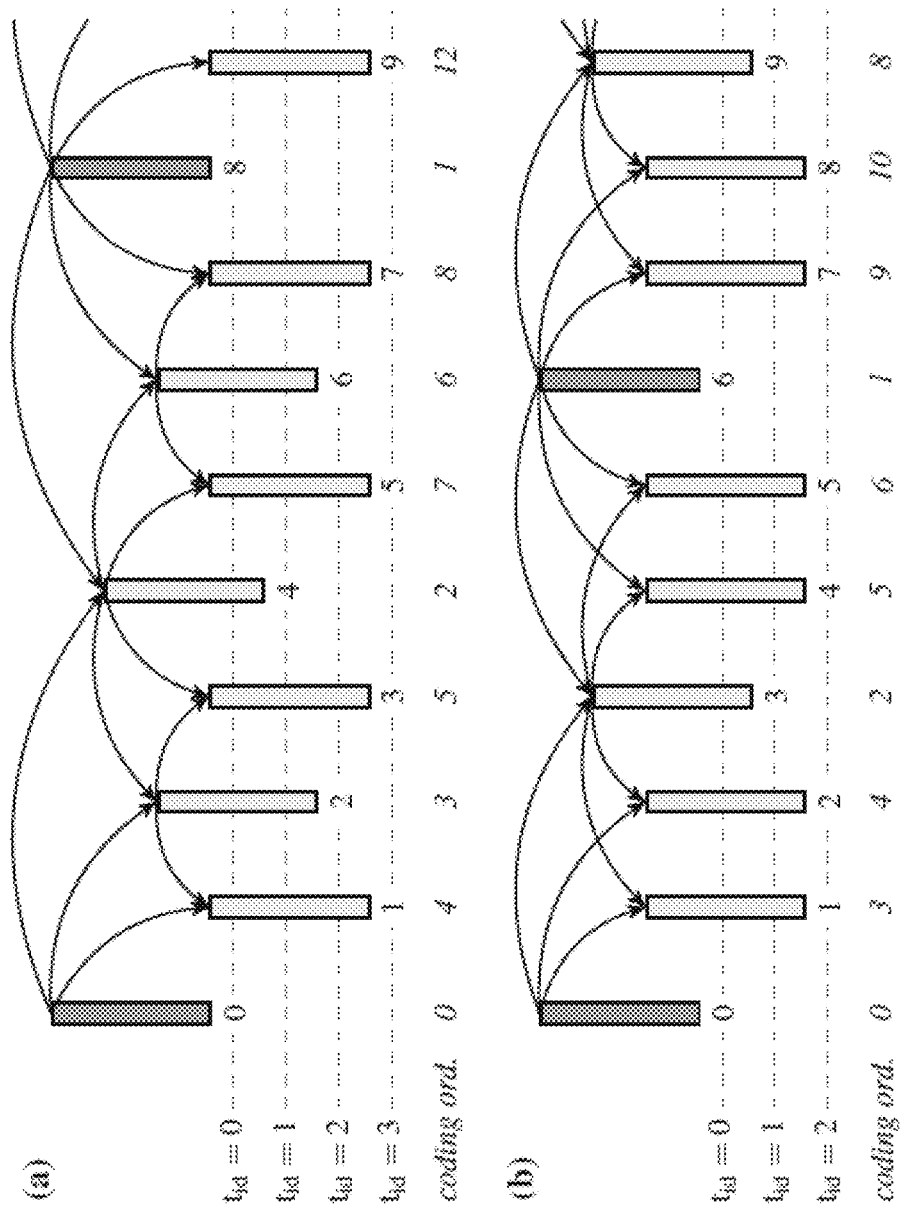
FIG. 8 Examples for temporal layers with dyadic and non-dyadic temporal nesting.

FIG. 8 has two sub figures, FIG. 8a and FIG. 8b. FIG. 8a illustrates a hierarchical-B coding structure with a dyadic temporal nesting and four temporal layers. FIG. 8b) illustrates a hierarchical-B coding structure with a non-dyadic temporal nesting and three temporal layers The coding structures in FIG. 8a are examples for dyadic hierarchical structures as the dependencies are dyadic. Hierarchical structures do not need to be dyadic but can also comprise other dependencies, see e.g., FIG. 8b.

Temporal Layers

In VVC, a temporal layer concept very similar to the temporal layer concept for temporal scalability in H.265/HEVC and in H.264/AVC Annex G [4, 5] is available in the base specification. Each picture has an associated temporal level identifier TID. Random access pictures are specified to always have TID=0. With the concept of temporal layers, extracting a coded video sequence of lower temporal resolution from a given video sequence can be simply achieved by discarding all NAL units with TID larger than a selected value.

Furthermore, the feature of temporal nesting can be indicated in the VPS and SPS. If temporal nesting is indicated, pictures with lower TID must not refer to a picture with higher or equal TID for prediction within a GOP. Further, with temporal nesting activated it is always possible to switch the decoding from a lower temporal level to a higher temporal level (i.e., switching to a higher temporal resolution, starting from any decoded picture at the lower temporal resolution).

Examples for coding structures with temporal nesting are shown in FIG. 8. In this presentation, the pictures are vertically arranged according to their temporal layer to ease the identification of the prediction relations. Since there is no dependency of pictures with lower TID to pictures with higher TID, decoding can be switched between the temporal layers at any picture. e.g., the coding structure in FIG. 8a enables switching between 60, 30, 15, and 7.5 Hz, while the structure in FIG. 8b enables 60, 20, and 10 Hz output rate.

Sequence Parameter Set semantics sps_video_parameter_set_id specifies the value of the vps_video_parameter_set_id of the active VPS.

sps_max_sub_layers_minus1 plus 1 specifies the maximum number of temporal sub-layers that may be present in each CVS referring to the SPS. The value of sps_max_sub_layers_minus1 shall be in the range of 0 to 6, inclusive.

sps_temporal_id_nesting_flag, when sps_max_sub_layers_minus1 is greater than 0, specifies whether inter prediction is additionally restricted for CVSs referring to the SPS. When vps_temporal_id_nesting_flag is equal to 1, sps_temporal_id_nesting_flag shall be equal to 1. When sps_max_sub_layers_minus1 is equal to 0, sps_temporal_id_nesting_flag shall be equal to 1.

NOTE 1—The syntax element sps_temporal_id_nesting_flag is used to indicate that temporal up-switching, i.e., switching from decoding up to any TemporalId tIdN to decoding up to any TemporalId tIdM that is greater than tIdN, is always possible in the CVS.

General Decoding Process

Input to this process is a bitstream. Output of this process is a list of decoded pictures.

The decoding process is specified such that all decoders that conform to a specified profile and level will produce numerically identical cropped decoded output pictures when invoking the decoding process associated with that profile for a bitstream conforming to that profile and level. Any decoding process that produces identical cropped decoded output pictures to those produced by the process described herein (with the correct output order or output timing, as specified) conforms to the decoding process requirements of this Specification.

For each CVS in the bitstream, the list TargetLayerIdList, which identifies the list of target layers to be decoded, and the variable HighestTid, which identifies the highest temporal sub-layer to be decoded, are specified as follows:

If some external means, not specified in this Specification, is available to set TargetLayerIdList, TargetLayerIdList is set by the external means.

Otherwise, if vps_all_independent_layers_flag is equal to 1, TargetLayerIdList is set to contain only vps_layer_id [0].

Otherwise, TargetLayerIdList is set to contain vps_layer_id[i] for i in the range of 0 to vps_max_layers_minus1, inclusive.

If some external means, not specified in this Specification, is available to set HighestTid, HighestTid is set by the external means.

Otherwise, HighestTid is set equal to sps_max_sub_layers_minus1.

The variable DecodingUnitHrdFlag is specified as follows:

If the decoding process is invoked in a bitstream conformance test as specified in clause C.1, DecodingUnitHrdFlag is set as specified in clause C.1.

Otherwise, DecodingUnitHrdFlag is set equal to decoding_unit_hrd_params_present_flag.

For each CVS in the bitstream, the sub-bitstream extraction process as specified in clause 10 is applied with the CVS, TargetLayerIdList, and HighestTid as inputs, and the output is assigned to a bitstream referred to as CvsToDecode. After that, the instances of CvsToDecode of all the CVSs are concatenated, in decoding order, and the result is assigned to the bitstream BitstreamToDecode.

Video Usability Information

The Video Usability Information (VUI) syntax structure collects information that is useful for preparing the decoded video for output and display. The VUI can be sent as part of the SPS, but can also be passed to the decoder by other means (e.g., hard coded or by out-of-band transmission).

The information contained in the VUI is not required by the decoding process itself. The decoding process generates the sample values of the reconstructed pictures and determines the order in which the pictures are output. The VUI provides the possibility to signal information like the sample aspect ratio (i.e., the shape of the samples), the original color space and representation of the encoded video, or, as another very important aspect, picture timing information. The different parts of the VUI are briefly described in the following subsections. The inclusion of each of the parts in the VUI syntax structure is optional and can be decided as required by the application. Default values are specified for all VUI parameters for cases where the corresponding VUI parameters have not been provided.

A.1.1 VUI Parameters Syntax

|  | Descriptor |
|---|---|
| vui_parameters( ) { |  |
|   aspect_ratio_info_present_flag | u(1) |
|   ... |  |
|   vui_timing_info_present_flag | u(1) |
|   if( vui_timing_info_present_flag ) { |  |
|     vui_num_units_in_tick | u(32) |
|     vui_time_scale | u(32) |
|     vui_poc_proportional_to_timing_flag | u(1) |
|     if( vui_poc_proportional_to_timing_flag) |  |
|       vui_num_ticks_poc_diff_one_minus1 | ue(v) |
|     vui_hrd_parameters_present_flag | u(1) |
|     if( vui_hrd_parameters_present_flag) |  |
|       hrd_parameters( 1, |  |
|       sps_max_sub_layers_minus1 ) |  |
|   } |  |
|   ... |  |
| } |  | vui_timing_info_present_flag equal to 1 specifies that vui_num_units_in_tick, vui_time_scale, vui_poc_proportional_to_timing_flag, and vui_hrd_parameters_present_flag are present in the vui_parameters( ) syntax structure. vui_timing_info_present_flag equal to 0 specifies that vui_num_units_in_tick, vui_time_scale, vui_poc_proportional_to_timing_flag, and vui_hrd_parameters_present_flag are not present in the vui_parameters( ) syntax structure.

vui_num_units_in_tick is the number of time units of a clock operating at the frequency vui_time_scale Hz that corresponds to one increment (called a clock tick) of a clock tick counter. vui_num_units_in_tick shall be greater than 0. A clock tick, in units of seconds, is equal to the quotient of vui_num_units_in_tick divided by vui_time_scale. For example, when the picture rate of a video signal is 25 Hz, vui_time_scale may be equal to 27 000 000 and vui_num_units_in_tick may be equal to 1 080 000, and consequently a clock tick may be equal to 0.04 seconds.

When vps_num_units_in_tick is present in the VPS referred to by the SPS, vui_num_units_in_tick, when present, shall be equal to vps_num_units_in_tick.

vui_time_scale is the number of time units that pass in one second. For example, a time coordinate system that measures time using a 27 MHz clock has a vui_time_scale of 27 000 000. The value of vui_time_scale shall be greater than 0.

When vps_time_scale is present in the VPS referred to by the SPS, vui_time_scale, when present, shall be equal to vps_time_scale.

vui_poc_proportional_to_timing_flag equal to 1 indicates that the picture order count value for each picture in the CVS that is not the first picture in the CVS, in decoding order, is proportional to the output time of the picture relative to the output time of the first picture in the CVS. vui_poc_proportional_to_timing_flag equal to 0 indicates that the picture order count value for each picture in the CVS that is not the first picture in the CVS, in decoding order, may or may not be proportional to the output time of the picture relative to the output time of the first picture in the CVS.

When vps_poc_proportional_to_timing_flag is present in the VPS referred to by the SPS and the value is equal to 1, vui_poc_proportional_to_timing_flag, when present, shall be equal to 1.

vui_num_ticks_poc_diff_one_minus1 plus 1 specifies the number of clock ticks corresponding to a difference of picture order count values equal to 1. The value of vui_num_ticks_poc_diff_one_minus1 shall be in the range of 0 to $2^{32}-2$, inclusive.

When vps_num_ticks_poc_diff_one_minus1 is present in the VPS referred to by the SPS, vui_num_ticks_poc_diff_one_minus1, when present, shall be equal to sps_num_ticks_poc_diff_one_minus1.

Supplemental Enhancement Information

Supplemental Enhancement Information (SEI) messages contain information which is not required for the decoding process and the reconstruction of the coded video sequence. SEI messages may be helpful though for the decoder to determine certain features of the coded video sequence that otherwise might be complicated to be derived. Further information e.g., regarding display of the sequence or additional side information that shall be attached and integrated into the coded bitstream for transport can be encoded into specific SEI messages. Dedicated SEI messages can further be of help for error recovery or for testing of the picture integrity. SEI messages are classified either as prefix SEI messages or as suffix SEI messages, indicating if the SEI must occur before the last VCL NAL unit or after the first VCL NAL unit in the access unit, respectively.

Besides the distinction between prefix and suffix SEI messages, the concept of SEI messages has been inherited from H.264 AVC. A subset of the SEI messages specified in H.264 AVC have also been specified for HEVC. The payload types indices of these identical SEI messages are synchronized between the two specifications in order to avoid confusion. Some H.264 AVC SEI messages have not been considered useful in the context of HEVC and are therefore no longer provided in the specification.

An overview of the SEI messages specified in HEVC is provided in Table 5.2 for the prefix SEI messages and in Table 5.3 for the suffix SEI messages. Note that some SEI messages can be sent either as a prefix or as a suffix SEI message. The SEI messages have a specified persistence that indicates for which NAL units the information contained in the SEI message is valid. The persistence is indicated in Tables 5.2 and 5.3 as well. Many SEI messages persist for the access unit they are coded in. Others may persist for the whole coded video sequence or until an update is provided by a new SEI message of the same payload type. Multiple SEI messages can be contained in an SEI message NAL unit. Each SEI message is identified by an SEI payload type index and an SEI payload size, where an SEI message always consists of an integer number of bytes. Tables 5.2 and 5.3 include a brief characterization of the functionality provided by each SEI message.

TABLE 1

Related SEI messages

| Payload type | SEI message | Summary |
|---|---|---|
| 1 | Picture timing | Indication of coded and decoded picture buffer delay. Applies to the associated AU |
| 128 | Structure of pictures information | Describes the coding structure including used reference picture set for a SOP. Persists for the AUs associated to the SOP |
| 131 | Temporal sub-layer zero index | Detection of loss of pictures with tid = 0, including unique identification of IRAP pictures. Applies to the associated AU |
| 133 | Scalable nesting | Wraps other SEI messages which are dedicated to a specified layer or temporal sub-layer. Persistence depends on included SEI messages |

Picture Timing SEI Message Syntax

| | Descriptor |
|---|---|
| pic_timing( payloadSize ) { | |
|   if( frame_field_info_present_flag ) { | |
|     pic_struct | u(4) |
|     source_scan_type | u(2) |
|     duplicate_flag | u(1) |
|   } | |
|   if( CpbDpbDelaysPresentFlag ) { | |
|     au_cpb_removal_delay_minus1 | u(v) |
|     pic_dpb_output_delay | u(v) |
|     if( sub_pic_hrd_params_present_flag) | |
|       pic_dpb_output_du_delay | u(v) |
|     if( sub_pic_hrd_params_present_flag && | |
|       sub_pic_cpb_params_in_pic_timing_sei_flag ) { | |
|       num_decoding_units_minus1 | ue(v) |
|       du_common_cpb_removal_delay_flag | u(1) |
|       if( du_common_cpb_removal_delay_flag ) | |
|         du_common_cpb_removal_delay_increment_minus1 | u(v) |
|       for( i = 0; i <= num_decoding_units_minus1; i++ ) { | |
|         num_nalus_in_du_minus1[ i ] | ue(v) |
|         if( !du_common_cpb_removal_delay_flag && i < num_decoding_units_minus1 ) | |
|           du_cpb_removal_delay_increment_minus1[ i ] | u(v) |
|       } | |
|     } | |
|   } | |
| } | |

Picture Timing SEI Message Semantics

The picture timing SEI message provides CPB removal delay and DPB output delay information for the access unit associated with the SEI message.

The following applies for the picture timing SEI message syntax and semantics:

The syntax elements and variable sub_pic_hrd_params_present_flag, sub_pic_cpb_params_in_pic_timing_sei_flag, au_cpb_removal_delay_length_minus1, dpb_output_delay_length_minus1, dpb_output_delay_du_length_minus1, du_cpb_removal_delay_increment_length_minus1, and CpbDpbDelaysPresentFlag are found in or derived from syntax elements found in the hrd_parameters( ) syntax structure that is applicable to at least one of the operation points to which the picture timing SEI message applies.

The bitstream (or a part thereof) refers to the bitstream subset (or a part thereof) associated with any of the operation points to which the picture timing SEI message applies.

The presence of picture timing SEI messages for an operation point is specified as follows:

If frame_field_info_present_flag is equal to 1 or CpbDpb-DelaysPresentFlag is equal to 1, a picture timing SEI message applicable to the operation point shall be associated with every access unit in the CVS.

Otherwise, in the CVS there shall be no access unit that is associated with a picture timing SEI message applicable to the operation point.

pic_struct indicates whether a picture should be displayed as a frame or as one or more fields . . .

au_cpb_removal_delay_minus1 plus 1 specifies the number clock ticks between the nominal CPB removal time of the access unit associated with the picture timing SEI message and the preceding access unit in decoding order that contained a buffering period SEI message. This value is also used to calculate an earliest possible time of arrival of access unit data into the CPB for the HSS. The syntax element is a fixed length code whose length in bits is given by au_cpb_removal_delay_length_minus1+1.

NOTE 6—The value of au_cpb_removal_delay_length_minus1 that determines the length (in bits) of the syntax element au_cpb_removal_delay_minus1 is the value of au_cpb_removal_delay_length_minus1 coded in the VPS or the SPS that is active for the coded picture associated with the picture timing SEI message, although au_cpb_removal_delay_minus1 specifies a number of clock ticks relative to the removal time of the preceding access unit containing a buffering period SEI message, which may be an access unit of a different CVS.

The variable AuCpbRemovalDelayMsb of the current picture is derived as follows: If the current picture is associated with a buffering period SEI message that is applicable to at least one of the operation points to which the picture timing SEI message applies, AuCpbRemovalDelayMsb is set equal to 0.

Otherwise, the following applies:

Let maxCpbRemovalDelay be equal to $2^{au\_cpb\_removal\_delay\_length\_minus1+1}$.

Let prevAuCpbRemovalDelayMinus1 and prevAuCpbRemovalDelayMsb be set equal to au_cpb_removal_delay_minus1 and AuCpbRemovalDelayMsb, respectively, of the previous picture in decoding order that has TemporalId equal to 0, that is not a RASL, RADL or sub-layer non-reference picture, and that is within the same buffering period as the current picture.

AuCpbRemovalDelayMsb is derived as follows:

$$\text{if (au\_cpb\_removal\_delay\_minus1} <= \quad\quad\quad\quad \text{(D-1)}$$
$$prevAuCpbRemovalDelayMinus1)$$
$$AuCpbRemovalDelayMsv =$$
$$prevAuCpbRemovalDelayMsb + \max CpbRemovalDelay$$
$$\text{else } AuCpbRemovalDelayMsb = prevAuCpbRemovalDelayMsb$$

The variable AuCpbRemovalDelayVal is derived as follows:

$$AuCpbRemovalDelayVal = \quad\quad\quad\quad \text{(D-2)}$$
$$AuCpbRemovalDelayMsb + au\_cpb\_removal\_delay\_minus1 + 1$$

The value of AuCpbRemovalDelayVal shall be in the range of 1 to $2^{32}$, inclusive. Within one buffering period, the AuCpbRemovalDelayVal values for any two access units shall not be the same.

pic_dpb_output_delay is used to compute the DPB output time of the picture when SubPicHrdFlag is equal to 0. It specifies how many clock ticks to wait after removal of the last decoding unit in an access unit from the CPB before the decoded picture is output from the DPB.

NOTE 7—A picture is not removed from the DPB at its output time when it is still marked as "used for short-term reference" or "used for long-term reference".

The length of the syntax element pic_dpb_output_delay is given in bits by dpb_output_delay_length_minus1+1. When sps_max_dec_pic_buffering_minus1[minTid] is equal to 0, where minTid is the minimum of the OpTid values of all operation points the picture timing SEI message applies to, pic_dpb_output_delay shall be equal to 0.

The output time derived from the pic_dpb_output_delay of any picture that is output from an output timing conforming decoder shall precede the output time derived from the pic_dpb_output_delay of all pictures in any subsequent CVS in decoding order.

The picture output order established by the values of this syntax element shall be the same order as established by the values of PicOrderCntVal.

For pictures that are not output by the "bumping" process because they precede, in decoding order, an IRAP picture with NoRaslOutputFlag equal to 1 that has no_output_of_prior_pics_flag equal to 1 or inferred to be equal to 1, the output times derived from pic_dpb_output_delay shall be increasing with increasing value of PicOrderCntVal relative to all pictures within the same CVS.

pic_dpb_output_du_delay is used to compute the DPB output time of the picture when SubPicHrdFlag is equal to 1. It specifies how many sub clock ticks to wait after removal of the last decoding unit in an access unit from the CPB before the decoded picture is output from the DPB.

The length of the syntax element pic_dpb_output_du_delay is given in bits by dpb_output_delay_du_length_minus1+1.

The output time derived from the pic_dpb_output_du_delay of any picture that is output from an output timing conforming decoder shall precede the output time derived from the pic_dpb_output_du_delay of all pictures in any subsequent CVS in decoding order.

The picture output order established by the values of this syntax element shall be the same order as established by the values of PicOrderCntVal.

For pictures that are not output by the "bumping" process because they precede, in decoding order, an IRAP picture with NoRaslOutputFlag equal to 1 that has no_output_of_prior_pics_flag equal to 1 or inferred to be equal to 1, the output times derived from pic_dpb_output_du_delay shall be increasing with increasing value of PicOrderCntVal relative to all pictures within the same CVS.

For any two pictures in the CVS, the difference between the output times of the two pictures when SubPicHrdFlag is equal to 1 shall be identical to the same difference when SubPicHrdFlag is equal to 0.

Structure of Pictures Information SEI Message Syntax

| | Descriptor |
|---|---|
| structure_of_pictures_info( payloadSize ) { | |
|   sop_seq_parameter_set_id | ue(v) |
|   num_entries_in_sop_minus1 | ue(v) |
|   for( i = 0; i <= num_entries_in_sop_minus1; i++ ) { | |
|     sop_vcl_nut[ i ] | u(6) |
|     sop_temporal_id[ i ] | u(3) |
|     if( sop_vcl_nut[ i ] != IDR_W_RADL && sop_vcl_nut[ i ] != IDR_N_LP ) | |
|       sop_short_term_rps_idx[ i ] | ue(v) |
|     if( i > 0) | |
|       sop_poc_delta [ i ] | se(v) |
|   } | |
| } | |

Persistence information for SEI messages is informatively summarized in Table 2.

TABLE 2

Persistence scope of related SEI messages (informative)

| SEI message | Persistence scope |
|---|---|
| Picture timing | The access unit containing the SEI message |
| Structure of pictures information | The set of access units in the CVS that correspond to entries listed in the SEI message |
| Temporal sub-layer zero index | The access unit containing the SEI message |
| Scalable nesting | Depending on the nested SEI messages. Each nested SEI message has the same persistence scope as if the SEI message was not nested |

Hypothetical Reference Decoder (HRD)

When compressing digital video, the encoder usually attempts to maintain the image quality nearly uniform throughout the video sequence, since drops or changes in video quality result in poor viewing experiences. To achieve this, the encoder must assign more bits to video frames or segments that are more difficult to compress (e.g., those that contain more textured regions or faster motion) and fewer bits to easier video segments, and as a result the encoding bit rate may vary significantly over time. Since compressed digital video is often transmitted through channels of (nearly) constant bit rate, the bit-rate variations need to be smoothed using buffering mechanisms at the encoder and decoder. The sizes of the physical buffers are finite, and hence the encoder must constrain the bit-rate variations to fit within the buffer limitations. Video coding standards do not mandate specific encoder or decoder buffering mechanisms, but they require encoders to control bit-rate fluctuations so that a hypothetical reference decoder (HRD) of a given buffer size would decode the video bit stream without suffering from buffer overflow or underflow. This hypothetical decoder is based on an idealized decoder model that decoder manufacturers can use as a reference for their implementations, but its main goal is to impose basic buffering constraints on the bit-rate variations of compliant bit streams.

An HRD usually assumes that the decoding and display times preserve some pre-defined constraints, such as a fixed frame rate, and the system's end-to-end delay is constant (e.g., for broadcast applications).

High Efficiency Coding and Media Delivery in Heterogeneous Environments—Part 1: MPEG Media Transport (MMT)

File Format

Media Processing Unit Box

Definition

Box Type: 'mmpu'
Container: File
Mandatory: Yes
Quantity: One or more

Media Processing Unit Box ('mmpu') is placed in front of one or more movie fragments to indicate the boundary of an MPU and to provide additional information on the movie fragments. The integer number of consecutive movie fragments following an 'mmpu' box before the next 'mmpu' box belong to the preceding 'mmpu' box. The 'mmpu' box provides information about the media data in the movie fragments for packetization to adopt the constraints of the underlying delivery layer's packet size. It also defines an additional structure of media data that is robust to adaptive elimination of certain MFU depending on network condition so that the MPU after elimination can be correctly processed at the MMT receiving entity.

The 'mmpu' box provides the mapping information of MFUs into AU in case the media data is logically encapsulated with MFU. An AU is a sample in movie fragment, if the MMT Package is instantiated with ISO/IEC 14496-12. The au_sequence_number in MFU structure of 'mmpu' box starts with 0 for each MPU and refers to a sample in the order of the sequence number as described in all movie fragments of a corresponding MPU. Besides the mapping of AU and MFU, all AU information such as duration of AU is provided by Track Run Box in movie fragment.

Syntax

```
aligned(8) class MediaTypeInformationBox extends Box('mtib'){
unsigned int(32) number_of_media_type;
{
    MediaTypeEntry(format);
}[ number_of_media_type ]
} aligned(8) abstract class MediaTypeEntry(unsigned int(32) format)
extends Box(format){
unsigned int(32) mime_type;
unsigned int(32) length;
}
```

```
    class       InitializationInformationMediaTypeEntry( )     extends
MediaTypeEntry('parm'){
    bit(8*length) initialization_data;
}
    class FileMediaTypeEntry( ) extends MediaTypeEntry('file'){
    string file_name;
    unsigned int(32) file_size;
    unsigned int(32) CRC;
}
    aligned(8) class multiLayerInfo extends Box('muli'){
    bit(1)      reserved1;
    bit(3)      dependency_id;
    bit(1)      reserved2;
    bit(3)      temporal_id;
    bit(4)      quality_id;
    bit(2)      reserved3;
    bit(6)      priority_id;
    bit(2)      reserved4;
    bit(10)     view_id;
}
...
}
```

Semantics number_of_media_type—specifies the number of media type in a MPU.

mime type—is MIME type of media that MediaTypeEntry describes.

initialization data—is data to be used to initialize media decoder to consume this MPU. All required information to correctly handle AUs in MPU shall be carried in initialization_data. For example, in case the AU is video, all required decoder configuration information to correctly decode AUs in MPU is carried in InitializationInfo.

priority_id—is priority ID of this MFU. The usage of priority id is defined by the application.

dependency id—is dependency ID of this MFU. If it is non-zero value then it enhances the video by one or more scalability levels in at least one direction (temporal, quality or spatial resolution).

quality_id—is quality ID of this MFU. If it is non-zero value then it enhances the video by one or more scalability levels in at least one direction (temporal, quality or spatial resolution).

temporal_id—is temporal ID of this MFU. If it is non-zero value then it enhances the video by one or more scalability levels in at least one direction (temporal, quality or spatial resolution).

view id—is view ID of this MFU. If it is non-zero value then it enhances the video by one or more scalability levels in at least one direction (temporal, quality or spatial resolution).

default_media_type_id—specifies ID of MediaTypeEntry that all MFUs in MPU refer.

media_type_id—specifies ID of MediaTypeEntry of each AU.

dependency_counter—indicates that the MFU is required to decode but may be discarded. The value of this field is equal to the number of subsequent MFUs in the order of mfu_sequence_number which may not be correctly decoded. For example, if the value of this field is equal to 3, then 3 subsequent MFUs may not be correctly decoded.

priority—is priority of MFU among MFUs in an MPU.

has_mfu—indicates whether this MPU has MFU and its structure or not.

is_complete—indicates whether this MPU has all MFUs described by MFU structure or not.

has_timed_media—indicates whether this MPU has timed media and its structure or not.

au_sequence_number—specifies the sequential number of an AU to which the MFU containing this field belongs within the MPU.

mpu_sequence_number—specifies the sequence number of MPU in a single MMT Asset. It is incremented by 1 and will be unique within in an MMT Asset.

size_of_mpu—specifies the size of MPU that this 'mmpu' describes.

Cross Layer Information

Top-Down QoS Information

Application layer provides top-down QoS information about media characteristics to underlying layers. There are two kinds of top-down information such as MMT Asset level information and packet level information. MMT Asset information is used for capability exchange and/or (re)allocation of resources in underlying layers. Packet level top-down information is written in appropriate field of every packet for underlying layers to identify QoS level to support.

Bottom-Up QoS Information

The underlying layers provide bottom-up QoS information to the application layer. The underlying layers provides information about time-varying network condition, which enables faster and more accurate QoS control in the application layer. Bottom-up information is represented as an abstracted fashion to support heterogeneous network environments. These parameters are measured in the underlying layers and read by the application layer, periodically or on request of the MMT application.

Syntax

The syntax of absolute parameters for NAM is shown in Table 17.

TABLE 17

Absolute NAM structure

| Syntax | size (bits) | Type |
| --- | --- | --- |
| Network Abstraction for Media information { | | |
| CLI_id | 8 | unsigned integer |
| available_bitrate | 32 | float |
| buffer_fullness | 32 | float |
| peak_bitrate | 32 | float |
| current_delay | 32 | float |
| SDU_size | 32 | unsigned integer |
| SDU_loss ratio | 8 | unsigned integer |
| generation_time | 32 | float |
| BER | 32 | float |
| } | | |

The syntax of relative parameters for NAM is shown in Table 18.

TABLE 18

Relative NAM structure

| Syntax | size (bits) | Type |
| --- | --- | --- |
| relative_difference Network Abstraction for Media information ( ) { | | |
| CLI_id | 8 | unsigned integer |
| relative_bitrate | 8 | float |
| relative_buffer_fullness | 8 | float |
| relative_peak_bitrate | 8 | float |

TABLE 18-continued

Relative NAM structure

| Syntax | size (bits) | Type |
|---|---|---|
| current_delay | 32 | float |
| generation_time | 32 | float |
| BER | 32 | float |
| } | | |

Semantics

CLI_id—The CLI_id is an arbitrary integer number to identify this NAM among the underlying network.

available_bitrate—the available_bitrate is bitrate that the scheduler of the underlying network can guarantee to the MMT stream. The available_bitrate is expressed in kilobits per second. Overhead for the protocols of the underlying network is not included.

buffer_fullness—the buffer is used to absorb excess bitrate higher than the available_bitrate. The buffer_fullness is expressed in bytes.

peak_bitrate—the peak_bitrate is maximum allowable bitrate that the underlying network can assign to the MMT stream. The peak_bitrate is expressed in kilobits per second. Overhead for the protocols of the underlying network is not included.

current_delay—the current_delay parameter indicates the last hop transport delay. The current delay expressed in milliseconds.

SDU_size—SDU (Service Data Unit) is data unit in which the underlying network delivers the MMT data. The SDU_size specifies the length of the SDU and is expressed in bits. Overhead for the protocols of the underlying network is not included.

SDU_loss_rate—The SDU_loss_ratio is fraction of SDUs lost or detected as erroneous. Loss ratio of MMT packets can be calculated as a function of SDU_loss_ratio and SDU_size. The SDU_loss_ratio is expressed in percentile.

generation_time—The time when the parameters are generated. The generation_time is expressed in milliseconds.

relative_bitrate—the available_bitrate change ratio (%) between the current NAM and the previous NAM information.

relative_buffert_fullness—the remaing buffer_fullness change ratio (%) between the current NAM and the previous NAM information.

relative_peak_bitrate—the peak_bitrate change ratio (%) between the current NAM and the previous NAM information.

BER—Bit Error Rate obtained from PHY or MAC layer. For BER from PHY layer, this value present as a positive value. For BER from MAC layer, this value present as a negative value which can be used as an absolute value.

Carriage of NAL Unit Structured Video in the ISO Base Media File Format

In the family of file formats there are some parts that are 'building blocks'; primary among them is the ISO Base Media File Format. Another important building block specifies how streams conforming to a set of video standards are stored in file formats that are based on the ISO Base Media File Format. These video standards are, in turn, based on a common structuring concept: the Network Adaptation Layer Unit, or NAL unit. The two standards in question are:

Advanced Video Coding; this includes not only AVC but also Scalable Video Coding (SVC) and Multi-view Video Coding (MVC)

High Efficiency Video Coding

This building block was previously called the AVC File Format, but is now called "Carriage of NAL unit structured video in the ISO Base Media File Format".

The definitions in this specification are not intended for stand-alone use. Rather, they specify how AVC streams are stored in any file of the ISO base media file format family, such as MP4 [2].

Common Characteristics

These video streams are a sequence of access units, divided into NAL units. Each access unit is a file format sample, and the access units have a size indication in front of each one. That length indication can be configured as 1, 2 or 4 bytes. Start codes are not used.

For each kind of stream, there is provision for 'setup information' in the form of a configuration record in the Sample Entry of the track.

Timing information comes from the structures in the file format; timing information embedded in the video layer is not used.

Similarly, random access points are defined relative to the video frame types and marked using the file format structures. When parameter sets are stored in-stream, what constitutes a random-access point depends not only on the video frame type but also on the availability at that point in the stream of the parameter sets needed.

When parameter sets are stored in a separate stream, the two are linked by means of track references.

With SVC and MVC it is possible to store layers (SVC) or views (MVC) in more than one track; special structures called Extractors a can be used under some circumstances to indicate how to 'complete' a track by drawing NAL units from other track(s). There is a structure similar to an Extractor, called an Aggregator, which can be used to group NAL units.

A temporal meta-data track may be associated with a video track, to describe the structure of each access unit in the desired level of detail. These temporal meta-data tracks make 'statements' about the time-parallel access unit, or part of an access unit, to which they are linked.

All these formats can use the full feature set of the ISO Base Media File Format, including the use of Movie Fragments and segmented files, annotation with sample groups, and so on.

Shutter Angle

Shutter angle is a term and parameter of cinematic art that indicates shutter interval relative to frame interval. The concept and use of shutter angle was developed in the cinema industry where content has historically been created at fixed 24 fps. In cinema, shutter angle is an indicator of motion smoothness and picture sharpness. Small values of shutter angle (short shutter interval) are associated with more stutter and non-smooth motion but sharp pictures. Large values of shutter angle (long shutter interval) are associated with smooth but blurrier pictures as a result of temporal summation (motion blur).

In the fixed frame rate cinematic use case, shutter angle and shutter interval are equivalent and the interpretation of shutter angle values is well understood. However, for frame rates different than 24 fps, the interpretation of shutter angle values is not as well established. In such cases, shutter interval provides a more direct indicator of motion blur, whilst the shutter interval relative to displayed frame rate provides an indicator of motion smoothness.

Shutter Interval and Shutter Angle

Shutter interval typically indicates the amount of time that an image sensor was exposed to produce a picture; but it may also be applied to non-camera-captured content such as screen capture content and computer-generated content.

Shutter interval affects the amount motion blur (temporal summation) in video. Short shutter interval results in less motion blur and thus sharper images. Long shutter interval results in more motion blur and thus blurrier images in the direction of motion.

Shutter interval relative to frame interval (the inverse of frame rate) affects the smoothness of perceived motion, and is analogous to shutter angle:

$$shutter\_angle = 360 * frame\_rate * shutter\ interval$$

Short shutter interval relative to frame interval (small value of shutter angle) results in more stutter and non-smooth perceived motion compared to long shutter interval relative to frame interval (large value for shutter angle), particularly for low frame rates.

Shutter interval, as an independent parameter, and shutter interval relative to frame interval (shutter angle) are parameters that are used purposefully to adjust the look of video, particularly for professionally created content.

When original content is encoded, the coded picture rate may be different than the original frame rate. Consequently, the shutter interval relative to the coded picture interval (inverse of coded picture rate) would be different than the shutter interval relative to the original frame interval. As a result, the look of the coded video may be different than was originally intended by the content creator.

The effective shutter interval may be artificially modified by a display or other post-decode process to affect the look of displayed video. For example, synthetic motion blur may be increased or decreased to achieve a desired look.

The current Draft Rec. ITU-T H.SEI|Draft ISO/IEC 23002-7 specification does not provide means of signalling shutter interval information to displays or other post-decode processes designed to achieve a desired look of displayed video. SEI message was proposed to signal shutter interval information associated with content prior to encoding to enable receivers of coded video adjust the look of displayed video.

Figure 10:
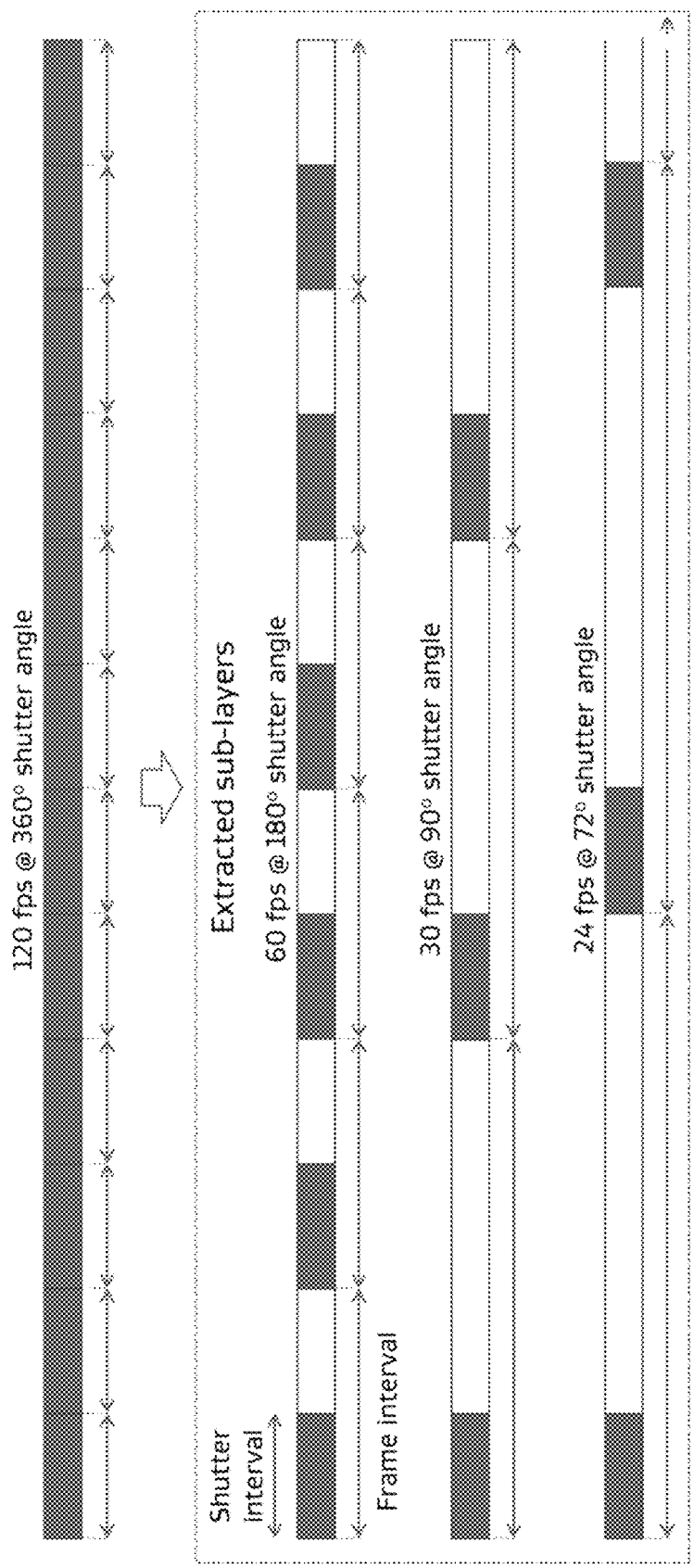
FIG. 10 Illustration of using temporal sub-layers to extract bitstreams at various picture rates.

With the support of temporal sub-layers the bitstreams could be extracted at multiple picture rates. For example, as illustrated in FIG. 10, a 60 Hz video sequence can be derived from a 120 Hz progressive video sequence by dropping every other picture. Similarly, a 30 Hz video sequence can be derived by dropping 3 out of every 4 pictures, and a 24 Hz video sequence can be derived by dropping 4 out of every 5 pictures.

In the example illustrated in FIG. 10, the shutter interval is independent of the picture rate of the extracted bitstream. However, the shutter interval relative to the picture interval (the shutter angle) of each of the resulting videos (24, 30, 60, and 120 Hz) would be different and may thus result in a different look. For example, motion in the 24 fps (24 Hz) video would have more stutter and be less smooth than the 120 Hz video.

As noted in JVET-M0579, the fidelity of extracted temporal sub-layers to the visual look of the original video sequence, including the smoothness of motion and amount of motion blur, is an important component of meeting quality expectations in broadcast use cases, including those that use temporal sub-layering as specified in ATSC 3.0.

Figure 11:
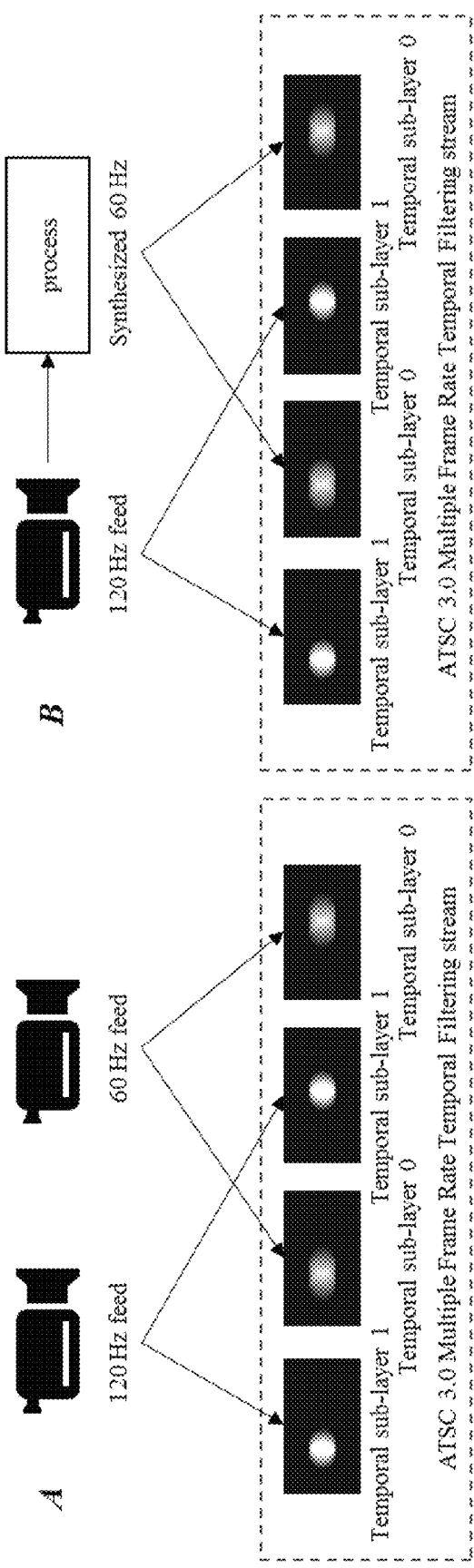
FIG. 11 Two examples of creating an ATSC 3.0 Multiple Frame Rate Temporal Filtering stream.

JVET-M0579 also discusses the ATSC 3.0 Multiple Frame Rate Temporal Filtering Tool to support both high and low frame rates in a backward-compatible manner whilst avoiding stutter and non-smooth motion. The key concepts of the ATSC tool are illustrated in FIG. 11, which are based on the ATSC 3.0 specification. As an example, to create an ATSC 3.0 Multiple Frame Rate Temporal Filtering stream, temporal sub-layer 0 may be composed of pictures having a long shutter interval and temporal sub-layer 1 may be composed of pictures having a short shutter interval. Temporal sub-layers 0 and 1 may be sourced from different camera feeds (FIG. 2, panel A) or sub-layer 0 may be synthesized from the high frame rate camera feed (panel B).

The current Draft Rec. ITU-T H.SEI|Draft ISO/IEC 23002-7 specification does not provide shutter interval information to displays or other post-decode processes to facilitate achieving a consistent or other desired look for different extracted temporal sub-layers.

By providing shutter interval information, a display or other post decoding process that also had access to frame rate information (or equivalent) could simulate a longer or shorter shutter interval using synthetic motion blur or other method. For example, a display might add motion blur in the 24 Hz example to reduce stutter and non-smooth motion.

To enable shutter interval information to be signalled, two variations of new syntax and semantics are provided below:
1) indicate that shutter interval values are the same or different for different temporal sub-layers; and,
2) signal one shutter interval value if all sub-layers have the same shutter angle, or signal one shutter interval value for each temporal sub-layer.

Variant 1

Shutter interval information SEI message syntax (variant 1)

TABLE 1

Shutter interval information SEI message syntax (variant 1)

| | Descriptor |
|---|---|
| shutter_interval_information ( payloadSize ) { | |
|   sii_num_units_in_shutter_interval | u(32) |
|   sii_time_scale | u(32) |
|   fixed_shutter_interval_within_cvs_flag | u(1) |
|   if ( !fixed_shutter_interval_within_cvs_flag ) | |
|     for( i = 0; i <= sps_max_sub_layers minus1; i++) { | |
|       sub_layer_shutter_interval_numer[ i ] | u(16) |
|       sub_layer_shutter_interval_denom[ i ] | u(16) |
|     } | |
| } | |

7.3.x Shutter Interval Information SEI Message Semantics (Variant 1)

The shutter interval information SEI message indicates the shutter interval for the associated video content prior to encoding and display—e.g., for camera-captured content, the amount of time that an image sensor was exposed to produce a picture.

sii_num_units_in_shutter_interval specifies the number of time units of a clock operating at the frequency sii_time_scale Hz that corresponds to one increment of an shutter clock tick counter. Shutter interval, defined by variable ShutterInterval, in units of seconds, is equal to the quotient of sii_num_units_in_shutter_interval divided by sii_time_scale. For example, when ShutterInterval is equal to 0.04 seconds, sii_time_scale may be equal to 27 000 000 and sii_num_units_in_shutter_interval may be equal to 1 080 000.

sii_time_scale specifies the number of time units that pass in one second. For example, a time coordinate system that measures time using a 27 MHz clock has a sii_time_scale of 27 000 000.

When the value of sii_time_scale is greater than 0, the value of ShutterInterval is specified by:

$$ShutterInterval = sii\_num\_units\_in\_shutter\_interval \div sii\_time\_scale$$

Otherwise (the value of sii_time_scale is equal to 0), ShutterInterval should be interpreted as unknown or unspecified.

NOTE 1—A value of ShutterInterval equal to 0 may indicate that the associated video content contains screen capture content, computer generated content, or another non-camera-capture content.

NOTE 2—A value of ShutterInterval greater than the value of the inverse of the coded picture rate, the coded picture interval, may indicate that the coded picture rate is greater than the picture rate at which the associated video content was created—e.g., when the coded picture rate is 120 Hz and the picture rate of the associated video content prior to encoding and display is 60 Hz. The coded interval for the given temporal sub-layer Tid may be indicated by ClockTick and elemental_duration_in_tc_minus1[Tid]. For example, when fixed_pic_rate_within_cvs_flag[Tid] is equal to 1, picture interval for the given temporal sub-layer Tid, defined by variable PictureInterval[Tid], may be specified by:

$$PictureInterval[Tid] = \\ ClockTick * (elemental\_duration\_in\_tc\_minus[Tid] + 1).$$

fixed_shutter_interval_within_cvs_flag equal to 1 specifies that the value of ShutterInterval is the same for all temporal sub-layers in the CVS. fixed_shutter_interval_within_cvs_flag equal to 0 specifies that value of ShutterInterval may not be the same for all temporal sub-layers in the CVS.

sub_layer_shutter_interval_number[i] specifies the numerator used to derive sub layer shutter interval, defined by variable subLayerShutterInterval[i], in units of seconds, when HighestTid is equal to i.

sub_layer_shutter_interval_denom[i] specifies the denominator used to derive sub layer shutter interval, defined by variable subLayerShutterInterval[i], in units of seconds, when HighestTid is equal to i.

The value of subLayerShutterInterval[i] for HighestTid equal to i is derived as follows. When the value of fixed_shutter_interval_within_cvs_flag is equal to 0 and the value of sub_layer_shutter_interval_denom[i] is greater than 0:

$$subLayerShutterInterval[i] = \\ ShutterInterval * sub\_layer\_shutter\_interval\_number[i] \div \\ sub\_layer\_shutter\_interval\_denom[i]$$

Otherwise (the value of sub_layer_shutter_interval_denom[i] is equal to 0), subLayerShutterInterval[i] should be interpreted as unknown or unspecified. When the value of fixed_shutter_interval_within_cvs_flag is not equal to 0, subLayerShutterInterval[i]=ShutterInterval Variant 2

7.3.x Shutter Interval Information SEI Message Syntax (Variant 2)

TABLE 2

Shutter interval information SEI message syntax (variant 2)

| | Descriptor |
|---|---|
| shutter_interval_information ( payloadSize ) { | |
|   sii_num_units_in_shutter_interval | u(32) |
|   sii_time_scale | u(32) |
|   fixed_shutter_interval_within_cvs_flag | u(1) |
|   if ( !fixed_shutter_interval_within_cvs_flag ) | |
|     for( i = 0; i <= sps_max_sub_layers_minus1; i++ ) { | |
|       sub_layer_num_units_in_shutter_interval[ i ] | u(32) |
|     } | |
| } | |

7.3.x Shutter Interval Information SEI Message Semantics (Variant 2)

The shutter interval information SEI message indicates the shutter interval for the associated video content prior to encoding and display—e.g., for camera-captured content, the amount of time that an image sensor was exposed to produce a picture.

sii_num_units_in_shutter specifies the number of time units of a clock operating at the frequency sii_time_scale Hz that corresponds to one increment of an shutter clock tick counter. Shutter interval, defined by variable ShutterInterval, in units of seconds, is equal to the quotient of sii_num_units_in_shutter_interval divided by sii_time_scale. For example, when ShutterInterval is equal to 0.04 seconds, sii_time_scale may be equal to 27 000 000 and sii_num_units_in_shutter_interval may be equal to 1 080 000.

sii_time_scale specifies the number of time units that pass in one second. For example, a time coordinate system that measures time using a 27 MHz clock has a sii_time_scale of 27 000 000.

When the value of sii_time_scale is greater than 0, the value of ShutterInterval is specified by:

$$ShutterInterval = sii\_num\_units\_in\_shutter\_interval \div sii\_time\_scale$$

Otherwise (the value of sii_time_scale is equal to 0), ShutterInterval should be interpreted as unknown or unspecified.

NOTE 1—A value of ShutterInterval equal to 0 may indicate that the associated video content contain screen capture content, computer generated content, or other non-camera-capture content.

NOTE 2—A value of ShutterInterval greater than the value of the inverse of the coded picture rate, the coded picture interval, may indicate that the coded picture rate is greater than the picture rate at which the associated video content was created—e.g., when the coded picture rate is 120 Hz and the picture rate of the associated video content prior to encoding and display is 60 Hz. The coded picture interval for the given temporal sub-layer Tid may be indicated by ClockTick and elemental_duration_in_tc_minus1 [Tid]. For example, when fixed_pic_rate_within_cvs_flag [Tid] is equal to 1, picture interval for the given temporal sub-layer Tid, defined by variable PictureInterval[Tid], may be specified by:

$$PictureInterval[Tid] = \\ ClockTick * (elemental\_duration\_in\_tc\_minus1[Tid] + 1).$$

fixed_shutter_interval_within_cvs_flag equal to 1 specifies that the value of ShutterInterval is the same for all temporal sub-layers in the CVS. fixed_shutter_interval_within_cvs_flag equal to 0 specifies that value of ShutterInterval may not be the same for all temporal sub-layers in the CVS.

sub_layer_num_units_in_shutter_interval[i] specifies the number of time units of a clock operating at the frequency sii_time_scale Hz that corresponds to one increment of an shutter clock tick counter. Sub layer shutter interval, defined by variable subLayerShutterInterval[i], in units of seconds, when HighestTid is equal to i, is equal to the quotient of sub_layer_num_units_in_shutter_interval[i] divided by sii_time_scale. When the value of fixed_shutter_interval_within_cvs_flag is equal to 0 and the value of sii_time_scale is greater than 0, the value of subLayerShutterInterval[i] is specified by: subLayerShutterInterval[i]= sub_layer_num_units_in_shutter_interval[i] sii_time_scale Otherwise (the value of sii_time_scale is equal to 0), subLayerShutterInterval[i] should be interpreted as unknown or unspecified. When the value of fixed_shutter_interval_within_cvs_flag is not equal to 0, subLayerShutterInterval[i]=ShutterInterval Problem Description Layered (scalable) approach is included to specification in order to provide adaptation to variable channel bandwidth and for error resilience needs. Temporal sub-layers is a part of such approach and only one which supported by VVC draft of specification at the time when this document is written.

Figure 9:
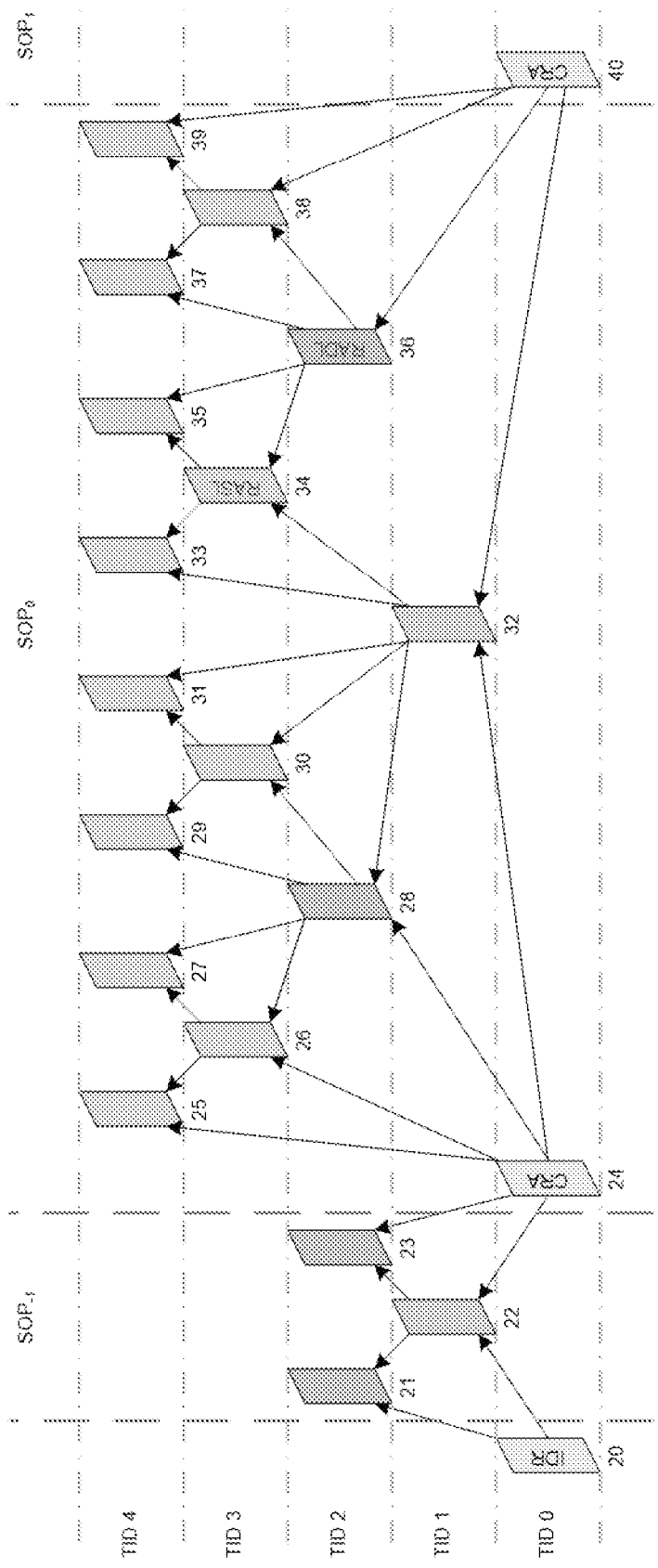
FIG. 9 Switching content for temporal sub-stream extraction.

FIG. 9—Switching content for temporal sub-stream extraction.

Use Cases:
  switching TV channel (broadcasting with unmanaged content)
  Live view with Low Delay (coding on the fly) changed by RA (prepared content)
  switching content with CRA point
  video conference with adaptive GOP structures Imaging: we are switching one GOP structure (or SOP—structure of pictures) by different SOP as depicted on FIG. 9. During transmission server decided to restrict Temporal Layer of $SOP_{-1}$ down to TID=1 (From 60 FPS to 30 FPS). The current $SOP_0$ have an extended GOP structure and if we continue to work within that restrictions (TID=1) then for current $SOP_0$ the frame rate will be dropped down to 7.5 FPS. Such behavior is unexpected by user.

From some cases the value sps_max_sub_layers_minus1 plus 1 could be used for correct derivation of Temporal ID corresponding to target picture rate by using delta between Highest TID of corresponding CVS and target TID, but according to semantic of this parameter some CVS associated to particular SPS could contain highest temporal ID less than sps_max_sub_layers_minus1 plus 1. This means that there are no guarantee for correct recognition of appropriate Temporal ID for our scenario.

In most of the classic scenarios is the dyadic structure of GOP with corresponding temporal layers structure. Such design is supported by simple matching of POC values with corresponding output time delays signalled and derived according to VUI picture timing information with vui_poc_proportional_to_timing_flag equal to one. That means that the number of pictures to decode and pictures to display are the same and POC value of each picture corresponds to appropriate picture output delay/time. The bitstream may include information that only parts of the decoded video are displayed. It may even be indicated that completely decoded pictures are suspended from display (while potentially being used for prediction). In such cases a tricky approach could be used by multiplying POC value for each picture by 2 (or even larger) and in some odd or even position in POC domain pictures could be hided from displaying but used for referencing. This approach leads to increasing of POC values and lead to growing picture rate of the stream (decoding picture rate is different from output/displaying picture rate).

An important aspect of decoder control is the buffer management for the decoded pictures as well as for the incoming bitstream. Decoded pictures in the decoded picture buffer may be further used for reference in the decoding process. Further, in systems that operate at a defined picture rate for presentation, it must be asserted that the decoding process makes the decoded pictures available for display according to the timing constraints imposed by the employed format.

Most of the attention in existing specifications is applied to decoding behavior, namely the sizes of coded picture buffer and decoded picture buffer and corresponding picture output delay (output from the buffer), and constraints which should meet the restrictions of decoder/player capabilities.

There is only one existing solution to guarantee the displaying frame rate for any use case scenarios—it is Picture Timing SEI message which could provide timestamp for each independent picture to be displayed in time. The cost for that is signaling of this SEI message for each independent picture. Moreover, in error prone network such SEI message could be lost. Nevertheless, this mechanism do not provide an ability for decoder to know in advance the resulted picture rate.

Another ability to derive picture rate is Structure of Pictures Information SEI message which describes the coding structure including used reference picture set for a SOP and which persists for the AUs associated to the SOP. This approach is a bit more complicated if we need to inform the decoder about resulted picture rate for the few trailing pictures. Moreover, it requires an additional derivation process from the data available in this SEI message. Moreover, this SEI message needs to be transmitted for each individual SOP and can't guarantee the resulted frame rate for some appropriate period of time. The application/player is required to be smart enough to control appropriate temporal ID for each SOP (like picture rate control).

Another example when Temporal ID distribution among pictures in CVS is non-dyadic is Multi Description Coding (MDC) when a stream consist of two or more embedded description and the Temporal ID of both of such descriptions should be equal to 0 (It is always possible to lost one or another description and Temporal ID=0 could absent in the rest description). Here the term stream refers to the bitstream.

Existing solutions try to meet requirements of decoder such as buffering output delays and constraints of resulted sub-bitstream, but do not provide guarantee for supporting selected picture rate by external application or network.

Specifications of AVC and HEVC have scalable extensions, which allows to have sub-bitstreams embedded into the one stream. It is achieved by using Temporal, Spatial and SNR scalabilities. Each level of scalability is represented by an own layer ID. The set layers of different scalability may be represented by collective term Layer ID that consist of a set of sub-layers of different nature. Temporal scalability operates in the temporal domain by distributing reference relations between pictures so that some subset of pictures may be discarded by network or other application without losing the ability to correctly decode the remaining part of the stream. Spatial scalability allows redistributing media data between pictures of different spatial resolutions with referencing from higher layers with higher resolutions to lower layers with smaller resolutions. SNR scalability allows redistributing bits of the same picture in a same resolution but with different level of quality (encoded with a different level of quantization for example).

Scalable extension of VVC may reuse temporal scalability design for spatial and SNR scalability in the similar manner as it was proposed in JVET-O0045 and JVET-O0333 by defining a bitstream extraction process almost identical to the one for temporal scalability. In this case, POC values of each picture could be used for needs different from temporal domain. In this case current fixed rates flags, "Picture Timing" and "Structure Of Pictures" SEI messages became less reliable to TID (or any other general terms like Layer ID, LID).

Recently, the cinema industry took care about shutter interval which could be used in several scenarios like keeping naturally captured shutter intervals or being synthesized.

This approach is proposed in JVET-P0338 as follows:

Two variations of the syntax and semantics for a shutter interval information SEI message are presented below. These variations differ with respect to signalling of a shutter interval for sub layers. The first variation signals a pair of values to form a ratio. The second variation signals a single value. Both variations support signalling as described in the following:
1. fixed shutter interval for all temporal sub-layers and different shutter interval for different temporal sub-layers;
2. shutter interval equal to zero, which may be used to indicate the associated video sequence contains screen captures, computer generated content, or other non-camera-captured content;
3. shutter interval greater than coded picture interval, which may be used to indicate that the video content is coded and displayed at a frame rate greater than the frame rate at which it was created—e.g., high-speed video playback; and,
4. shutter interval is unknown or unspecified (Variant 1 enables indicating shutter interval is unknown or unspecified for each sub layer. Variant 2 enables indicating shutter interval is unknown or unspecified for all layers.)

The problem as well as the solution described in JVET-P0338 is the parsing dependency of a parameter sps_max_sub_layers_minus1, and derivation of a parameter ClockTick when fixed_shutter_interval_within_cvs_flag equal to 1.

Proposed Solution

In order to solve the problems listed above, the present disclosure discloses the following aspects (each of them can be applied individually and some of them can be applied in combination): In the following, the terms Maximum Temporal ID and Highest Temporal ID should be understood to have the same meaning.

8) For signalling of a list of picture rates associated with temporal IDs in SEI message, the following steps are used:
a. To indicate the special payload type for corresponding SEI message
b. For corresponding bitstream (or CVS) to describe the list of picture rates associated with corresponding Temporal ID values:
i. To signal the Highest Temporal ID present in bitstream
ii. To signal time scale value which is the number of time units that pass in one second
1. To add constraint that this value be exactly the same as time_scale signaled in SPS
iii. To signal the flag of dyadic temporal ID distribution denoted fixed picture rate for all sub-layers within bitstream or CVS
1. To signal dyadic temporal ID distribution flag conditionally based on SPS flag of presence dyadic temporal ID distribution flag in bitstream
iv. setting the value of a dyadic_temporal_nesting_flag is equal to 1 by default (when not present)
v. setting the value of a parameter vui_poc_proportional_to_timing_flag to 1 when dyadic_temporal_nesting_flag is equal to 1
vi. setting the value of a fixed_pic_rate_general_flag to 1 when dyadic_temporal_nesting_flag is equal to 1
vii. setting the value of a fixed_pic_rate_within_cvs_flag to 1 when dyadic_temporal_nesting_flag is equal to 1;
viii. and processing the bitstream based on the fixed_pic_rate_general_flag.
ix. To signal fixed_shutter_interval_within_cvs_flag specified that the value of ShutterInterval is the same for all temporal sub-layers in the C(L)VS
1. To signal this flag conditionally based of dyadic_temporal_nesting_flag.
x. For each sub-layer starting from 0 for non-dyadic TID distribution and from highest temporal ID for dyadic TID distribution till the Highest TID in bitstream.
1. To signal the number of units in tick associated with picture rate of corresponding sub-layer
a. To signal the number of units in tick conditionally based on dyadic_temporal_nesting_flag flag (to signal if flag=0 or (flag=1 and TID=Maximum TID))
2. To signal fixed_shutter_interval_within_sublayer_flag[i] specified that the value of ShutterInterval is the same for particular sub-layers in the C(L)VS and may be derived from Picture interval of corresponding temporal sub layer.
a. To signal the fixed_shutter_interval_within_sublayer_flag[i] conditionally based on dyadic_temporal_nesting_flag (to signal if flag=1)
3. To signal the number of units in tick associated with picture shutter interval of corresponding sub-layer
a. To signal the number of units in tick associated with picture shutter interval of corresponding sub-layer conditionally based on fixed_shutter_interval_within_sublayer_flag[i] flag
c. Define the values of number of ticks when TID distribution is dyadic:
i. To derive number of units in tick for sub-layer associated with particular TID by division of number of units in tick of Highest TID by the (Highest TID minus current TID) power of 2 (or just shift arithmetically right by this value)
ii. To derive number of units in shutter interval for sub-layer associated with particular TID by division of number of units in tick of Maximum/Highest TID by the (Maximum/Highest TID minus current TID) power of 2 (or just shift arithmetically right by this value)
9) For signaling: The list of picture rates associated with temporal IDs in HRD parameters:

a. For corresponding bitstream (or CVS) to describe the list of picture rates associated with corresponding Temporal ID values:
  i. To signal the flag of dyadic temporal ID distribution denoted fixed picture rate for all sub-layers within bitstream or CVS in general_hrd_parameters( ) syntax elements
  ii. To signal dyadic temporal ID distribution flag conditionally based on SPS flag of presence dyadic temporal ID distribution flag in bitstream
b. To signal fixed_pic_rate_general_flag[i] for each sub-layer conditionally by the dyadic_temporal_nesting_flag
c. To set the value of fixed_pic_rate_general_flag[I] to 1 when dyadic_temporal_nesting_flag is equal to 1
d. To set the value of fixed_pic_rate_within_cvs_flag [I] to 1 when dyadic_temporal_nesting_flag is equal to 1
10) To associate Temporal IDs with subset of general Layer IDs
a. Where general Layer IDs comprises Spatial, SNR (Signal to Noise Ratio) and Temporal layers
b. Where all layers associated with corresponding picture rates
c. Where only Temporal layers associated with picture rates Those general layer IDs associated to the temporal IDS can be used as bases to decide which layer of the sequence should be kept or discarded.
11) To signal the list of picture rates associated with temporal IDs at the File-format-level:
e. Sample entry if static
f. Sample group or timed metadata or some other track-level signalling if dynamic
g. As part of Cross Layer Interface
h. As part of Media Processing Unit
Note: Static is for storage file formats, dynamic is for transmission—real time protocols
12) Derivation of list of picture rates defined by the approach described in item 1)a-1)c is described in the embodiment 1 below in this document.
13) Derivation of list of picture rates defined by the approach described in item 1)a-1)c is described in the embodiment 2 below in this document.

The First Embodiment of the Present Disclosure

This clause documents the first embodiment of the present disclosure. The description is in relative to the basis text, which is the draft of VVC specification in JVET contribution JVET-O2001-vE. In other words, only the difference with respect to the basis text is described, while the texts in the basis text that are not mentioned below apply as they are. Here, modified text relative to the basis text is highlighted in gray.

The new SEI message with title "Sub-Layer Picture rates SEI message" is proposed in order to provide to the external application or network the list of picture rates associated with the list of Temporal IDs.

General SEI Message Syntax

| sei_payload( payloadType, payloadSize ) { | Descriptor |
|---|---|
| if( nal_unit_type = = PREFIX_SEI_NUT ) | |
|   if( payloadType = = 0 ) | |
|     buffering_period( payloadSize ) | |
|   else if( payloadType = = 1 ) | |
|     pic_timing( payloadSize ) | |

-continued

| sei_payload( payloadType, payloadSize ) { | Descriptor |
|---|---|
|   else if( payloadType = = 130 ) | |
|     decoding_unit_info( payloadSize ) | |
|   else if( payloadType = = 145 ) | |
|     dependent_rap_indication( payloadSize ) | |
|       // Specified in ITU-T H.SEI \| ISO/IEC 23002-7. | |
|   else if( payloadType = = 168 ) | |
|     frame_field_info( payloadSize ) | |
|   else if( payloadType = = 169 ) | |
|     pic_rates( payloadSize ) | |
|   else | |
|     reserved_sei_message( payloadSize ) | |
| else /* nal_unit_type = = SUFFIX_SEI_NUT */ | |
|   if( payloadType = = 132 ) | |
|     decoded_picture_hash( payloadSize ) | |
|       // Specified in ITU-T H.SEI \| ISO/IEC 23002-7. | |
|   else | |
|     reserved_sei_message( payloadSize ) | |
| if( more_data_in_payload( ) ) { | |
|   if( payload_extension_present( ) ) | |
|     reserved_payload_extension_data | u(v) |
|   payload_bit_equal_to_one /* equal to 1 */ | f(1) |
|   while( !byte_aligned( ) ) | |
|     payload_bit_equal_to_zero /* equal to 0 */ | f(1) |
| } | |
| } | |

Sub-Layer Picture Rates SEI Message Syntax

| pic_rates( payloadSize ) { | Descriptor |
|---|---|
|   pr_max_sub_layers_minus1 | u(3) |
|   pr_time_scale | u(32) |
|   dyadic_temporal_nesting_flag | u(1) |
|   for( i = dyadic_temporal_nesting_flag* pr_max_sub_layers_minus1; i <= pr_max_sub_layers_minus1; i++ ) { | |
|     sub_layer_num_units_in_tick[ i ] | u(32) |
|   } | |
| } | |

NOTE 3—Persistence information for SEI messages is informatively summarized in Table 3.

pr_max_sub_layers_minus1 plus 1 specifies the maximum number of temporal sub-layers that may be present in each CVS referring to the SPS. The value of pr_max_sub_layers_minus1 shall be in the range of 0 to 6, inclusive.

It is a requirement of bitstream conformance that the value of pr_max_sub_layers_minus1 in the picture rates SEI message is equal to the value of sps_max_sub_layers_minus1 in the SPS.

pr_time_scale is the number of time units that pass in one second. For example, a time coordinate system that measures time using a 27 MHz clock has a time_scale of 27 000 000. The value of time_scale shall be greater than 0.

It is a requirement of bitstream conformance that the value of pr_time_scale in the picture rates SEI message is equal to the value of time_scale in the SPS.

dyadic_temporal_nesting_flag indicates that the Temporal IDs are distributed hierarchically with dyadic dependencies. When not present the value of dyadic_temporal_nesting_flag is inferred to be equal to 0.

sub_layer_num_units_in_tick[i] is the number of time units of a clock operating at the frequency pr_time_scale Hz that corresponds to one increment (called a clock tick) of a clock tick counter. sub_layer_num_units_in_tick[i] shall be greater than 0. A clock tick, in units of seconds, is equal to the quotient of sub_layer_num_units_in_tick divided by pr_time_scale. For example, when the picture rate of a video signal is 25 Hz, pr_time_scale may be equal to 27 000 000 and sub_layer_num_units_in_tick may be equal to 1 080 000, and consequently a clock tick may be equal to 0.04 seconds.

It is a requirement of bitstream conformance that the value of sub_layer_num_units_in_tick[pr_max_sub_layers_minus1] in the picture rates SEI message is equal to the value of num_units_in_tick in the SPS.

When dyadic_temporal_nesting_flag is equal to 0 the values of sub_layer_num_units_in_tick[i] for i from 0 to pr_max_sub_layers_minus1−1 are derived as follows:

For each value of i in the range of 0 to pr_max_sub_layers_minus1−1, inclusive, the variable sub_layer_num_units_in_tick[i] is derived as follows:

$$\text{sub\_layer\_num\_units\_in\_tick}[i] = \text{sub\_layer\_num\_units\_in\_tick}[\text{pr\_max\_sub\_layers\_minus1}] / 2^{(\text{pr\_max\_sub\_layers\_minus1} - i)} \quad (1)$$

TABLE 3

Persistence scope of SEI messages (informative)

| SEI message | Persistence scope |
|---|---|
| Buffering period | The remainder of the bitstream |
| Picture timing | The access unit containing the SEI message |
| Decoding unit information | The access unit containing the SEI message |
| Frame-field information | The access unit containing the SEI message |
| Sub-Layer Picture Rates | The CVS containing the SEI message |

The Second Embodiment of the Present Disclosure

This clause documents the second embodiment of the present disclosure. The description is provided relative to the basis text, which is the draft of VVC specification in JVET contribution JVET-O2001-vE. In other words, only the difference to the basis text is described, while the texts in the basis text that are not mentioned below apply as they are. Here, modified text relative to the basis text is highlighted in gray.

Additional syntax element is proposed to include into sub_layer_hrd_parameters syntax in order to provide to the external application or network the list of picture rates associated with the list of Temporal IDs.

7.3.4.1 General HRD Parameters Syntax

| general_hrd_parameters( firstSubLayer, maxNumSubLayersMinus1 ) { | Descriptor |
|---|---|
| general_nal_hrd_parameters_present_flag | u(1) |
| general_vcl_hrd_parameters_present_flag | u(1) |
| if( general_nal_hrd_parameters_present_flag \|\| general_vcl_hrd_parameters_present_flag ) { | |
| decoding_unit_hrd_params_present_flag | u(1) |
| if( decoding_unit_hrd_params_present_flag ) { | |
| tick_divisor_minus2 | u(8) |
| decoding_unit_cbp_params_in_pic_timing_sei_flag | u(1) |
| } | |
| bit_rate_scale | u(4) |

-continued

| general_hrd_parameters( firstSubLayer, maxNumSubLayersMinus1 ) { | Descriptor |
|---|---|
| cpb_size_scale | u(4) |
| dyadic_temporal_nesting_flag | u(1) |
| if( decoding_unit_hrd_params_present_flag ) | |
| cpb_size_du_scale | u(4) |
| } | |
| for( i = firstSubLayer; i <= maxNumSubLayersMinus1; i++ ) { | |
| if ( !dyadic_temporal_nesting_flag ) | |
| fixed_pic_rate_general_flag[ i ] | u(1) |
| if( !fixed_pic_rate_general_flag[ i ] ) | |
| fixed_pic_rate_within_cvs_flag[ i ] | u(1) |
| if( fixed_pic_rate_within_cvs_flag[ i ] ) | |
| elemental_duration_in_tc_minus1[ i ] | ue(v) |
| else | |
| low_delay_hrd_flag[ i ] | u(1) |
| if( !low_delay_hrd_flag[ i ] ) | |
| hrd_cpb_cnt_minus1[ i ] | ue(v) |
| if( general_nal_hrd_parameters_present_flag ) | |
| sub_layer_hrd_parameters( i ) | |
| if( general_vcl_hrd_parameters_present_flag ) | |
| sub_layer_hrd_parameters( i ) | |
| } | |
| } | |

7.3.4.2 Sub-Layer HRD Parameters Syntax

| sub_layer_hrd_parameters( subLayerId ) { | Descriptor |
|---|---|
| If ( !dyadic_temporal_nesting_flag ) | |
| sub_layer_num_units_in_tick[ i ] | u(32) |
| for( j = 0; j <= hrd_cpb_cnt_minus1[ subLayerId ]; j++ ) { | |
| bit_rate_value_minus1[ subLayerId ][ j ] | ue(v) |
| cpb_size_value_minus1[ subLayerId ][ j ] | ue(v) |
| if( decoding_unit_hrd_params_present_flag ) { | |
| cpb_size_du_value_minus1[ subLayerId ][ j ] | ue(v) |
| bit_rate_du_value_minus1[ subLayerId ][ j ] | ue(v) |
| } | |
| cbr_flag[ subLayerId ][ j ] | u(1) |
| } | |
| } | | dyadic_temporal_nesting_flag indicates that the Temporal IDs are distributed hierarchically with dyadic dependencies. When not present the value of dyadic_temporal_nesting_flag is inferred to be equal to 0.

When the flag dyadic_temporal_nesting_flag is equal to 1 then fixed_pic_rate_general_flag[i] is set equal to 1 for all sub-layers and fixed_pic_rate_within_cvs_flag[i] is set equal to 1 for all sub-layers.

sub_layer_num_units_in_tick[i] is the number of time units of a clock operating at the frequency pr_time_scale Hz that corresponds to one increment (called a clock tick) of a clock tick counter. sub_layer_num_units_in_tick[i] shall be greater than 0. A clock tick, in units of seconds, is equal to the quotient of sub_layer_num_units_in_tick divided by time_scale. For example, when the picture rate of a video signal is 25 Hz, time_scale may be equal to 27 000 000 and sub_layer_num_units_in_tick may be equal to 1 080 000, and consequently a clock tick may be equal to 0.04 seconds.

When dyadic_temporal_nesting_flag is equal to 1 the values of sub_layer_num_units_in_tick[i] for i from 0 to max_sub_layers_minus1−1 are derived as follows:/,
sub_layer_num_units_in_tick[max_sub_layers_minus1] is set equal to num_units_in_tick. For each value of i in the range of 0 to max_sub_layers_minus1−1, inclusive, the variable sub_layer_num_units_in_tick[i] is derived as follows:

$$\text{sub\_layer\_num\_units\_in\_tick}[i] = \quad (1)$$
$$\text{sub\_layer\_num\_units\_in\_tick}[\text{max\_sub\_layers\_minus1}]/2^{\wedge}(\text{max\_sub\_layers\_minus1} - i)$$

The Third Embodiment of the Present Disclosure

This clause documents the third embodiment of the present disclosure. The description is provided relative to the basis text, which is the draft of VVC specification in JVET contribution JVET-O2001-vE. In other words, only the difference to the basis text is described, while the texts in the basis text that are not mentioned below apply as they are. Here, modified text relative to the basis text is highlighted in gray.

The new SEI message with title "Sub-Layer Picture Intervals SEI message" is proposed in order to provide to the external application or network the list of picture intervals associated with the list of Temporal IDs.

General SEI Message Syntax

| sei_payload( payloadType, payloadSize ) { | Descriptor |
|---|---|
| if( nal_unit_type = = PREFIX_SEI_NUT ) | |
|   if( payloadType = = 0 ) | |
|     buffering_period( payloadSize ) | |
|   else if( payloadType = = 1 ) | |
|     pic_timing( payloadSize ) | |
|   else if( payloadType = = 130 ) | |
|     decoding_unit_info( payloadSize ) | |
|   else if( payloadType = = 145 ) | |
|     dependent_rap_indication( payloadSize ) | |
|     // Specified in ITU-T H.SEI \| ISO/IEC 23002-7. | |
|   else if( payloadType = = 168 ) | |
|     frame_field_info( payloadSize ) | |
|   else if( payloadType = = 169 ) | |
|     pic_intervals( payloadSize ) | |
|   else | |
|     reserved_sei_message( payloadSize ) | |
| else /* nal_unit_type = = SUFFIX_SEI_NUT */ | |
|   if( payloadType = = 132 ) | |
|     decoded_picture_hash( payloadSize ) | |
|     // Specified in ITU-T H.SEI \| ISO/IEC 23002-7. | |
|   else | |
|     reserved_sei_message( payloadSize ) | |
| if( more_data_in_payload( ) ) { | |
|   if( payload_extension_present( ) ) | |
|     reserved_payload_extension_data | u(v) |
|   payload_bit_equal_to_one /* equal to 1 */ | f(1) |
|   while( !byte_aligned( ) ) | |
|     payload_bit_equal_to_zero /* equal to 0 */ | f(1) |
| } | |
| } | |

Sub-Layer Picture Intervals SEI Message Syntax

| pic_rates( payloadSize ) { | Descriptor |
|---|---|
| pi_max_sub_layers_minus1 | u(3) |
| pi_time_scale | u(32) |
| dyadic_temporal_nesting_flag | u(1) |
| for( i = dyadic_temporal_nesting_flag * pi_max_sub_layers_minus1; i <= pi_max_sub_layers_minus1; i++ ) { | |
|   sub_layer_num_units_in_tick[ i ] | u(32) |
|   sub_layer_num_units_in_shutter_interval[ i ] | u(32) |
| } | |
| } | |

NOTE 3—Persistence information for SEI messages is informatively summarized in Table 3.

pi_max_sub_layers_minus1 plus 1 specifies the maximum number of temporal sub-layers that may be present in each CVS referring to the SPS.

The value of pi_max_sub_layers_minus1 or pr_max_sub_layers_minus1 shall be in the range of 0 to 6, inclusive.

It is a requirement of bitstream conformance that the value of pi_max_sub_layers_minus1 or pr_max_sub_layers_minus1 in the picture rates SEI message is equal to the value of sps_max_sub_layers_minus1 in the SPS.

pi_time_scale is the number of time units that pass in one second. For example, a time coordinate system that measures time using a 27 MHz clock has a time_scale of 27 000 000. The value of time_scale shall be greater than 0.

It is a requirement of bitstream conformance that the value of pi_time_scale in the picture rates SEI message is equal to the value of time_scale in the SPS.

dyadic_temporal_nesting_flag indicates that the Temporal IDs are distributed hierarchically with dyadic dependencies. When not present the value of dyadic_temporal_nesting_flag is inferred to be equal to 0.

sub_layer_num_units_in_tick[i] is the number of time units of a clock operating at the frequency pi_time_scale Hz that corresponds to one increment (called a clock tick) of a clock tick counter. sub_layer_num_units_in_tick[i] shall be greater than 0. A clock tick, in units of seconds, is equal to the quotient of sub_layer_num_units_in_tick[i] divided by pi_time_scale. For example, when the picture rate of a video signal is 25 Hz, pi_time_scale may be equal to 27 000 000 and sub_layer_num_units_in_tick may be equal to 1 080 000, and consequently a clock tick may be equal to 0.04 seconds.

When the value of pi_time_scale is greater than 0, the value of PictureInterval is specified by:

$$PictureInterval = \frac{\text{sub\_layer\_num\_units\_in\_tick}[\text{pi\_max\_sub\_layers\_minus1}]}{\text{pi\_time\_scale}}$$

Otherwise (the value of pi_time_scale is equal to 0), PictureInterval should be interpreted as unknown or unspecified.

It is a requirement of bitstream conformance that the value of sub_layer_num_units_in_tick[pi_max_sub_layers_minus1] in the picture rates SEI message is equal to the value of num_units_in_tick in the SPS.

When dyadic_temporal_nesting_flag is equal to 0 the values of sub_layer_num_units_in_tick[i] and sub_layer_num_units_in_shutter_interval[i] for i from 0 to pi_max_sub_layers_minus1−1 are derived as follows:

For each value of i in the range of 0 to pi_max_sub_layers_minus1−1, inclusive, the variable sub_layer_num_units_in_tick[i] is derived as follows:

$$\text{sub\_layer\_num\_units\_in\_tick}[i] = \quad (1)$$
$$\text{sub\_layer\_num\_units\_in\_tick}[\text{pi\_max\_sub\_layers\_minus1}]/2^{\wedge}(\text{pi\_max\_sub\_layers\_minus1} - i)$$

-continued $$\text{sub\_layer\_num\_units\_in\_shutter\_interval } [i] = \quad (1)$$
$$\text{sub\_layer\_num\_units\_in\_shutter\_interval}$$
$$[\text{pi\_max\_sub\_layers\_minus1}]/2^{\wedge}(\text{pi\_max\_sub\_layers\_minus1} - i)$$

sub_layer_num_units_in_shutter_interval [i] specifies the number of time units of a clock operating at the frequency pi_time_scale Hz that corresponds to one increment of an shutter clock tick counter. Shutter interval, defined by variable ShutterInterval, in units of seconds, is equal to the quotient of sub_layer_num_units_in_shutter_interval [pi_max_sub_layers_minus1] divided by pi_time_scale. For example, when ShutterInterval is equal to 0.04 seconds, pi_time_scale may be equal to 27 000 000 and sub_layer_num_units_in_shutter_interval[pi_max_sub_layers_minus1] may be equal to 1 080 000.

When the value of pi_time_scale is greater than 0, the value of ShutterInterval is specified by:

ShutterInterval=sub_layer_num_units_in_shutter_interval [pi_max_sub_layers_minus1]÷pi_time_scale Otherwise (the value of pi_time_scale is equal to 0), ShutterInterval should be interpreted as unknown or unspecified.

NOTE 1—A value of ShutterInterval equal to 0 may indicate that the associated video content contain screen capture content, computer generated content, or other non-camera-capture content.

NOTE 2—A value of ShutterInterval greater than the value of the inverse of the coded picture rate, the coded picture interval, may indicate that the coded picture rate is greater than the picture rate at which the associated video content was created—e.g., when the coded picture rate is 120 Hz and the picture rate of the associated video content prior to encoding and display is 60 Hz. The coded picture interval for the given temporal sub-layer Tid may be indicated by PictureInterval[Tid].

TABLE 3

Persistence scope of SEI messages (informative)

| SEI message | Persistence scope |
| --- | --- |
| Buffering period | The remainder of the bitstream |
| Picture timing | The access unit containing the SEI message |
| Decoding unit information | The access unit containing the SEI message |
| Frame-field information | The access unit containing the SEI message |
| Sub-Layer Picture Intervals | The C(L)VS containing the SEI message |

The Fourth Embodiment of the Present Disclosure

This clause documents the embodiment of the inventive aspect 1) of the present disclosure as summarized above. The description is provided relative to the basis text, which is the draft of VVC specification in JVET contribution JVET-O2001-vE. In other words, only the difference to the basis text is described, while the texts in the basis text that are not mentioned below apply as they are. Here, modified text relative to the basis text is highlighted in gray.

The new SEI message with title "Sub-Layer Picture Intervals SEI message" is proposed in order to provide to the external application or network the list of picture intervals associated with the list of Temporal IDs.

General SEI Message Syntax

| sei_payload( payloadType, payloadSize ) { | Descriptor |
| --- | --- |
|   if( nal_unit_type = = PREFIX_SEI_NUT ) | |
|     if( payloadType = = 0 ) | |
|       buffering_period( payloadSize ) | |
|     else if( payloadType = = 1 ) | |
|       pic_timing( payloadSize ) | |
|     else if( payloadType = = 130 ) | |
|       decoding_unit_info( payloadSize ) | |
|     else if( payloadType = = 145 ) | |
|       dependent_rap_indication( payloadSize ) | |
|         // Specified in ITU-T H.SEI \| ISO/IEC 23002-7. | |
|     else if( payloadType = = 168 ) | |
|       frame_field_info( payloadSize ) | |
|     else if( payloadType = = 169 ) | |
|       pic_intervals( payloadSize ) | |
|     else | |
|       reserved_sei_message( payloadSize ) | |
|   else /* nal_unit_type = = SUFFIX_SEI_NUT */ | |
|     if( payloadType = = 132 ) | |
|       decoded_picture_hash( payloadSize ) | |
|         // Specified in ITU-T H.SEI \| ISO/IEC 23002-7. | |
|     else | |
|       reserved_sei_message( payloadSize ) | |
|   if( more_data_in_payload( ) ) { | |
|     if( payload_extension_present( ) ) | |
|       reserved_payload_extension_data | u(v) |
|     payload_bit_equal_to_one /* equal to 1 */ | f(1) |
|     while( !byte_aligned( ) ) | |
|       payload_bit_equal_to_zero /* equal to 0 */ | f(1) |
|   } | |
| } | |

Sub-Layer Picture Intervals SEI Message Syntax

| pic_rates( payloadSize ) { | Descriptor |
| --- | --- |
|   pi_max_sub_layers_minus1 | u(3) |
|   pi_time_scale | u(32) |
|   dyadic_temporal_nesting_flag | u(1) |
|   for (i = 0; i <= pi_max_sub_layers_minus1; i++ ) { | |
|     if (dyadic_temporal_nesting_flag ){ | |
|       if ( i = = pi_max_sub_layers_minus1 ) | |
|         sub_layer_num_units_in_tick[ i ] | u(32) |
|     }else { | |
|       fixed_shutter_interval_within_sublayer_flag[ i ] | u(1) |
|       if (!fixed_shutter_interval_within_sublayer_flag[ i ]) | |
|         sub_layer_num_units_in_shutter_interval[ i ] | u(32) |
|     } | |
|   } | |
| } | |

NOTE 3—Persistence information for SEI messages is informatively summarized in Table 3.

pi_max_sub_layers_minus1 plus 1 specifies the maximum number of temporal sub-layers that may be present in each C(L)VS referring to the SPS.

The value of pi_max_sub_layers_minus1 or pr_max_sub_layers_minus1 shall be in the range of 0 to 6, inclusive.

It is a requirement of bitstream conformance that the value of pi_max_sub_layers_minus1 or pr_max_sub_layers_minus1 in the picture rates SEI message is equal to the value of sps_max_sub_layers_minus1 in the SPS.

pi_time_scale is the number of time units that pass in one second. For example, a time coordinate system that measures time using a 27 MHz clock has a time_scale of 27 000 000. The value of time_scale shall be greater than 0.

It is a requirement of bitstream conformance that the value of pi_time_scale in the picture rates SEI message is equal to the value of time_scale in the SPS.

dyadic_temporal_nesting_flag indicates that the Temporal IDs are distributed hierarchically with dyadic dependencies. When not present the value of dyadic_temporal_nesting_flag is inferred to be equal to 0.

sub_layer_num_units_in_tick[i] is the number of time units of a clock operating at the frequency pi_time_scale Hz that corresponds to one increment (called a clock tick) of a clock tick counter. sub_layer_num_units_in_tick[i] shall be greater than 0. A clock tick, in units of seconds, is equal to the quotient of sub_layer_num_units_in_tick[i] divided by pi_time_scale. For example, when the picture rate of a video signal is 25 Hz, pi_time_scale may be equal to 27 000 000 and sub_layer_num_units_in_tick may be equal to 1 080 000, and consequently a clock tick may be equal to 0.04 seconds.

sub_layer_num_units_in_shutter_interval[i] specifies the number of time units of a clock operating at the frequency pi_time_scale Hz that corresponds to one increment of an shutter clock tick counter for $i^{th}$ temporal sub-layers in the C(L)VS. Shutter interval, defined by variable ShutterInterval, in units of seconds, is equal to the quotient of sub_layer_num_units_in_shutter_interval[pi_max_sub_layers_minus1] divided by pi_time_scale. For example, when ShutterInterval is equal to 0.04 seconds, pi_time_scale may be equal to 27 000 000 and sub_layer_num_units_in_shutter_interval[pi_max_sub_layers_minus1] may be equal to 1 080 000.

When the value of pi_time_scale is greater than 0, the value of ShutterInterval is specified by:

$$ShutterInterval = \text{sub\_layer\_num\_units\_in\_shutter\_interval}[\text{pi\_max\_sub\_layers\_minus1}] \div \text{pi\_time\_scale}$$

When the value of pi_time_scale is greater than 0, the value of PictureInterval is specified by:

$$PictureInterval = \text{sub\_layer\_num\_units\_in\_tick } [\text{pi\_max\_sub\_layers\_minus1}] \div \text{pi\_time\_scale}$$

Otherwise (the value of pi_time_scale is equal to 0), PictureInterval should be interpreted as unknown or unspecified.

It is a requirement of bitstream conformance that the value of sub_layer_num_units_in_tick[pi_max_sub_layers_minus1] in the picture rates SEI message is equal to the value of num_units_in_tick in the SPS.

When dyadic_temporal_nesting_flag is equal to 0 the values of sub_layer_num_units_in_tick[i] and sub_layer_num_units_in_shutter_interval[i] for i from 0 to pi_max_sub_layers_minus1−1 are derived as follows:

For each value of i in the range of 0 to pi_max_sub_layers_minus1−1, inclusive, the variable sub_layer_num_units_in_tick[i] is derived as follows:

fixed_shutter_interval_within_sublayer_flag[i] equal to 1 specifies that the value of ShutterInterval is the same for $i^{th}$ temporal sub-layers in the C(L)VS. fixed_shutter_interval_within_sublayer_flag[i] equal to 0 specifies that value of ShutterInterval may not be the same for $i^{th}$ temporal sub-layers in the C(L)VS.

$$\text{sub\_layer\_num\_units\_in\_tick}[i] = \text{sub\_layer\_num\_units\_in\_tick}[\text{pi\_max\_sub\_layers\_minus1}] / 2^{(\text{pi\_max\_sub\_layers\_minus1} - i)} \quad (1)$$

$$\text{sub\_layer\_num\_units\_in\_shutter\_interval}[i] = \text{sub\_layer\_num\_units\_in\_shutter\_interval}[\text{pi\_max\_sub\_layers\_minus1}] / 2^{(\text{pi\_max\_sub\_layers\_minus1} - i)} \quad (1)$$

When dyadic_temporal_nesting_flag is equal to 1 then fixed_shutter_interval_within_sublayer_flag[i] is set equal to 1 for all sub-layers.

Otherwise (the value of pi_time_scale is equal to 0), ShutterInterval should be interpreted as unknown or unspecified.

NOTE 1—A value of ShutterInterval equal to 0 may indicate that the associated video content contain screen capture content, computer generated content, or other non-camera-capture content.

NOTE 2—A value of ShutterInterval greater than the value of the inverse of the coded picture rate, the coded picture interval, may indicate that the coded picture rate is greater than the picture rate at which the associated video content was created—e.g., when the coded picture rate is 120 Hz and the picture rate of the associated video content prior to encoding and display is 60 Hz. The coded picture interval for the given temporal sub-layer Tid may be indicated by PictureInterval[Tid].

TABLE 3

| Persistence scope of SEI messages (informative) | |
|---|---|
| SEI message | Persistence scope |
| Buffering period | The remainder of the bitstream |
| Picture timing | The access unit containing the SEI message |
| Decoding unit information | The access unit containing the SEI message |
| Frame-field information | The access unit containing the SEI message |
| Sub-Layer Picture Intervals | The C(L)VS containing the SEI message |

The Fifth Embodiment of the Present Disclosure

This clause documents the embodiment of the inventive aspect 1) of the present disclosure as summarized above. The description is in relative to the basis text, which is the draft of VVC specification in JVET contribution JVET-O2001-vE. In other words, only the difference to the basis text is described, while the texts in the basis text that are not mentioned below apply as they are. Modified text relative to the basis text is highlighted in gray.

The new SEI message with title Sub-Layer Picture Intervals SEI message is proposed in order to provide to the external application or network the list of picture intervals associated with the list of Temporal IDs.

General SEI Message Syntax

| sei_payload( payloadType, payloadSize ) { | Descriptor |
|---|---|
|   if( nal_unit_type = = PREFIX_SEI_NUT ) | |
|     if( payloadType = = 0 ) | |
|       buffering_period( payloadSize ) | |
|     else if( payloadType = = 1 ) | |
|       pic_timing( payloadSize ) | |
|     else if( payloadType = = 130 ) | |
|       decoding_unit_info( payloadSize ) | |
|     else if( payloadType = = 145 ) | |
|       dependent_rap_indication( payloadSize ) | |
|         // Specified in ITU-T H.SEI \| ISO/IEC 23002-7. | |
|     else if( payloadType = = 168 ) | |
|       frame_field_info( payloadSize ) | |
|     else if( payloadType = = 169 ) | |
|       pic_intervals( payloadSize ) | |
|     else | |
|       reserved_sei_message( payloadSize ) | |
|   else /* nal_unit_type = = SUFFIX_SEI_NUT */ | |
|     if( payloadType = = 132 ) | |
|       decoded_picture_hash( payloadSize ) | |
|         // Specified in ITU-T H.SEI \| ISO/IEC 23002-7. | |
|     else | |
|       reserved_sei_message( payloadSize ) | |
|   if( more_data_in_payload( ) ) { | |
|     if( payload_extension_present( ) ) | |
|       reserved_payload_extension_data | u(v) |
|     payload_bit_equal_to_one /* equal to 1 */ | f(1) |
|     while( !byte_aligned( ) ) | |
|       payload_bit_equal_to_zero /* equal to 0 */ | f(1) |
|   } | |
| } | |

Sub-Layer Picture Intervals SEI Message Syntax

| pic_rates( payloadSize ) { | Descriptor |
|---|---|
|   pi_max_sub_layers_minus1 | u(3) |
|   pi_time_scale | u(32) |
|   dyadic_temporal_nesting_flag | u(1) |
|   fixed_shutter_interval_within_cvs_flag | u(1) |
|   sub_layer_num_units_in_tick[ pi_max_sub_layers_minus1 ] | u(32) |
|   for( i = 0; i < pi_max_sub_layers_minus1; i++ ) { | |
|     if ( ! dyadic_temporal_nesting_flag ) | |
|       sub_layer_num_units_in_tick[ i ] | u(32) |
|     if (! fixed_shutter_interval_within_cvs_flag) | |
|       sub_layer_num_units_in_shutter_interval[ i ] | u(32) |
|   } | |
| } | |

NOTE 3—Persistence information for SEI messages is informatively summarized in Table 3.

pi_max_sub_layers_minus1 plus 1 specifies the maximum number of temporal sub-layers that may be present in each C(L)VS referring to the SPS.

The value of pi_max_sub_layers_minus1 or pr_max_sub_layers_minus1 shall be in the range of 0 to 6, inclusive.

It is a requirement of bitstream conformance that the value of pi_max_sub_layers_minus1 or pr_max_sub_layers_minus1 in the picture rates SEI message is equal to the value of sps_max_sub_layers_minus1 in the SPS.

pi_time_scale is the number of time units that pass in one second. For example, a time coordinate system that measures time using a 27 MHz clock has a time_scale of 27 000 000. The value of time_scale shall be greater than 0.

It is a requirement of bitstream conformance that the value of pi_time_scale in the picture rates SEI message is equal to the value of time_scale in the SPS.

dyadic_temporal_nesting_flag indicates that the Temporal IDs are distributed hierarchically with dyadic dependencies. When not present the value of dyadic_temporal_nesting_flag is inferred to be equal to 0.

sub_layer_num_units_in_tick[i] is the number of time units of a clock operating at the frequency pi_time_scale Hz that corresponds to one increment (called a clock tick) of a clock tick counter. sub_layer_num_units_in_tick[i] shall be greater than 0. A clock tick, in units of seconds, is equal to the quotient of sub_layer_num_units_in_tick[i] divided by pi_time_scale. For example, when the picture rate of a video signal is 25 Hz, pi_time_scale may be equal to 27 000 000 and sub_layer_num_units_in_tick may be equal to 1 080 000, and consequently a clock tick may be equal to 0.04 seconds.

When the value of pi_time_scale is greater than 0, the value of PictureInterval is specified by.

$$PictureInterval = \frac{sub\_layer\_num\_units\_in\_tick\,[pi\_max\_sub\_layers\_minus1]}{pi\_time\_scale}$$

Otherwise (the value of pi_time_scale is equal to 0), PictureInterval should be interpreted as unknown or unspecified.

It is a requirement of bitstream conformance that the value of sub_layer_num_units_in_tick[pi_max_sub_layers_minus1] in the picture rates SEI message is equal to the value of num_units_in_tick in the SPS.

When dyadic_temporal_nesting_flag is equal to 0 the values of sub_layer_num_units_in_tick[i] and sub_layer_num_units_in_shutter_interval[i] for i from 0 to pi_max_sub_layers_minus1−1 are derived as follows:

For each value of i in the range of 0 to pi_max_sub_layers_minus1−1, inclusive, the variable sub_layer_num_units_in_tick[i] is derived as follows:

fixed_shutter_interval_within_cvs_flag equal to 1 specifies that the value of ShutterInterval is the same for all temporal sub-layers in the C(L)VS. fixed_shutter_interval_within_sublayer_flag equal to 0 specifies that value of ShutterInterval may not be the same for all temporal sub-layers in the C(L)VS.

$$sub\_layer\_num\_units\_in\_tick[i] = \\ sub\_layer\_num\_units\_in\_tick[pi\_max\_sub\_layers\_minus1] / 2^{\wedge}(pi\_max\_sub\_layers\_minus1 - i) \quad (1)$$

$$sub\_layer\_num\_units\_in\_shutter\_interval\,[i] = \\ sub\_layer\_num\_units\_in\_shutter\_interval[pi\_max\_sub\_layers\_minus1] / 2^{\wedge}(pi\_max\_sub\_layers\_minus1 - i) \quad (1)$$

sub_layer_num_units_in_shutter_interval [i] specifies the number of time units of a clock operating at the frequency pi_time_scale Hz that corresponds to one increment of an shutter clock tick counter for $i^{th}$ temporal sub-layers in the C(L)VS. Shutter interval, defined by variable ShutterInterval, in units of seconds, is equal to the quotient of sub_layer_num_units_in_shutter_interval[pi_max_sub_layers_minus1] divided by pi_time_scale. For example, when ShutterInterval is equal to 0.04 seconds, pi_time_scale may be equal to 27 000 000 and sub_layer_num_units_in_shutter_interval[pi_max_sub_layers_minus1] may be equal to 1 080 000.

When the value of pi_time_scale is greater than 0, the value of ShutterInterval is specified by:

$$ShutterInterval = \text{sub\_layer\_num\_units\_in\_shutter\_interval}[\text{pi\_max\_sub\_layers\_minus1}] \div \text{pi\_time\_scale}$$

Otherwise (the value of pi_time_scale is equal to 0), ShutterInterval should be interpreted as unknown or unspecified.

NOTE 1—A value of ShutterInterval equal to 0 may indicate that the associated video content contain screen capture content, computer generated content, or other non-camera-capture content.

NOTE 2—A value of ShutterInterval greater than the value of the inverse of the coded picture rate, the coded picture interval, may indicate that the coded picture rate is greater than the picture rate at which the associated video content was created—e.g., when the coded picture rate is 120 Hz and the picture rate of the associated video content prior to encoding and display is 60 Hz. The coded picture interval for the given temporal sub-layer Tid may be indicated by PictureInterval[Tid].

TABLE 3

Persistence scope of SEI messages (informative)

| SEI message | Persistence scope |
| --- | --- |
| Buffering period | The remainder of the bitstream |
| Picture timing | The access unit containing the SEI message |
| Decoding unit information | The access unit containing the SEI message |
| Frame-field information | The access unit containing the SEI message |
| Sub-Layer Picture Intervals | The C(L)VS containing the SEI message |

Figure 14:
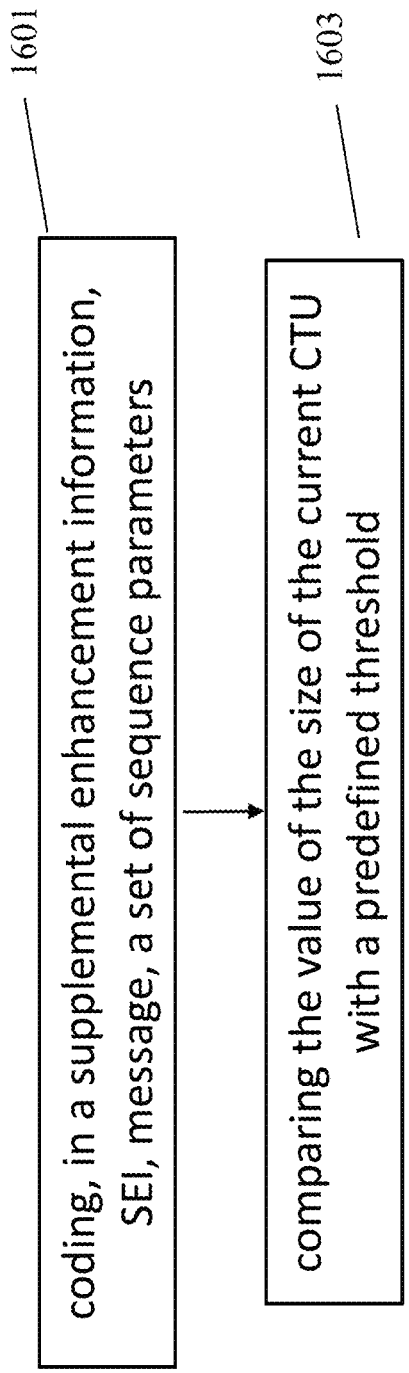
FIG. 14 illustrates a flowchart of a method according to an embodiment of the present disclosure.

Furthermore, FIG. 14 illustrates a flowchart of a method according to the present disclosure. The method illustrated in FIG. 14 is a method of coding implemented by a decoding/encoding device for coding video data, according to an embodiment of the present disclosure. The method of FIG. 14 comprises the following steps: (1601) coding, in a supplemental enhancement information, SEI, message, a set of sequence parameters, wherein the set of sequence parameters is associated with temporal IDs of sub-layers of a bitstream or coded layer video sequence, C(L)VS; and (1602) processing the bitstream or C(L)VS by using the set of sequence parameters included in the SEI message; wherein the set of sequence parameters is used for deriving or representing a picture rate of the sequence.

Figure 15:
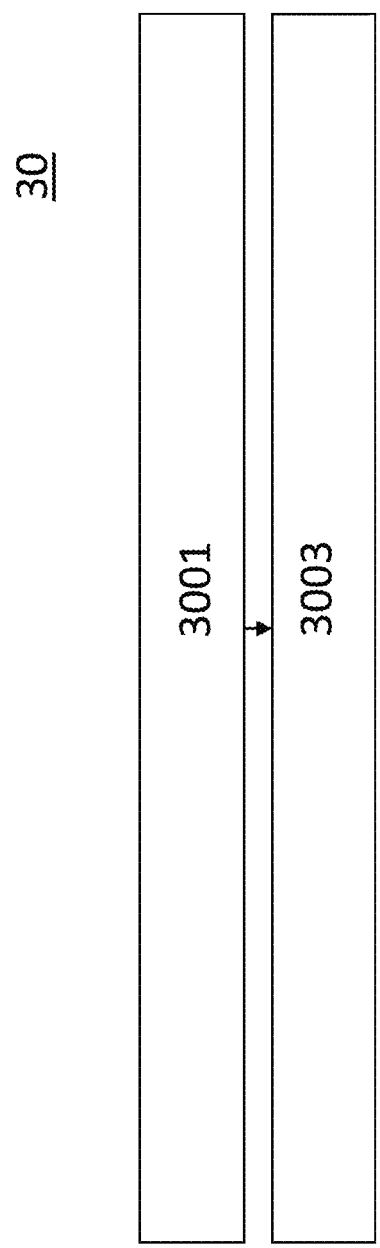
FIG. 15 illustrates a decoder according to an embodiment of the present disclosure.

Furthermore, FIG. 15 illustrates a decoder according to the present disclosure. The decoder 30 illustrated in FIG. 15 is a decoder according to an embodiment of the present disclosure. The decoder 30 of FIG. 15 comprises: a decoding unit 3001 configured to decode, in a supplemental enhancement information, SEI, message, a set of sequence parameters, wherein the set of sequence parameters is associated with temporal IDs of sub-layers of a bitstream or coded layer video sequence, C(L)VS; and a processing unit 3003 configured to process the bitstream or C(L)VS by using the set of sequence parameters included in the SEI message; wherein the set of sequence parameters is used for deriving or representing a picture rate of the sequence.

Figure 16:
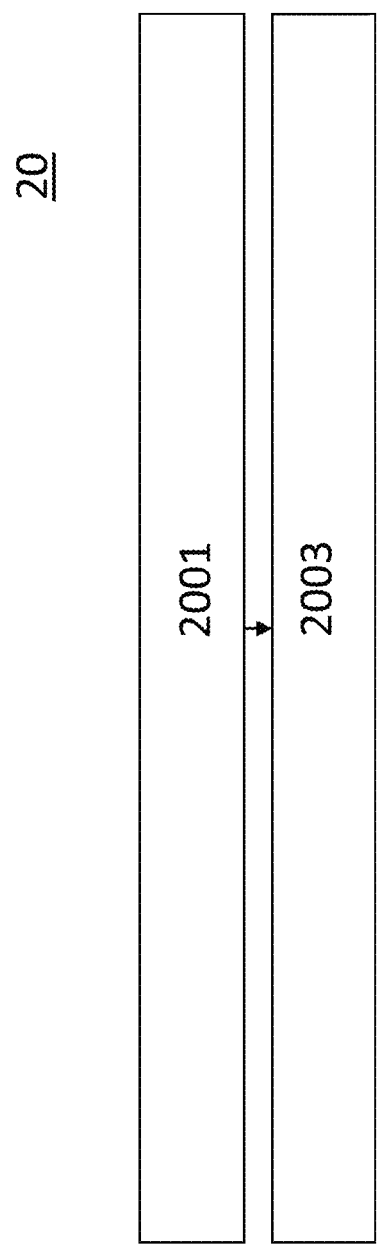
FIG. 16 illustrates an encoder according to an embodiment of the present disclosure.

Furthermore, FIG. 16 illustrates an encoder according to the present disclosure. The encoder 20 illustrated in FIG. 16 is an encoder according to an embodiment of the present disclosure. The encoder 20 of FIG. 16 comprises: an encoding unit 2001 configured to encode, in a supplemental enhancement information, SEI, message, a set of sequence parameters, wherein the set of sequence parameters is associated with temporal IDs of sub-layers of a bitstream or coded layer video sequence, C(L)VS; and a processing unit 2003 configured to process the bitstream or C(L)VS by using the set of sequence parameters included in the SEI message; wherein the set of sequence parameters is used for deriving or representing a picture rate of the sequence.

The following provides an explanation of the applications of the encoding method as well as the decoding method as shown in the above-mentioned embodiments, and a system using them.

Figure 12:
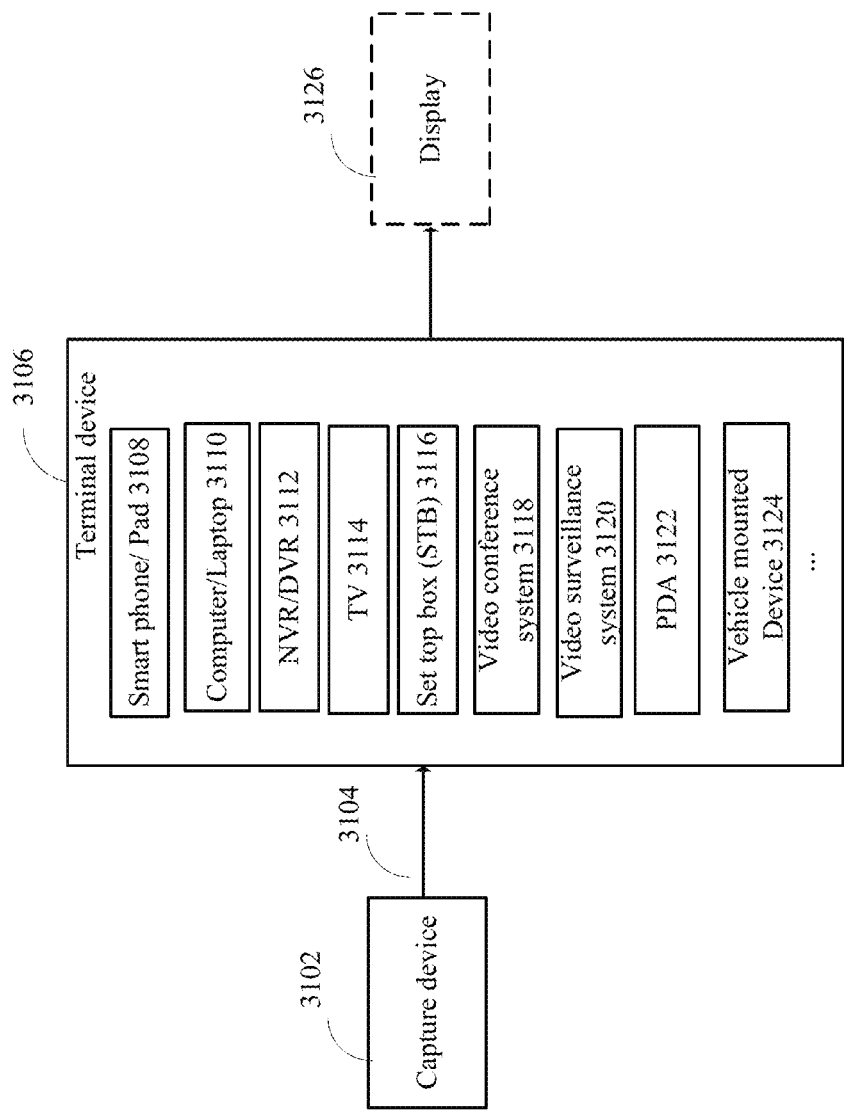
FIG. 12 is a block diagram showing an example structure of a content supply system 3100 which realizes a content delivery service.

FIG. 12 illustrates a block diagram showing a content supply system 3100 for realizing content distribution service. This content supply system 3100 includes capture device 3102, terminal device 3106, and optionally includes display 3126. The capture device 3102 communicates with the terminal device 3106 over communication link 3104. The communication link may include the communication channel 13 described above. The communication link 3104 includes but not limited to WIFI, Ethernet, Cable, wireless (3G/4G/5G), USB, or any kind of combination thereof, or the like.

The capture device 3102 generates data, and may encode the data by the encoding method as shown in the above embodiments. Alternatively, the capture device 3102 may distribute the data to a streaming server (not shown in the Figures), and the server encodes the data and transmits the encoded data to the terminal device 3106. The capture device 3102 includes but not limited to camera, smart phone or Pad, computer or laptop, video conference system, PDA, vehicle mounted device, or a combination of any of them, or the like. For example, the capture device 3102 may include the source device 12 as described above. When the data includes video, the video encoder 20 included in the capture device 3102 may actually perform video encoding processing. When the data includes audio (i.e., voice), an audio encoder included in the capture device 3102 may actually perform audio encoding processing. For some practical scenarios, the capture device 3102 distributes the encoded video and audio data by multiplexing them together. For other practical scenarios, for example in the video conference system, the encoded audio data and the encoded video data are not multiplexed. Capture device 3102 distributes the encoded audio data and the encoded video data to the terminal device 3106 separately.

In the content supply system 3100, the terminal device 310 receives and reproduces the encoded data. The terminal device 3106 could be a device with data receiving and recovering capability, such as smart phone or Pad 3108, computer or laptop 3110, network video recorder (NVR)/digital video recorder (DVR) 3112, TV 3114, set top box (STB) 3116, video conference system 3118, video surveillance system 3120, personal digital assistant (PDA) 3122, vehicle mounted device 3124, or a combination of any of them, or the like capable of decoding the above-mentioned encoded data. For example, the terminal device 3106 may include the destination device 14 as described above. When the encoded data includes video, the video decoder 30 included in the terminal device is prioritized to perform video decoding. When the encoded data includes audio, an audio decoder included in the terminal device is prioritized to perform audio decoding processing.

For a terminal device with its display, for example, smart phone or Pad 3108, computer or laptop 3110, network video recorder (NVR)/digital video recorder (DVR) 3112, TV 3114, personal digital assistant (PDA) 3122, or vehicle mounted device 3124, the terminal device can feed the decoded data to its display. For a terminal device equipped with no display, for example, STB 3116, video conference system 3118, or video surveillance system 3120, an external display 3126 is contacted therein to receive and show the decoded data.

When each device in this system performs encoding or decoding, the picture encoding device or the picture decoding device, as shown in the above-mentioned embodiments, can be used.

Figure 13:
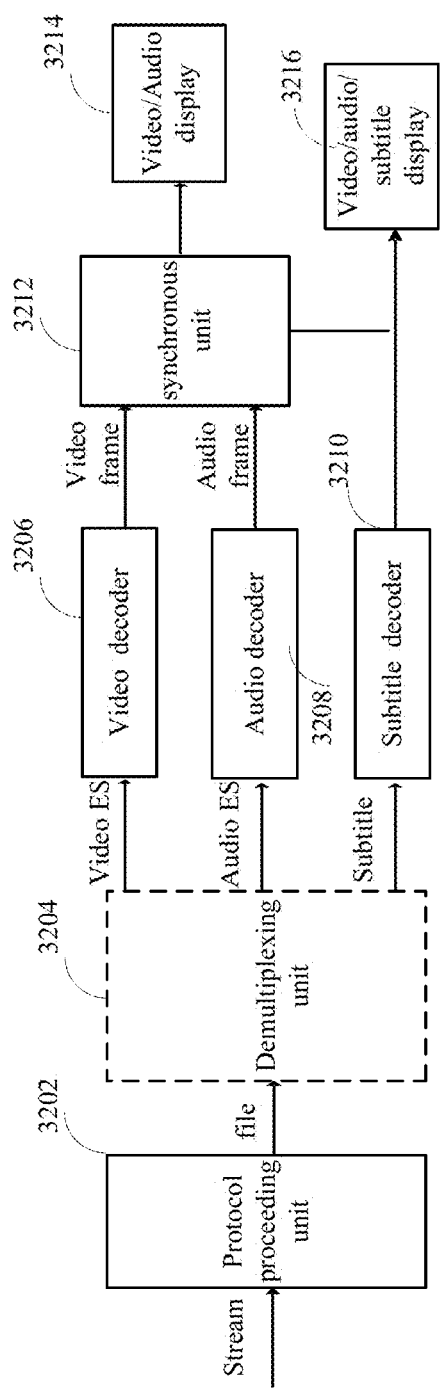
FIG. 13 is a block diagram showing a structure of an example of a terminal device.

FIG. 13 illustrates a diagram showing a structure of an example of the terminal device 3106. After the terminal device 3106 receives stream from the capture device 3102, the protocol proceeding unit 3202 analyzes the transmission protocol of the stream. The protocol includes but not limited to Real Time Streaming Protocol (RTSP), Hyper Text Transfer Protocol (HTTP), HTTP Live streaming protocol (HLS), MPEG-DASH, Real-time Transport protocol (RTP), Real Time Messaging Protocol (RTMP), or any kind of combination thereof, or the like.

After the protocol proceeding unit 3202 processes the stream, stream file is generated. The file is outputted to a demultiplexing unit 3204. The demultiplexing unit 3204 can separate the multiplexed data into the encoded audio data and the encoded video data. As described above, for some practical scenarios, for example in the video conference system, the encoded audio data and the encoded video data are not multiplexed. In this situation, the encoded data is transmitted to video decoder 3206 and audio decoder 3208 without through the demultiplexing unit 3204.

Via the demultiplexing processing, video elementary stream (ES), audio ES, and optionally subtitle are generated. The video decoder 3206, which includes the video decoder as explained in the above-mentioned embodiments, decodes the video ES by the decoding method as shown in the above-mentioned embodiments to generate video frame, and feeds this data to the synchronous unit 3212. The audio decoder 3208, decodes the audio ES to generate audio frame, and feeds this data to the synchronous unit 3212. Alternatively, the video frame may store in a buffer (not shown in FIG. 11) before feeding it to the synchronous unit 3212. Similarly, the audio frame may store in a buffer (not shown in FIG. 11) before feeding it to the synchronous unit 3212.

The synchronous unit 3212 synchronizes the video frame and the audio frame, and supplies the video/audio to a video/audio display 3214. For example, the synchronous unit 3212 synchronizes the presentation of the video and audio information. Information may code in the syntax using time stamps concerning the presentation of coded audio and visual data and time stamps concerning the delivery of the data stream itself.

If subtitle is included in the stream, the subtitle decoder 3210 decodes the subtitle, synchronizes it with the video frame and the audio frame, and supplies the video/audio/subtitle to a video/audio/subtitle display 3216.

The present disclosure is not limited to the above-mentioned system, and either the picture encoding device or the picture decoding device in the above-mentioned embodiments can be incorporated into other system, for example, a car system.

Definitions of Acronyms & Glossaries

CTB Coding Tree Block
CTU Coding Tree Unit
CU Coding Unit
CVS Coded Video Sequence
JVET Joint Video Experts Team
MCTS Motion-Constrained Tile Set
MTU Maximum Transfer Unit
NAL Network Abstration Layer
TID Temporal ID
POC Picture Order Count
RBSP Raw Byte Sequence Payload
SPS Sequence Parameter Set
HRD Hypothetical Reference Decoder
SEI Supplemental Enhancement Information
AVC Advanced Video Coding
HEVC High Efficiency Video Coding
VVC Versatile Video Coding
WD Working Draft
Mathematical Operators The mathematical operators used in this application are similar to those used in the C programming language. However, the results of integer division and arithmetic shift operations are defined more precisely, and additional operations are defined, such as exponentiation and real-valued division. Numbering and counting conventions generally begin from 0, e.g., "the first" is equivalent to the 0-th, "the second" is equivalent to the 1-th, etc.

Arithmetic Operators

The following arithmetic operators are defined as follows:
+ Addition
− Subtraction (as a two-argument operator) or negation (as a unary prefix operator)
* Multiplication, including matrix multiplication Exponentiation. Specifies x to the power of y. In other contexts, such
  $x^y$ notation is used for superscripting not intended for interpretation as exponentiation.
/ Integer division with truncation of the result toward zero. For example, 7/4 and −7/−4 are truncated to 1 and −7/4 and 7/−4 are truncated to −1.
÷ Used to denote division in mathematical equations where no truncation or rounding is intended.

$$\frac{x}{y}$$

Used to denote division in mathematical equations where no truncation or rounding is intended.

$$\sum_{i=x}^{y} f(i)$$

The summation of f(i) with i taking all integer values from x up to and including y.

x % Modulus. Remainder of x divided by y, defined only for integers x and y
y with x>=0 and y>0.

Logical Operators

The following logical operators are defined as follows:

x && y Boolean logical "and" of x and y x||y Boolean logical "or" of x and y

! Boolean logical "not"

x ? y: zIf x is TRUE or not equal to 0, evaluates to the value of y; otherwise, evaluates to the value of z.

Relational Operators

The following relational operators are defined as follows:

\> Greater than

\>= Greater than or equal to

< Less than

<= Less than or equal to

== Equal to

!= Not equal to

When a relational operator is applied to a syntax element or variable that has been assigned the value "na" (not applicable), the value "na" is treated as a distinct value for the syntax element or variable. The value "na" is considered not to be equal to any other value.

Bit-Wise Operators

The following bit-wise operators are defined as follows:

& Bit-wise "and". When operating on integer arguments, operates on a two's complement representation of the integer value. When operating on a binary argument that contains fewer bits than another argument, the shorter argument is extended by adding more significant bits equal to 0.

| Bit-wise "or". When operating on integer arguments, operates on a two's complement representation of the integer value. When operating on a binary argument that contains fewer bits than another argument, the shorter argument is extended by adding more significant bits equal to 0.

^ Bit-wise "exclusive or". When operating on integer arguments, operates on a two's complement representation of the integer value. When operating on a binary argument that contains fewer bits than another argument, the shorter argument is extended by adding more significant bits equal to 0.

x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.

x<<y Arithmetic left shift of a two's complement integer representation of x by y binary digits. This function is defined only for non-negative integer values of y. Bits shifted into the least significant bits (LSBs) as a result of the left shift have a value equal to 0.

Assignment Operators

The following arithmetic operators are defined as follows:

= Assignment operator

++ Increment, i.e., x++ is equivalent to x=x+1; when used in an array index, evaluates to the value of the variable prior to the increment operation.

-- Decrement, i.e., x-- is equivalent to x=x−1; when used in an array index, evaluates to the value of the variable prior to the decrement operation.

+= Increment by amount specified, i.e., x+=3 is equivalent to x=x+3, and x+=(−3) is equivalent to x=x+(−3).

−= Decrement by amount specified, i.e., x−=3 is equivalent to x=x−3, and x−=(−3) is equivalent to x=x−(−3).

Range Notation

The following notation is used to specify a range of values:

x=y..z x takes on integer values starting from y to z, inclusive, with x, y, and z being integer numbers and z being greater than y.

Mathematical Functions

The following mathematical functions are defined:

$$Abs(x) = \begin{cases} x; & x >= 0 \\ -x; & x < 0 \end{cases}$$

Asin(x) the trigonometric inverse sine function, operating on an argument x that is
in the range of −1.0 to 1.0, inclusive, with an output value in the range of
−π÷2 to π÷2, inclusive, in units of radians Atan(x) the trigonometric inverse tangent function, operating on an argument x, with
an output value in the range of −π÷2 to π÷2, inclusive, in units of radians $$Atan2(y, x) = \begin{cases} Atan\left(\frac{y}{x}\right); & x > 0 \\ Atan\left(\frac{y}{x}\right) + \pi; & x < 0 \;\&\&\; y >= 0 \\ Atan\left(\frac{y}{x}\right) - \pi; & x < 0 \;\&\&\; y < 0 \\ +\frac{\pi}{2}; & x == 0 \;\&\&\; y >= 0 \\ -\frac{\pi}{2}; & \text{otherwise} \end{cases}$$

Ceil(x) the smallest integer greater than or equal to x.

$$Clip1_Y(x) = Clip3(0, (1 << BitDepth_Y) - 1, x)$$

$$Clip1_C(x) = Clip3(0, (1 << BitDepth_C) - 1, x)$$

$$Clip3(x, y, z) = \begin{cases} x; & z < x \\ y; & z > y \\ z; & \text{otherwise} \end{cases}$$

Cos(x) the trigonometric cosine function operating on an argument x in units of radians.

Floor(x) the largest integer less than or equal to x.

$$GetCurrMsb(a, b, c, d) = \begin{cases} c + d; & b - a >= d/2 \\ c - d; & a - b > d/2 \\ c; & \text{otherwise} \end{cases}$$

Ln(x) the natural logarithm of x (the base-e logarithm, where e is the natural logarithm base constant 2.718 281 828 . . . ).

Log 2(x) the base-2 logarithm of x.

Log 10(x) the base-10 logarithm of x.

$$Min(x, y) = \begin{cases} x; & x <= y \\ y; & x > y \end{cases}$$

-continued $$\operatorname{Max}(x, y) = \begin{cases} x; & x >= y \\ y; & x < y \end{cases}$$

$$Round(x) = \operatorname{Sign}(x) * Floor(\operatorname{Abs}(x) + 0.5)$$

$$\operatorname{Sign}(x) = \begin{cases} 1; & x > 0 \\ 0; & x == 0 \\ -1; & x < 0 \end{cases}$$

Sin(x) the trigonometric sine function operating on an argument x in units of radians $$Sqrt(x) = \sqrt{x}$$

$$Swap(x, y) = (y, x)$$

Tan(x) the trigonometric tangent function operating on an argument x in units of radians Order of Operation Precedence When an order of precedence in an expression is not indicated explicitly by use of parentheses, the following rules apply:

Operations of a higher precedence are evaluated before any operation of a lower precedence.

Operations of the same precedence are evaluated sequentially from left to right.

The table below specifies the precedence of operations from highest to lowest; a higher position in the table indicates a higher precedence.

For those operators that are also used in the C programming language, the order of precedence used in this Specification is the same as used in the C programming language.

TABLE

Operation precedence from highest (at top of table) to lowest (at bottom of table)
operations (with operands x, y, and z)

"x++", "x− −"
"!x", "−x" (as a unary prefix operator)
$x^y$

"$x * y$", "$x / y$", "$x \div y$", "$\frac{x}{y}$", "$x \% y$"

"$x + y$", "$x - y$" (as a two-argument operator), "$\sum_{i=x}^{y} f(i)$"

"x << y", "x >> y"
"x < y", "x <= y", "x > y", "x >= y"
"x = = y", "x != y"
"x & y"
"x | y"
"x && y"
"x | | y"
"x ? y : z"
"x . . . y"
"x = y", "x += y", "x −= y",

Text Description of Logical Operations

In the text, a statement of logical operations as would be described mathematically in the following form:
if(condition 0)
    statement 0
else if(condition 1)
    statement 1
. . .
else /* informative remark on remaining condition */
    statement n
may be described in the following manner:
    . . . as follows / . . . the following applies:
        If condition 0, statement 0
        Otherwise, if condition 1, statement 1
        Otherwise (informative remark on remaining condition), statement n
. . .
Each "If . . . Otherwise, if . . . Otherwise, . . . " statement in the text is introduced with " . . . as follows" or " . . . the following applies" immediately followed by "If . . . ". The last condition of the "If . . . Otherwise, if . . . Otherwise, . . . " is always an "Otherwise, . . . ". Interleaved "If . . . Otherwise, if . . . Otherwise, . . . " statements can be identified by matching" . . . as follows" or " . . . the following applies" with the ending "Otherwise, . . . ".
In the text, a statement of logical operations as would be described mathematically in the following form:
if(condition 0a && condition 0b)
    statement 0
else if(condition 1a condition 1b)
    statement 1
. . .
else
    statement n
        may be described in the following manner:
        . . . as follows / . . . the following applies:
            If all of the following conditions are true, statement 0:
            condition 0a
            condition 0b
            Otherwise, if one or more of the following conditions are true,
statement 1:
    condition 1a
    condition 1b
    . . .
    Otherwise, statement n
    In the text, a statement of logical operations as would be described mathematically in the following form:
    if(condition 0)
        statement 0
    if(condition 1)
        statement 1
        may be described in the following manner:
        When condition 0, statement 0
        When condition 1, statement 1.
Although embodiments of the present disclosure have been primarily described based on video coding, it should be noted that embodiments of the coding system 10, encoder 20 and decoder 30 (and correspondingly the system 10) and the other embodiments described herein may also be configured for still picture processing or coding, i.e., the processing or coding of an individual picture independent of any preceding or consecutive picture as in video coding. In general only inter-prediction units 244 (encoder) and 344 (decoder) may not be available in case the picture processing coding is limited to a single picture 17. All other functionalities (also referred to as tools or technologies) of the video encoder 20 and video decoder 30 may equally be used for still picture processing, e.g., residual calculation 204/304, transform 206, quantization 208, inverse quantization 210/310, (inverse) transform 212/312, partitioning 262/362, intra-prediction 254/354, and/or loop filtering 220, 320, and entropy coding 270 and entropy decoding 304.

Embodiments, e.g., of the encoder 20 and the decoder 30, and functions described herein, e.g., with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

The present disclosure provides the following nineteen further aspects.

1. An aspect of a method coding implemented by a decoding/encoding device for coding video data, comprising: coding a set of sequence parameters associated with layer IDs associated to sub-layers of bitstream; processing the bitstream by using the set of sequence parameters.

2. A method according to aspect 1, wherein the set of sequence parameters is used for deriving or representing a picture rate of the sequence.

3. A method according to any of aspects 1 or 2, wherein one of the layer IDs is a temporal layer ID, or a SNR (Signal to Noise Ratio) layer ID, or a spatial layer ID.

4. A method according to any of aspects 1 to 3, wherein the set of sequence parameter includes one or more of following parameters: highest temporal ID, time scale value indicated the number of time units that pass in one second, flag of dyadic temporal ID distribution indicated fixed picture rate and dyadic hierarchical distribution for all sub-layers within bitstream or CVS, number of units in tick associated with the picture rate of corresponding sub-layer from sub-layer with temporal ID 0 for non-dyadic TID distribution, and number of units in tick associated with the picture rate of corresponding sub-layer from highest temporal ID for dyadic TID distribution till the sub-layer with Highest TID in bitstream or in a form of picture rate with predefined precision, e.g., frame-rate.

5. A method according to any of aspects 1-4, wherein the processing the bitstream by using the set of sequence parameters comprises: deriving number of units in tick for a sub-layer associated with a particular TID by division of number of units in tick of Highest TID by the (Highest TID minus current TID) power of 2; and processing the bitstream based on the number of units in tick for a sub-layer.

6. An aspect of a method of coding implemented by a decoding/encoding device for coding video data, comprising: coding, in HRD parameters, a set of sequence parameters associated with temporal IDs which associated to the temporal layers of bitstream processing the bitstream by using the set of sequence parameters.

7. A method according to aspect 6, wherein the set of sequence parameter includes one or more of following parameters: flag of dyadic temporal ID distribution denoted fixed picture rate for all sub-layers within bitstream or CVS in general_hrd_parameters( ) syntax elements;

8. A method according to aspect 6, wherein the set of sequence parameter includes a flag of dyadic temporal ID distribution denoted fixed picture rate for all sub-layers within bitstream or CVS in general_hrd_parameters( ) syntax elements, and the processing the bitstream by using the set of sequence parameters comprises: setting the value of a fixed_pic_rate_general_flag to 1 when dyadic_temporal_nesting_flag is equal to 1
setting the value of a fixed_pic_rate_within_cvs_flag to 1 when dyadic_temporal_nesting_flag is equal to 1;
and processing the bitstream based on the fixed_pic_rate_general_flag.

9. An aspect of a method of coding implemented by a decoding/encoding device for coding video data, comprising: coding, at the File-format-level, a set of sequence parameters associated to the temporal layers of bitstream; processing the bitstream by using the set of sequence parameters.

10. A method according to aspect 9, wherein the signaling at File-format-level comprising: sample entry if static, and/or a sample group or timed metadata if dynamic.

11. A method according to aspect 1-6, wherein the sequence parameters is coded into/out from HRD parameters of the bitstream.

12. A method according to aspect 1-6, wherein the sequence parameters is coded into/out from SEI message of the bitstream.

13. A method according to aspect 1-6, wherein the sequence parameters is coded into/out from at the File-format-level of the bit stream.

14. A method according to aspect 11, wherein the coding of the sequence parameters at File-format-level comprising: the form of a configuration record in the Sample Entry of the track.

15. A method of aspects 1-6 and/or 9, wherein the signaling at File-format-level comprising: a sample group description or timed metadata box of ISO BMFF if dynamic format.

16. An aspect of an encoder (20) comprising processing circuitry for carrying out the method according to any one of aspects 1 to 15.

17. An aspect of a computer program product comprising a program code for performing the method according to any one of aspects 1 to 15.

18. An aspect of a decoder, comprising: one or more processors; and a non-transitory computer-readable storage medium coupled to the processors and storing programming for execution by the processors, wherein the programming, when executed by the processors, configures the decoder to carry out the method according to any one of aspects 1 to 15.

19. An aspect of an encoder, comprising: one or more processors; and a non-transitory computer-readable storage medium coupled to the processors and storing programming for execution by the processors, wherein the programming, when executed by the processors, configures the encoder to carry out the method according to any one of aspects 1 to 15.

In addition, the present disclosure provides the following thirty-nine further aspects.

1. An aspect of a method of coding implemented by a decoding/encoding device for coding video data, comprising: coding a set of sequence parameters associated with layer IDs associated to sub-layers of bitstream; processing the bitstream by using the set of sequence parameters.

2. A method according to aspect 1, wherein the set of sequence parameters is used for deriving or representing a picture rate of the sequence.

3. A method according to aspect 1 or 2, wherein one of the layer IDs is a temporal layer ID, or a SNR (Signal to Noise Ratio) layer ID, or a spatial layer ID.

4. A method according to any of aspects 1 to 3, wherein the set of sequence parameter includes one or more of following parameters: highest temporal ID, time scale value indicated the number of time units that pass in one second, flag of dyadic temporal ID distribution indicated fixed picture rate and dyadic hierarchical distribution for all sub-layers within bitstream or CVS, number of units in tick associated with the picture rate of corresponding sub-layer from sub-layer with temporal ID 0 for non-dyadic TID distribution, and number of units in tick associated with the picture rate of corresponding sub-layer from highest temporal ID for dyadic TID distribution till the sub-layer with Maximum TID in bitstream or in a form of picture rate with predefined precision, e.g., frame-rate.

5. A method according to any of aspects 1-4, wherein the processing the bitstream by using the set of sequence parameters comprises: deriving number of units in tick for a sub-layer associated with a particular TID by division of number of units in tick of Maximum TID by the (Maximum TID minus current TID) power of 2; and processing the bitstream based on the number of units in tick for a sub-layer.

6. A method according to any one of aspects 1-5, wherein the sequence parameters is coded into/out from SEI message of the bitstream.

7. An aspect of a method of coding implemented by a decoding/encoding device for coding video data, comprising: coding, in HRD parameters, a set of sequence parameters associated with temporal IDs which associated to the temporal layers of bitstream processing the bitstream by using the set of sequence parameters.

8. A method according to aspect 7, wherein the set of sequence parameter includes one or more of following parameters: flag of dyadic temporal ID distribution denoted fixed picture rate for all sub-layers within bitstream or C(L)VS in general_hrd_parameters( ) syntax elements.

9. A method according to aspect 7, wherein the set of sequence parameter includes a flag of dyadic temporal ID distribution denoted fixed picture rate for all sub-layers within bitstream or CVS in general_hrd_parameters( ) syntax elements, and the processing the bitstream by using the set of sequence parameters comprises:
setting the value of a fixed_pic_rate_general_flag to 1 when dyadic_temporal_nesting_flag is equal to 1
setting the value of a fixed_pic_rate_within_cvs_flag to 1 when dyadic_temporal_nesting_flag is equal to 1;
and processing the bitstream based on the fixed_pic_rate_general_flag.

10. A method according to any one of aspects 7-9, wherein the sequence parameters is coded into/out from HRD parameters of the bitstream.

11. An aspect of a method of coding implemented by a decoding/encoding device for coding video data, comprising: coding, at the File-format-level, a set of sequence parameters associated to the temporal layers of bitstream; processing the bitstream by using the set of sequence parameters.

12. A method according to aspect 11, wherein the signaling at File-format-level comprising: sample entry if static, and/or a sample group or timed metadata if dynamic.

13. A method according to aspect 11 or 12, wherein the sequence parameters is coded into/out from at the File-format-level of the bit stream.

14. A method according to aspect 13, wherein the coding of the sequence parameters at File-format-level comprising: the form of a configuration record in the Sample Entry of the track.

15. A method according to any one of aspects 11-14, wherein the signaling at File-format-level comprising: a sample group description or timed metadata box of ISO BMFF if dynamic format.

16. An aspect of a method of coding implemented by a decoding/encoding device, comprising: deriving shutter interval independent from the derivation of ClockTick.

17. A method according to aspect 16, wherein the fixed_shutter_interval_within_cvs_flag is used to indicate whether that the value of ShutterInterval is the same for all temporal sub-layers in the C(L)VS.

18. A method according to aspect 16 or 17, wherein determining whether to signal the fixed_shutter_interval_within_cvs_flag based on dyadic_temporal_nesting_flag.

19. A method according to any one of aspects 16-18, wherein determining whether to signal the number of units in tick based on dyadic_temporal_nesting_flag.

20. A method according to any one of aspects 16-19, wherein the fixed_shutter_interval_within_sublayer_flag[i] is used to indicate whether that the value of ShutterInterval is the same for particular sub-layers in the C(L)VS.

21. A method according to aspect 20, wherein determining whether to signal the fixed_shutter_interval_within_sublayer_flag[i] is based on dyadic_temporal_nesting_flag.

22. A method according to aspect 20 or 21, wherein determining whether to signal the number of units in tick associated with picture shutter interval of corresponding sub-layer based on the fixed_shutter_interval_within_sublayer_flag[i].

23. A method according to any one of aspects 16-22, wherein the method further comprises: deriving the values of number of ticks when TID distribution is dyadic.

24. A method according to aspect 23, wherein: deriving number of units in tick for sub-layer associated with particular TID by division of number of units in tick of Maximum TID by the (Maximum TID minus current TID) power of 2 (or just shift arithmetically right by this value).

25. A method according to aspect 23, wherein: deriving number of units in shutter interval for sub-layer associated with particular TID by division of number of units in tick of Maximum TID by the (Maximum TID minus current TID) power of 2 (or just shift arithmetically right by this value).

26. A method according to any one of aspects 16-25, wherein when dyadic_temporal_nesting_flag is true, the fixed_pic_rate_general_flag[i] is set equal to true and fixed_pic_rate_within_cvs_flag[i] is set equal to true for all sub-layers.

27. A method according to any one of aspects 16-26, When the value of pi_time_scale is greater than 0, the value of PictureInterval is specified by: PictureInterval=sub_layer_num_units_in_tick [pi_max_sub_layers_minus1]÷pi_time_scale.

28. A method according to any one of aspects 16-27, When the value of pi_time_scale is greater than 0, the value of ShutterInterval is specified by: ShutterInterval=sub_layer_num_units_in_shutter_interval [pi_max_sub_layers_minus1]÷pi_time_scale 29. An aspect of a method of coding implemented by a decoding/encoding device, comprising: duplicating the sps_max_sub_layers_minus1 (for example, in SPS) in order to be independent from parsing SPS.

30. A method of aspect 29, wherein the value of pr_max_sub_layers_minus1 in the picture rates SEI message is equal to the value of sps_max_sub_layers_minus1 in the SPS.

31. A method of aspect 30, wherein the value of pr_max_sub_layers_minus1 is in the range of 0 to 6.

32. A method of aspect 29, wherein the value of pi_max_sub_layers_minus1 in the picture rates SEI message is equal to the value of sps_max_sub_layers_minus1 in the SPS.

33. A method of aspect 32, wherein the value of pi_max_sub_layers_minus1 is in the range of 0 to 6.

34. A method according to any one of aspects 29-33, wherein when the value of pi_time_scale is greater than 0, the value of PictureInterval is specified by: PictureInterval=sub_layer_num_units_in_tick [pi_max_sub_layers_minus1]÷pi_time_scale.

35. A method according to any one of aspects 29-34, wherein when the value of pi_time_scale is greater than 0, the value of ShutterInterval is specified by: ShutterInterval=sub_layer_num_units_in_shutter_interval [pi_max_sub_layers_minus1]÷pi_time_scale.

36. An aspect of an encoder (20) comprising processing circuitry for carrying out the method according to any one of aspects 1 to 35.

37. An aspect of a computer program product comprising a program code for performing the method according to any one of aspects 1 to 35.

38. An aspect of a decoder, comprising:
one or more processors; and
a non-transitory computer-readable storage medium coupled to the processors and storing programming for execution by the processors, wherein the programming, when executed by the processors, configures the decoder to carry out the method according to any one of aspects 1 to 35.

39. An aspect of an encoder, comprising:
one or more processors; and
a non-transitory computer-readable storage medium coupled to the processors and storing programming for execution by the processors, wherein the programming, when executed by the processors, configures the encoder to carry out the method according to any one of aspects 1 to 35.

What is claimed is:

1. A method of coding implemented by a decoding/encoding device for coding video data, comprising:
coding, in a supplemental enhancement information (SEI) message, a set of sequence parameters,
wherein the set of sequence parameters is associated with temporal IDs (TIDs) of sub-layers of a bitstream or coded layer video sequence (C(L)VS);
processing the bitstream or C(L)VS by using the set of sequence parameters included in the SEI message;
wherein the set of sequence parameters is used for deriving or representing a picture rate of a sequence;
wherein the set of sequence parameters includes a number of units in clock ticks of a highest TID and the highest TID, and wherein the processing of the bitstream or C(L)VS by using the set of sequence parameters comprises:
deriving a number of units in clock ticks for a sub-layer associated with a particular TID by division of the number of units in clock ticks of the highest TID by the highest TID minus current TID to the power of 2; and
processing the bitstream or C(L)VS based on the number of units in clock ticks for the sub-layer.

2. The method of claim 1, wherein the coding of the set of sequence parameters associated with the TIDs in the SEI message comprises coding an indication indicating a special payload type for the SEI message.

3. The method of claim 1, wherein the sequence comprises one or more sub-sequences, wherein the set of sequence parameters is used for deriving or representing a picture rate of the one or more of the sub-sequences.

4. The method of claim 1, wherein the TIDs are associated with a subset of general layer IDs, wherein at least one of the general layer IDs is a temporal layer ID, a Signal to Noise Ratio (SNR) layer ID, or a spatial layer ID.

5. The method of claim 1, wherein the set of sequence parameters includes one or more of the following parameters: a highest temporal ID, a TID, a time scale value indicating the number of time units that pass in one second, a flag of dyadic temporal ID distribution indicating a fixed picture rate and a dyadic hierarchical distribution for all sub-layers within the bitstream or C(L)VS, a number of units in clock ticks associated with the picture rate of corresponding sub-layer from sub-layer with temporal ID 0 for non-dyadic temporal ID distribution, and a number of units in clock ticks associated with the picture rate of corresponding sub-layer from highest temporal ID for dyadic temporal ID distribution till the sub-layer with highest TID in bitstream or in a form of picture rate with predefined precision.

6. A method of coding implemented by a decoding/encoding device for coding video data, comprising:
coding, in hypothetical reference decoder (HRD) parameters, a set of sequence parameters associated with temporal IDs that are associated to the temporal layers of a bitstream or C(L)VS; and
processing the bitstream or C(L)VS by using the set of sequence parameters;
wherein the set of sequence parameters includes a flag of dyadic temporal ID distribution denoting a fixed picture rate for all sub-layers within the bitstream or C(L)VS in general HRD parameters syntax elements, and wherein the processing the bitstream by using the set of sequence parameters comprises:
setting the value of a flag indicating a fixed picture rate to 1, when a flag indicating dyadic temporal nesting is present;
setting the value of a flag indicating a fixed picture rate within the C(L)VS to 1 when a flag indicating dyadic temporal nesting is present; and
processing the bitstream or C(L)VS based on the value of the flag indicating the fixed picture rate.

7. The method according to claim 6, wherein
the setting the value of a flag indicating a fixed picture rate to 1, when a flag indicating dyadic temporal nesting is present comprises: setting the value of a flag denoted fixed_pic_rate_general_flag to 1 when the flag denoted dyadic_temporal_nesting_flag is equal to 1;
the setting the value of a flag indicating a fixed picture rate within the C(L)VS to 1 when a flag indicating dyadic temporal nesting is present comprises: setting the value of a flag denoted fixed_pic_rate_within_cvs_flag to 1 when the flag denoted dyadic_temporal_nesting_flag is equal to 1; and
the processing the bitstream or C(L)VS based on the value of the flag indicating the fixed picture rate comprises processing the bitstream or C(L)VS based on the value of the flag denoted fixed_pic_rate_general_flag.

8. A decoder comprising:
one or more processors; and
a computer-readable storage medium coupled to the one or more processors and storing a computer program for execution by the one or more processors, wherein the program, when executed by the one or more processors, configures the decoder to perform operations comprising:
coding, in a supplemental enhancement information (SEI) message, a set of sequence parameters, wherein the set of sequence parameters is associated with temporal IDs (TIDs) of sub-layers of a bitstream or coded layer video sequence (C(L)VS);
processing the bitstream or C(L)VS by using the set of sequence parameters included in the SEI message,
wherein the set of sequence parameters is used for deriving or representing a picture rate of a sequence;
wherein the set of sequence parameters includes a number of units in clock ticks of a highest TID, the highest TID, and the processing of the bitstream or C(L)VS by using the set of sequence parameters comprises:
deriving a number of units in clock ticks for a sub-layer associated with a particular TID by division of the number of units in clock ticks of the highest TID by the highest TID minus current TID to the power of 2; and
processing the bitstream or C(L)VS based on the number of units in clock ticks for the sub-layer.

9. The decoder of claim 8, wherein the coding of the set of sequence parameters associated with the TIDs in the SEI message comprises coding an indication indicating a special payload type for the SEI message.

10. The decoder of claim 8, wherein the sequence comprises one or more sub-sequences, and wherein the set of sequence parameters is used for deriving or representing a picture rate of the one or more sub-sequences.

11. The decoder of claim 8, wherein the TIDs are associated with a subset of general layer IDs, wherein at least one of the general layer IDs is a temporal layer ID, or a Signal to Noise Ratio (SNR) layer ID, or a spatial layer ID.

12. The decoder of claim 8, wherein the set of sequence parameters includes one or more of following parameters: a highest temporal ID, a TID, a time scale value indicating the number of time units that pass in one second, a flag of dyadic temporal ID distribution indicating a fixed picture rate and a dyadic hierarchical distribution for all sub-layers within the bitstream or C(L)VS, a number of units in clock ticks associated with the picture rate of corresponding sub-layer from sub-layer with temporal ID 0 for non-dyadic TID distribution, and or number of units in clock ticks associated with the picture rate of corresponding sub-layer from highest temporal ID for dyadic TID distribution till the sub-layer with highest TID in bitstream or in a form of picture rate with predefined precision.

13. An encoder comprising:
one or more processors; and
a computer-readable storage medium coupled to the one or more processors and storing a computer program for execution by the one or more processors, wherein the programming, when executed by the one or more processors, configures the encoder to perform operations comprising:
coding, in a supplemental enhancement information (SEI) message, a set of sequence parameters,
wherein the set of sequence parameters is associated with temporal IDs (TIDs) of sub-layers of a bitstream or coded layer video sequence (C(L)VS);
processing the bitstream or C(L)VS by using the set of sequence parameters included in the SEI message;
wherein the set of sequence parameters is used for deriving or representing a picture rate of a sequence;
wherein the set of sequence parameters includes a number of units in clock ticks of a highest TID, the highest TID, and the processing of the bitstream or C(L)VS by using the set of sequence parameters comprises:
deriving a number of units in clock ticks for a sub-layer associated with a particular TID by division of the number of units in clock ticks of the highest TID by the highest TID minus current TID to the power of 2; and
processing the bitstream or C(L)VS based on the number of units in clock ticks for the sub-layer.

14. The encoder of claim 13, wherein the coding of the set of sequence parameters associated with the TIDs in the SEI message comprises coding an indication indicating a special payload type for the SEI message.

15. The encoder of claim 13, wherein the sequence comprises one or more sub-sequences, and wherein the set of sequence parameters is used for deriving or representing a picture rate of the one or more sub-sequences.

16. The encoder of claim 13, wherein the temporal IDs are associated with a subset of general layer IDs, wherein at least one of the general layer IDs is a temporal layer ID, or a Signal to Noise Ratio (SNR) layer ID, or a spatial layer ID.

* * * * *